United States Patent
Amaitis et al.

(10) Patent No.: US 10,510,214 B2
(45) Date of Patent: *Dec. 17, 2019

(54) SYSTEM AND METHOD FOR PEER-TO-PEER WIRELESS GAMING

(75) Inventors: Lee M. Amaitis, London (GB); Joseph M. Asher, New York, NY (US); Robert F. Bahrampour, New York, NY (US); Darrin M. Mylet, Tampa, FL (US); Alan B. Wilkins, Raleigh, NC (US); Howard W. Lutnick, New York, NY (US)

(73) Assignee: CFPH, LLC, New York, NY (US)

(*) Notice: Subject to any disclaimer, the term of this patent is extended or adjusted under 35 U.S.C. 154(b) by 1227 days.

This patent is subject to a terminal disclaimer.

(21) Appl. No.: 11/210,482

(22) Filed: Aug. 24, 2005

(65) Prior Publication Data

US 2007/0054739 A1     Mar. 8, 2007

(51) Int. Cl.
| | |
|---|---|
| *G07F 17/32* | (2006.01) |
| *G06Q 50/10* | (2012.01) |
| *G06Q 50/34* | (2012.01) |
| *G06F 17/40* | (2006.01) |

(52) U.S. Cl.
CPC .......... *G07F 17/3272* (2013.01); *G06F 17/40* (2013.01); *G06Q 50/10* (2013.01); *G06Q 50/34* (2013.01); *G07F 17/32* (2013.01); *G07F 17/3223* (2013.01); *G07F 17/3225* (2013.01); *G07F 17/3276* (2013.01); *G07F 17/3206* (2013.01); *G07F 17/3216* (2013.01); *G07F 17/3218* (2013.01); *G07F 17/3241* (2013.01)

(58) Field of Classification Search
CPC .. G07F 17/32; G07F 17/3202; G07F 17/3218; G07F 17/3241; G07F 17/3272; G07F 17/3274; G07F 17/3276; G07F 17/3279; G07F 17/3216; G07F 17/3223; G07F 17/3225
USPC .... 463/25, 40–47, 41, 42, 1, 29, 16, 20, 24, 463/39–43
See application file for complete search history.

(56) References Cited

U.S. PATENT DOCUMENTS

| | | | |
|---|---|---|---|
| 3,580,581 A | 5/1971 | Raven | 273/138 A |
| 3,838,259 A | 9/1974 | Kortenhaus | 235/152 |
| 3,876,208 A | 4/1975 | Wächtler et al. | 273/138 A |

(Continued)

FOREIGN PATENT DOCUMENTS

| | | |
|---|---|---|
| AU | 2004100722 | 10/2004 |
| CN | 1346549 | 4/2002 |

(Continued)

OTHER PUBLICATIONS

Stephan Neuert, et al.; The British Library; *Delivering Seamless Mobile Services over Bluetooth*; 11 pages.

(Continued)

*Primary Examiner* — Chase E Leichliter

(57) ABSTRACT

A gaming system is provided. The gaming system allows users to access applications via gaming communication devices coupled to a communication network. At least a portion of the network may be wireless. The gaming applications include gambling, financial, entertainment service, and other types of transactions. The system may include a user location determination feature to prevent users from conducting transactions from unauthorized areas.

49 Claims, 5 Drawing Sheets

(56) References Cited

U.S. PATENT DOCUMENTS

| | | | |
|---|---|---|---|
| 3,929,338 A | 12/1975 | Busch | 273/138 |
| 4,101,129 A | 7/1978 | Cox | 273/143 R |
| 4,120,294 A | 10/1978 | Wolfe | |
| 4,157,829 A | 6/1979 | Goldman et al. | 273/138 A |
| 4,206,920 A | 6/1980 | Weatherford et al. | 273/138 A |
| 4,216,965 A | 8/1980 | Morrison et al. | 273/237 |
| 4,238,127 A | 12/1980 | Lucero et al. | 273/143 R |
| 4,240,635 A | 12/1980 | Brown | 273/138 A |
| 4,266,214 A | 5/1981 | Peters, Jr. | 340/323 R |
| 4,335,809 A | 6/1982 | Wain | 194/1 R |
| 4,448,419 A | 5/1984 | Telnaes | 273/143 R |
| 4,467,424 A | 8/1984 | Hedges et al. | 364/412 |
| 4,492,379 A | 1/1985 | Okada | 273/143 R |
| 4,527,798 A | 7/1985 | Siekierski et al. | 273/86 R |
| 4,572,509 A | 2/1986 | Sitrick | 273/85 G |
| 4,573,681 A | 3/1986 | Okada | 273/143 R |
| 4,614,342 A | 9/1986 | Takashima | 273/85 CP |
| 4,624,459 A | 11/1986 | Kaufman | 273/143 R |
| 4,636,951 A | 1/1987 | Harlick | 364/412 |
| 4,648,600 A | 3/1987 | Olliges | 273/138 A |
| 4,652,998 A | 3/1987 | Koza et al. | 364/412 |
| 4,692,863 A | 9/1987 | Moosz | 364/412 |
| 4,760,527 A | 7/1988 | Sidley | 364/412 |
| 4,805,907 A | 2/1989 | Hagiwara | 273/138 A |
| 4,810,868 A | 3/1989 | Drexler | |
| 4,817,951 A | 4/1989 | Crouch et al. | 273/143 R |
| 4,838,552 A | 6/1989 | Hagiwara | 273/138 A |
| 4,853,884 A | 8/1989 | Brown et al. | 364/602 |
| 4,856,787 A | 8/1989 | Itkis | 273/237 |
| 4,858,932 A | 8/1989 | Keane | 273/143 R |
| 4,880,237 A | 11/1989 | Kishishita | 273/138 A |
| 4,882,473 A | 11/1989 | Bergeron et al. | |
| 4,909,516 A | 3/1990 | Kolinsky | 273/237 |
| 4,926,327 A | 5/1990 | Sidley | 364/412 |
| 4,959,783 A | 9/1990 | Scott et al. | 364/412 |
| 4,964,638 A | 10/1990 | Ishida | 273/138 A |
| 5,001,632 A | 3/1991 | Hall-Tipping | |
| 5,007,087 A | 4/1991 | Bernstein et al. | 380/46 |
| 5,024,441 A | 6/1991 | Rousseau | 273/176 R |
| 5,048,833 A | 9/1991 | Lamle | 273/138 A |
| 5,050,881 A | 9/1991 | Nagao | 273/143 R |
| 5,055,662 A | 10/1991 | Hasegawa | |
| 5,074,559 A | 12/1991 | Okada | 273/143 R |
| 5,083,785 A | 1/1992 | Okada | 273/143 R |
| 5,096,195 A | 3/1992 | Gimmon | 273/138 A |
| 5,096,202 A | 3/1992 | Hesland | 273/237 |
| 5,102,134 A | 4/1992 | Smyth | 273/138 A |
| 5,151,684 A | 9/1992 | Johnsen | |
| 5,229,764 A | 7/1993 | Matchett et al. | |
| 5,242,163 A | 9/1993 | Fulton | 273/85 CP |
| 5,251,165 A | 10/1993 | James, III | 364/717 |
| 5,251,898 A | 10/1993 | Dickenson et al. | 273/143 R |
| 5,263,716 A | 11/1993 | Smyth | 273/138 A |
| 5,280,426 A | 1/1994 | Edmonds | 364/408 |
| 5,280,909 A | 1/1994 | Tracy | 273/138 A |
| 5,298,476 A | 3/1994 | Hotta et al. | |
| 5,324,035 A | 6/1994 | Morris et al. | 273/138 A |
| 5,326,104 A | 7/1994 | Pease et al. | 273/138 A |
| 5,344,199 A | 9/1994 | Carstens et al. | 273/138 A |
| 5,351,970 A | 10/1994 | Fioretti | 273/439 |
| 5,359,183 A | 10/1994 | Skodlar | |
| 5,370,306 A | 12/1994 | Schulze et al. | 273/138 A |
| 5,380,007 A | 1/1995 | Travis et al. | 273/138 A |
| 5,380,008 A | 1/1995 | Mathis et al. | 273/143 R |
| 5,393,061 A | 2/1995 | Manship et al. | 273/143 R |
| 5,398,932 A | 3/1995 | Eberhardt et al. | 273/138 A |
| 5,415,416 A | 5/1995 | Scagnelli et al. | 273/439 |
| 5,421,576 A | 6/1995 | Yamazaki et al. | 273/138 A |
| 5,429,361 A | 7/1995 | Raven et al. | 273/138 A |
| 5,471,044 A | 11/1995 | Hotta et al. | |
| 5,476,259 A | 12/1995 | Weingardt | 273/85 CP |
| 5,505,449 A | 4/1996 | Eberhardt et al. | 273/138 A |
| 5,507,485 A | 4/1996 | Fisher | 273/32 R |
| 5,511,784 A | 4/1996 | Furry et al. | 273/143 R |
| 5,524,888 A | 6/1996 | Heidel | 463/22 |
| 5,534,685 A | 7/1996 | Takemoto et al. | |
| 5,551,692 A | 9/1996 | Pettit et al. | 273/143 R |
| 5,569,083 A | 10/1996 | Fioretti | 463/19 |
| 5,569,084 A | 10/1996 | Nicastro et al. | 463/20 |
| 5,580,309 A | 12/1996 | Piechowiak et al. | 463/16 |
| 5,586,937 A | 12/1996 | Menashe | 463/41 |
| 5,588,913 A | 12/1996 | Hecht | 463/19 |
| 5,599,231 A | 2/1997 | Hibino et al. | |
| 5,613,912 A | 3/1997 | Slater | 463/25 |
| 5,618,045 A | 4/1997 | Kagan et al. | |
| 5,618,232 A | 4/1997 | Martin | |
| 5,645,277 A | 7/1997 | Cheng | |
| 5,653,634 A | 8/1997 | Hodges | 463/1 |
| 5,654,746 A | 8/1997 | McMullan, Jr. et al. | 348/6 |
| 5,655,961 A | 8/1997 | Acres et al. | 463/27 |
| 5,675,828 A | 10/1997 | Stoel et al. | 395/825 |
| 5,697,844 A | 12/1997 | Von Kohorn | 463/40 |
| 5,702,302 A | 12/1997 | Gauselmann | 463/20 |
| 5,707,286 A | 1/1998 | Carlson | 463/16 |
| 5,738,583 A | 4/1998 | Comas et al. | |
| 5,745,102 A | 4/1998 | Bloch et al. | |
| 5,768,382 A | 6/1998 | Schneier et al. | |
| 5,772,508 A | 6/1998 | Sugita et al. | |
| 5,779,549 A | 7/1998 | Walker | |
| 5,785,595 A | 7/1998 | Gauselmann | 463/20 |
| 5,787,156 A | 7/1998 | K atz | |
| 5,806,849 A | 9/1998 | Rutkowski | |
| 5,816,918 A | 10/1998 | Kelly et al. | |
| 5,816,920 A | 10/1998 | Hanai | 463/42 |
| 5,836,817 A | 11/1998 | Acres et al. | 463/26 |
| 5,857,911 A | 1/1999 | Fioretti | 463/40 |
| 5,999,808 A | 2/1999 | LaDue | |
| 5,881,366 A | 3/1999 | Bodernmann et al. | |
| 5,904,619 A | 5/1999 | Scagnelli et al. | 463/17 |
| 5,904,620 A | 5/1999 | Kujawa | 463/41 |
| 5,907,282 A | 5/1999 | Tuorto et al. | |
| 5,910,047 A | 6/1999 | Scagnelli et al. | 463/17 |
| 5,921,865 A | 7/1999 | Scagnelli | 463/17 |
| 5,931,764 A | 8/1999 | Freeman et al. | |
| 5,935,005 A | 8/1999 | Tsuda et al. | 463/41 |
| 5,955,961 A | 9/1999 | Wallerstein | |
| 5,959,596 A | 9/1999 | McCarten et al. | 345/2 |
| 5,970,143 A | 10/1999 | Schneier et al. | |
| 5,977,957 A | 11/1999 | Miller et al. | |
| 6,001,015 A | 12/1999 | Nishiumi et al. | |
| 6,003,013 A | 12/1999 | Boushy et al. | |
| 6,011,973 A | 1/2000 | Valentine et al. | |
| 6,012,982 A | 1/2000 | Piechowiak et al. | 463/16 |
| 6,019,284 A | 2/2000 | Freeman et al. | |
| 6,022,274 A | 2/2000 | Takeda et al. | |
| 6,022,294 A | 2/2000 | Takeda et al. | |
| 6,044,062 A | 3/2000 | Brownrigg et al. | |
| 6,050,622 A | 4/2000 | Gustafson | |
| 6,080,061 A | 6/2000 | Watanabe et al. | |
| 6,100,804 A | 8/2000 | Brady et al. | |
| 6,104,295 A | 8/2000 | Gaisser et al. | |
| 6,104,815 A | 8/2000 | Alcorn | 380/251 |
| 6,117,011 A | 9/2000 | Lvov | |
| 6,139,431 A | 10/2000 | Walker et al. | |
| 6,146,270 A | 11/2000 | Huard et al. | 463/12 |
| 6,177,905 B1 | 1/2001 | Welch | |
| 6,178,510 B1 | 1/2001 | O'Connor et al. | |
| 6,210,274 B1 | 4/2001 | Carlson | 463/16 |
| 6,212,392 B1 | 4/2001 | Fitch et al. | |
| 6,233,448 B1 | 5/2001 | Alperovich et al. | 455/417 |
| 6,248,017 B1 | 6/2001 | Roach | 463/37 |
| 6,251,014 B1 | 6/2001 | Stockdale et al. | |
| 6,251,017 B1 | 6/2001 | Leason et al. | 463/42 |
| 6,265,973 B1 | 7/2001 | Brammall et al. | |
| 6,272,223 B1 | 8/2001 | Carlson | 380/251 |
| 6,277,026 B1 | 8/2001 | Archer | 463/42 |
| 6,277,029 B1 | 8/2001 | Hanley | 473/131 |
| 6,287,202 B1 | 9/2001 | Pascal et al. | 463/42 |
| 6,290,601 B1 | 9/2001 | Yamazaki et al. | 463/22 |
| RE37,414 E | 10/2001 | Harlick | 463/42 |
| 6,309,307 B1 | 10/2001 | Krause et al. | |
| 6,320,495 B1 | 11/2001 | Sporgis | |
| 6,331,148 B1 | 12/2001 | Krause et al. | |
| 6,359,661 B1 | 3/2002 | Nickum | |

(56) References Cited

U.S. PATENT DOCUMENTS

| | | |
|---|---|---|
| 6,386,976 B1 | 5/2002 | Yamazaki et al. ............ 463/22 |
| 6,388,612 B1 | 5/2002 | Neher |
| 6,409,602 B1 | 6/2002 | Wiltshire et al. |
| 6,424,029 B1 | 7/2002 | Giesler |
| 6,425,828 B2 | 7/2002 | Walker et al. |
| 6,428,413 B1 | 8/2002 | Carlson ......................... 463/16 |
| 6,441,752 B1 | 8/2002 | Fomukong |
| RE37,885 E | 10/2002 | Acres et al. .................. 463/42 |
| 6,468,155 B1 | 10/2002 | Zucker ........................... 463/23 |
| 6,508,710 B1 | 1/2003 | Paravia |
| 6,509,217 B1 | 1/2003 | Reddy |
| 6,520,853 B2 | 2/2003 | Suzuki |
| 6,524,189 B1 | 2/2003 | Rautila ........................ 463/40 |
| 6,527,641 B1 | 3/2003 | Sinclair et al. ............... 463/39 |
| 6,542,750 B2 | 4/2003 | Hendrey et al. ............. 455/456 |
| 6,554,705 B1 | 4/2003 | Cumbers |
| 6,554,707 B1 | 4/2003 | Sinclair ........................ 463/39 |
| 6,556,819 B2 | 4/2003 | Irvin ............................ 455/410 |
| 6,575,834 B1 | 6/2003 | Lindo ........................... 463/40 |
| 6,577,733 B1 | 6/2003 | Charrin |
| 6,582,302 B2 | 6/2003 | Romero ....................... 463/12 |
| 6,585,597 B2 | 7/2003 | Finn .............................. 463/40 |
| 6,604,980 B1 | 8/2003 | Jurmain |
| 6,612,928 B1 | 9/2003 | Bradford et al. |
| 6,614,350 B1 | 9/2003 | Lunsford et al. ........... 340/572.1 |
| 6,618,706 B1 | 9/2003 | Rive et al. .................... 705/30 |
| 6,628,939 B2 | 9/2003 | Paulsen ....................... 455/414 |
| 6,631,849 B2 | 10/2003 | Blossom |
| 6,634,942 B2 | 10/2003 | Walker ........................ 463/20 |
| 6,645,077 B2 | 11/2003 | Rowe |
| 6,652,378 B2 | 11/2003 | Cannon et al. |
| 6,676,522 B2 | 1/2004 | Rowe ........................... 463/42 |
| 6,680,675 B1 | 1/2004 | Suzuki |
| 6,682,421 B1* | 1/2004 | Rowe et al. .................. 463/25 |
| 6,691,032 B1 | 2/2004 | Irish et al. |
| 6,709,333 B1 | 3/2004 | Bradford et al. |
| 6,719,631 B1 | 4/2004 | Tulley et al. ................. 463/17 |
| 6,721,542 B1 | 4/2004 | Anttila et al. |
| 6,729,956 B2 | 5/2004 | Wolf et al. ................... 463/25 |
| 6,743,098 B2 | 6/2004 | Urie et al. |
| 6,745,011 B1 | 6/2004 | Hendrickson ............... 455/67.11 |
| 6,749,505 B1 | 6/2004 | Kunzle ......................... 463/30 |
| 6,754,210 B1 | 6/2004 | Ofek ............................ 370/389 |
| 6,755,742 B1 | 6/2004 | Hartman ...................... 463/40 |
| 6,756,882 B2 | 6/2004 | Benes .......................... 340/323 |
| 6,761,638 B1 | 7/2004 | Narita |
| 6,773,350 B2 | 8/2004 | Yoshimi et al. ............. 463/42 |
| 6,778,820 B2 | 8/2004 | Tendler ....................... 455/414.2 |
| 6,793,580 B2 | 9/2004 | Sinclair ........................ 463/39 |
| 6,800,029 B2 | 10/2004 | Rowe et al. |
| 6,800,031 B2 | 10/2004 | Di Cesare .................... 463/40 |
| 6,802,772 B1 | 10/2004 | Kunzle ......................... 463/2 |
| 6,806,889 B1 | 10/2004 | Malaure |
| 6,834,195 B2 | 12/2004 | Brandenberg et al. |
| 6,837,789 B2 | 1/2005 | Garahi et al. ................ 463/29 |
| 6,839,560 B1 | 1/2005 | Bahl et al. |
| 6,843,412 B1 | 1/2005 | Sanford ....................... 235/379 |
| 6,843,725 B2 | 1/2005 | Nelson |
| 6,846,238 B2 | 1/2005 | Wells |
| 6,857,959 B1 | 2/2005 | Nguyen et al. |
| 6,863,610 B2 | 3/2005 | Vancraeynest ............... 463/41 |
| 6,868,396 B2 | 3/2005 | Smith et al. ................. 705/27 |
| 6,884,162 B2 | 4/2005 | Raverdy ....................... 463/1 |
| 6,884,166 B2 | 4/2005 | Leen et al. |
| 6,887,151 B2 | 5/2005 | Leen et al. |
| 6,887,159 B2 | 5/2005 | Leen et al. |
| 6,892,938 B2 | 5/2005 | Solomon |
| 6,893,347 B1 | 5/2005 | Zilliacus et al. ............. 463/41 |
| 6,896,618 B2 | 5/2005 | Benoy et al. ................ 463/25 |
| 6,898,299 B1 | 5/2005 | Brooks |
| 6,899,628 B2 | 5/2005 | Leen et al. ................... 463/42 |
| 6,904,520 B1 | 6/2005 | Rosset |
| 6,908,387 B2 | 6/2005 | Hedrick et al. |
| 6,923,724 B2 | 8/2005 | Williams |
| 6,935,952 B2 | 8/2005 | Walker et al. ............... 463/25 |
| 6,935,958 B2* | 8/2005 | Nelson .......................... 463/42 |
| 6,942,574 B1 | 9/2005 | Lemay et al. |
| RE38,812 E | 10/2005 | Acres et al. .................. 463/26 |
| 6,966,832 B2 | 11/2005 | Leen et al. |
| 6,979,264 B2 | 12/2005 | Chatigny et al. |
| 6,979,267 B2 | 12/2005 | Leen et al. |
| 6,986,055 B2 | 1/2006 | Carlson ....................... 713/200 |
| 6,997,810 B2 | 2/2006 | Cole |
| 7,021,623 B2 | 4/2006 | Leen et al. |
| 7,022,017 B1 | 4/2006 | Halbritter et al. ............ 463/42 |
| 7,027,820 B2 | 4/2006 | Spratt |
| 7,029,394 B2 | 4/2006 | Leen et al. |
| 7,033,276 B2 | 4/2006 | Walker et al. ............... 463/40 |
| 7,034,683 B2 | 4/2006 | Ghazarian |
| 7,035,653 B2 | 4/2006 | Simon et al. ................ 455/466 |
| 7,040,987 B2 | 5/2006 | Walker et al. ............... 463/42 |
| 7,042,360 B2 | 5/2006 | Light et al. |
| 7,042,391 B2 | 5/2006 | Meunier et al. |
| 7,043,641 B1 | 5/2006 | Martinek et al. |
| 7,047,197 B1 | 5/2006 | Bennett |
| 7,056,217 B1 | 6/2006 | Pelkey et al. |
| 7,097,562 B2 | 8/2006 | Gagner ......................... 463/42 |
| 7,102,509 B1 | 9/2006 | Anders et al. |
| 7,124,947 B2 | 10/2006 | Storch |
| 7,125,334 B2 | 10/2006 | Yamazaki et al. ........... 463/22 |
| 7,128,482 B2 | 10/2006 | Meyerhofer et al. |
| 7,144,011 B2 | 12/2006 | Asher et al. |
| 7,147,558 B2 | 12/2006 | Giobbi .......................... 463/25 |
| 7,158,798 B2 | 1/2007 | Lee et al. ..................... 455/456.3 |
| 7,185,360 B1 | 2/2007 | Anton et al. |
| 7,207,885 B2 | 4/2007 | Longman |
| 7,228,651 B1 | 6/2007 | Saari |
| 7,229,354 B2 | 6/2007 | McNutt et al. ............... 463/29 |
| 7,229,385 B2 | 6/2007 | Freeman et al. |
| 7,233,922 B2 | 6/2007 | Asher et al. |
| 7,270,605 B2 | 9/2007 | Russell et al. ............... 463/40 |
| 7,284,708 B2 | 10/2007 | Martin |
| 7,288,025 B1 | 10/2007 | Cumbers |
| 7,288,028 B2 | 10/2007 | Rodriquez et al. |
| 7,306,514 B2 | 12/2007 | Amaitis et al. |
| 7,311,605 B2 | 12/2007 | Moser |
| 7,311,606 B2 | 12/2007 | Amaitis et al. |
| 7,311,608 B1 | 12/2007 | Danieli |
| 7,316,619 B2* | 1/2008 | Nelson .......................... 463/42 |
| 7,341,517 B2 | 3/2008 | Asher et al. |
| 7,357,717 B1 | 4/2008 | Cumbers |
| 7,367,049 B1 | 4/2008 | Robinson |
| 7,394,405 B2 | 7/2008 | Godden |
| 7,413,513 B2 | 8/2008 | Nguyen et al. |
| 7,431,650 B2 | 10/2008 | Kessman |
| 7,435,179 B1* | 10/2008 | Ford ............................ 463/42 |
| 7,442,124 B2 | 10/2008 | Asher et al. |
| 7,452,273 B2 | 11/2008 | Amaitis et al. |
| 7,452,274 B2 | 11/2008 | Amaitis et al. |
| 7,458,891 B2 | 12/2008 | Asher et al. |
| 7,458,894 B2 | 12/2008 | Danieli |
| 7,460,863 B2 | 12/2008 | Steelberg et al. |
| 7,470,191 B2 | 12/2008 | Xidos et al. |
| 7,479,065 B1 | 1/2009 | McAllister et al. |
| 7,506,172 B2 | 3/2009 | Bhakta |
| 7,510,474 B2 | 3/2009 | Carter, Sr. |
| 7,534,169 B2 | 5/2009 | Amaitis et al. |
| 7,546,946 B2 | 6/2009 | Hefner et al. |
| 7,549,576 B2 | 6/2009 | Alderucci et al. |
| 7,562,034 B2 | 7/2009 | Asher et al. |
| 7,566,270 B2 | 7/2009 | Amaitis et al. |
| 7,577,847 B2 | 8/2009 | Nguyen |
| 7,637,810 B2 | 12/2009 | Amaitis et al. |
| 7,665,668 B2 | 2/2010 | Phillips |
| 7,689,459 B2 | 3/2010 | Capurso et al. |
| 7,736,221 B2 | 6/2010 | Black et al. |
| 7,742,972 B2 | 6/2010 | Lange et al. |
| 7,744,002 B2 | 6/2010 | Jones et al. |
| 7,819,749 B1 | 10/2010 | Fish et al. |
| 7,828,652 B2 | 11/2010 | Nguyen et al. |
| 7,828,654 B2 | 11/2010 | Carter, Sr. |
| 7,828,661 B1 | 11/2010 | Fish et al. |
| 7,867,083 B2 | 1/2011 | Wells et al. |
| 7,946,917 B2 | 5/2011 | Kaminkow et al. |

(56) References Cited

U.S. PATENT DOCUMENTS

| | | |
|---|---|---|
| 7,967,682 B2 | 6/2011 | Huizinga |
| 8,016,667 B2 | 9/2011 | Benbrahim et al. |
| 8,047,914 B2 | 11/2011 | Morrow |
| 8,123,616 B2 | 2/2012 | Wells et al. |
| 8,142,283 B2 | 3/2012 | Lutnick |
| 8,162,756 B2 | 4/2012 | Amaitis et al. |
| 8,221,225 B2 | 7/2012 | Laut |
| 8,267,789 B2 | 9/2012 | Nelson |
| 8,285,484 B1 | 10/2012 | Lau |
| 8,287,380 B2 | 10/2012 | Nguyen |
| 8,292,741 B2 | 10/2012 | Burman et al. |
| 8,298,078 B2 | 10/2012 | Sutton et al. |
| 8,393,948 B2 | 3/2013 | Allen |
| 8,425,314 B2 | 4/2013 | Benbrahim |
| 8,504,617 B2 | 8/2013 | Amaitis et al. |
| 8,506,400 B2 | 8/2013 | Amaitis et al. |
| 8,510,567 B2 | 8/2013 | Alderucci et al. |
| 8,613,658 B2 | 12/2013 | Amaitis et al. |
| 8,645,709 B2 | 2/2014 | Alderucci et al. |
| 8,708,805 B2 | 4/2014 | Amaitis et al. |
| 8,764,566 B2 | 7/2014 | Miltenberger |
| 8,784,197 B2 | 7/2014 | Alderucci et al. |
| 8,956,231 B2 | 2/2015 | Amaitis et al. |
| 8,968,077 B2 | 3/2015 | Weber et al. |
| 8,974,302 B2 | 3/2015 | Amaitis et al. |
| 9,280,648 B2 | 3/2016 | Alderucci et al. |
| 9,306,952 B2 | 4/2016 | Burman et al. |
| 9,355,518 B2 | 5/2016 | Amaitis et al. |
| 9,363,251 B2 | 6/2016 | Morikuni |
| 9,411,944 B2 | 8/2016 | Alderucci et al. |
| 9,430,901 B2 | 8/2016 | Amaitis et al. |
| 9,430,909 B2 | 8/2016 | Shore |
| 2001/0018663 A1 | 8/2001 | Dussell et al. ............. 705/9 |
| 2001/0026240 A1 | 10/2001 | Neher |
| 2001/0026610 A1 | 10/2001 | Katz .................... 379/93.13 |
| 2001/0026632 A1 | 10/2001 | Tamai |
| 2001/0027130 A1 | 10/2001 | Namba et al. .............. 463/42 |
| 2001/0031663 A1 | 10/2001 | Johnson .................... 463/42 |
| 2001/0034237 A1 | 10/2001 | Garahi |
| 2001/0034268 A1 | 10/2001 | Thomas et al. |
| 2001/0036858 A1* | 11/2001 | McNutt et al. .............. 463/25 |
| 2001/0049275 A1 | 12/2001 | Pierry et al. ............... 455/414 |
| 2001/0055991 A1 | 12/2001 | Hightower |
| 2002/0034978 A1 | 3/2002 | Legge et al. |
| 2002/0037767 A1 | 3/2002 | Ebin .......................... 463/25 |
| 2002/0049909 A1 | 4/2002 | Jackson et al. |
| 2002/0052231 A1 | 5/2002 | Fioretti ...................... 463/19 |
| 2002/0065097 A1 | 5/2002 | Brockenbrough et al. ... 455/552 |
| 2002/0068631 A1 | 6/2002 | Raverdy ..................... 463/42 |
| 2002/0073021 A1 | 6/2002 | Ginsberg et al. |
| 2002/0074725 A1 | 6/2002 | Stern ......................... 273/274 |
| 2002/0086732 A1 | 7/2002 | Kirmse et al. |
| 2002/0087505 A1 | 7/2002 | Smith |
| 2002/0095586 A1 | 7/2002 | Doyle et al. |
| 2002/0111210 A1 | 8/2002 | Luciano, Jr. et al. .......... 463/29 |
| 2002/0111213 A1 | 8/2002 | McEntee et al. ............. 463/42 |
| 2002/0119817 A1 | 8/2002 | Behm ......................... 463/17 |
| 2002/0123377 A1 | 9/2002 | Shulman |
| 2002/0124182 A1 | 9/2002 | Basco ........................ 713/200 |
| 2002/0125886 A1 | 9/2002 | Bates et al. .................. 324/307 |
| 2002/0132663 A1 | 9/2002 | Cumbers |
| 2002/0142839 A1 | 10/2002 | Wolinsky |
| 2002/0142846 A1 | 10/2002 | Paulsen ...................... 463/43 |
| 2002/0143960 A1 | 10/2002 | Goren ......................... 709/229 |
| 2002/0147047 A1 | 10/2002 | Letovsky |
| 2002/0147049 A1* | 10/2002 | Carter, Sr. ............. G07F 17/3223 463/42 |
| 2002/0151344 A1 | 10/2002 | Tanskanen ................... 463/17 |
| 2002/0155884 A1 | 10/2002 | Updike ....................... 463/25 |
| 2002/0157090 A1 | 10/2002 | Anton, Jr. |
| 2002/0160838 A1 | 10/2002 | Kim ........................... 463/42 |
| 2002/0165020 A1 | 11/2002 | Koyama ...................... 463/17 |
| 2002/0174336 A1 | 11/2002 | Sakakibara et al. |
| 2002/0183105 A1 | 12/2002 | Cannon et al. |
| 2002/0184653 A1 | 12/2002 | Pierce et al. |
| 2002/0191017 A1 | 12/2002 | Sinclair ....................... 345/740 |
| 2002/0198044 A1 | 12/2002 | Walker ....................... 463/25 |
| 2002/0198051 A1 | 12/2002 | Lobel et al. |
| 2003/0003997 A1 | 1/2003 | Vuong et al. |
| 2003/0006931 A1 | 1/2003 | Mages ....................... 342/357.06 |
| 2003/0008662 A1 | 1/2003 | Stern et al. ................. 455/456 |
| 2003/0013438 A1 | 1/2003 | Darby ........................ 455/419 |
| 2003/0017871 A1 | 1/2003 | Urie et al. |
| 2003/0027631 A1 | 2/2003 | Hedrick et al. |
| 2003/0028567 A1 | 2/2003 | Carlson ...................... 708/250 |
| 2003/0031321 A1 | 2/2003 | Mages |
| 2003/0032407 A1 | 2/2003 | Mages |
| 2003/0032434 A1 | 2/2003 | Willner et al. .............. 455/456 |
| 2003/0032474 A1 | 2/2003 | Kaminkow et al. |
| 2003/0036425 A1 | 2/2003 | Kaminkow et al. |
| 2003/0036428 A1* | 2/2003 | Aasland ................. A63F 13/12 463/29 |
| 2003/0038805 A1 | 2/2003 | Wong et al. |
| 2003/0040324 A1 | 2/2003 | Eldering et al. |
| 2003/0045354 A1* | 3/2003 | Giobbi ................... G07F 17/32 463/40 |
| 2003/0045358 A1 | 3/2003 | Leen et al. |
| 2003/0050115 A1 | 3/2003 | Leen et al. |
| 2003/0054878 A1 | 3/2003 | Benoy et al. |
| 2003/0060286 A1 | 3/2003 | Walker ....................... 463/42 |
| 2003/0064712 A1 | 4/2003 | Gaston ....................... 455/414 |
| 2003/0064798 A1 | 4/2003 | Grauzer et al. |
| 2003/0064805 A1 | 4/2003 | Wells ......................... 463/39 |
| 2003/0064807 A1 | 4/2003 | Walker et al. ............... 463/42 |
| 2003/0065805 A1 | 4/2003 | Barnes, Jr. |
| 2003/0069071 A1 | 4/2003 | Britt et al. |
| 2003/0069940 A1 | 4/2003 | Kavacheri et al. ........... 709/217 |
| 2003/0078101 A1 | 4/2003 | Schneider et al. ........... 463/42 |
| 2003/0087652 A1 | 5/2003 | Simon et al. |
| 2003/0087701 A1 | 5/2003 | Paravia et al. ............... 463/42 |
| 2003/0104851 A1 | 6/2003 | Merari |
| 2003/0109306 A1 | 6/2003 | Karmarkar .................. 463/40 |
| 2003/0109310 A1 | 6/2003 | Heaton et al. |
| 2003/0114218 A1 | 6/2003 | McClintic ................... 463/25 |
| 2003/0125973 A1 | 7/2003 | Mathews |
| 2003/0130032 A1 | 7/2003 | Martinek et al. |
| 2003/0139190 A1* | 7/2003 | Steelberg et al. ............ 455/456 |
| 2003/0140131 A1 | 7/2003 | Chandrashekhar ........... 709/223 |
| 2003/0144047 A1 | 7/2003 | Sprogis |
| 2003/0148809 A1* | 8/2003 | Nelson ........................ 463/29 |
| 2003/0148812 A1* | 8/2003 | Paulsen ................. G07F 17/32 463/42 |
| 2003/0157976 A1* | 8/2003 | Simon ................... G06Q 50/34 463/1 |
| 2003/0162580 A1 | 8/2003 | Cousineau .................. 463/17 |
| 2003/0165293 A1 | 8/2003 | Griswold et al. |
| 2003/0173408 A1 | 9/2003 | Mosher et al. |
| 2003/0176162 A1 | 9/2003 | Planki ....................... 455/3.01 |
| 2003/0176218 A1* | 9/2003 | LeMay et al. ................ 463/25 |
| 2003/0177187 A1 | 9/2003 | Levine et al. |
| 2003/0177347 A1 | 9/2003 | Schneier et al. |
| 2003/0195037 A1 | 10/2003 | Voung et al. |
| 2003/0195043 A1 | 10/2003 | Shinners et al. |
| 2003/0195841 A1 | 10/2003 | Ginsberg et al. |
| 2003/0199313 A1* | 10/2003 | Gonen .................... G07F 17/32 463/25 |
| 2003/0208684 A1 | 11/2003 | Camacho et al. |
| 2003/0212996 A1 | 11/2003 | Wolzien |
| 2003/0224855 A1 | 12/2003 | Cunningham |
| 2003/0228895 A1 | 12/2003 | Edelson ...................... 463/1 |
| 2003/0228901 A1 | 12/2003 | Walker et al. |
| 2003/0228907 A1 | 12/2003 | Gatto et al. ................. 463/42 |
| 2003/0228910 A1 | 12/2003 | Jawaharlal et al. .......... 463/42 |
| 2003/0233650 A1* | 12/2003 | Zaner ..................... G06Q 10/10 725/32 |
| 2003/0236120 A1 | 12/2003 | Reece ........................ 463/42 |
| 2004/0002355 A1 | 1/2004 | Spencer ..................... 455/550 |
| 2004/0002383 A1 | 1/2004 | Lundy ....................... 463/42 |
| 2004/0002386 A1 | 1/2004 | Wolfe et al. ................ 463/42 |
| 2004/0002843 A1 | 1/2004 | Robarts ...................... 703/13 |
| 2004/0005919 A1 | 1/2004 | Walker |
| 2004/0009812 A1 | 1/2004 | Scott et al. |
| 2004/0029635 A1 | 2/2004 | Giobbi ....................... 463/30 |
| 2004/0029638 A1 | 2/2004 | Hytcheson |

(56) References Cited

U.S. PATENT DOCUMENTS

| | | |
|---|---|---|
| 2004/0034775 A1 | 2/2004 | Desjardins et al. |
| 2004/0038734 A1 | 2/2004 | Adams .......................... 463/25 |
| 2004/0044774 A1 | 3/2004 | Mangalik et al. |
| 2004/0048613 A1 | 3/2004 | Sayers ...................... 455/426.2 |
| 2004/0053692 A1 | 3/2004 | Chatingny et al. |
| 2004/0061646 A1 | 4/2004 | Andrews et al. |
| 2004/0063497 A1 | 4/2004 | Gould ............................ 463/42 |
| 2004/0067760 A1 | 4/2004 | Menjo et al. |
| 2004/0068441 A1 | 4/2004 | Werbitt ......................... 705/16 |
| 2004/0068532 A1 | 4/2004 | Dewing ....................... 709/200 |
| 2004/0082383 A1 | 4/2004 | Muncaster |
| 2004/0083394 A1 | 4/2004 | Brebner et al. |
| 2004/0092306 A1 | 5/2004 | George et al. ................. 463/29 |
| 2004/0092311 A1 | 5/2004 | Weston ........................... 463/42 |
| 2004/0097283 A1 | 5/2004 | Piper ............................. 463/17 |
| 2004/0097287 A1 | 5/2004 | Postrel ........................... 463/41 |
| 2004/0104274 A1 | 6/2004 | Koti |
| 2004/0104845 A1 | 6/2004 | McCarthy ..................... 342/463 |
| 2004/0110565 A1 | 6/2004 | Levesque |
| 2004/0111369 A1 | 6/2004 | Lane et al. ..................... 705/40 |
| 2004/0111515 A1* | 6/2004 | Manion ............ H04L 29/12009 709/227 |
| 2004/0118930 A1 | 6/2004 | Berardi et al. |
| 2004/0127277 A1* | 7/2004 | Walker .................. G07F 17/32 463/16 |
| 2004/0127289 A1 | 7/2004 | Davis ............................. 463/42 |
| 2004/0129787 A1 | 7/2004 | Saito |
| 2004/0132530 A1 | 7/2004 | Rutanen ........................ 463/42 |
| 2004/0137983 A1 | 7/2004 | Kerr et al. |
| 2004/0137987 A1 | 7/2004 | Nguyen et al. |
| 2004/0142744 A1 | 7/2004 | Atkinson et al. |
| 2004/0152511 A1 | 8/2004 | Nicely |
| 2004/0162124 A1 | 8/2004 | Barton |
| 2004/0162144 A1* | 8/2004 | Loose et al. .................... 463/42 |
| 2004/0185881 A1 | 9/2004 | Lee et al. |
| 2004/0189470 A1 | 9/2004 | Girvin et al. |
| 2004/0192438 A1 | 9/2004 | Wells et al. .................... 463/29 |
| 2004/0192442 A1 | 9/2004 | Wells et al. |
| 2004/0193469 A1 | 9/2004 | Amaitis et al. |
| 2004/0193531 A1 | 9/2004 | Amaitis et al. |
| 2004/0198398 A1 | 10/2004 | Amir et al. |
| 2004/0198403 A1 | 10/2004 | Pedersen et al. .............. 455/517 |
| 2004/0198483 A1 | 10/2004 | Amaitis et al. |
| 2004/0209660 A1 | 10/2004 | Carlson ............................ 463/1 |
| 2004/0209690 A1 | 10/2004 | Bruzzese ........................ 463/39 |
| 2004/0219961 A1 | 11/2004 | Ellenby .......................... 463/1 |
| 2004/0224769 A1 | 11/2004 | Hansen et al. .................. 463/40 |
| 2004/0225565 A1 | 11/2004 | Selman ........................... 705/14 |
| 2004/0229685 A1 | 11/2004 | Smith et al. .................... 463/29 |
| 2004/0229699 A1 | 11/2004 | Gentles et al. ................. 463/42 |
| 2004/0242297 A1 | 12/2004 | Walker |
| 2004/0242322 A1 | 12/2004 | Montagna |
| 2004/0242332 A1 | 12/2004 | Walker et al. |
| 2004/0243504 A1 | 12/2004 | Asher et al. |
| 2004/0248637 A1 | 12/2004 | Liebenberg et al. ........... 463/16 |
| 2004/0248653 A1 | 12/2004 | Barros et al. |
| 2004/0259626 A1 | 12/2004 | Akram ........................... 463/17 |
| 2004/0259631 A1 | 12/2004 | Katz et al. ...................... 463/25 |
| 2004/0266533 A1* | 12/2004 | Gentles et al. ................. 463/42 |
| 2005/0001711 A1 | 1/2005 | Doughty et al. ............. 340/5.74 |
| 2005/0003881 A1 | 1/2005 | Byng |
| 2005/0003888 A1 | 1/2005 | Asher et al. |
| 2005/0003893 A1 | 1/2005 | Hogwood et al. .............. 463/42 |
| 2005/0014554 A1 | 1/2005 | Walker et al. .................. 463/20 |
| 2005/0020336 A1 | 1/2005 | Cesare ............................. 463/9 |
| 2005/0026670 A1 | 2/2005 | Lardie ............................ 463/16 |
| 2005/0026697 A1 | 2/2005 | Balahura et al. ............... 463/42 |
| 2005/0027643 A1 | 2/2005 | Amaitis et al. |
| 2005/0049022 A1 | 3/2005 | Mullen |
| 2005/0049949 A1 | 3/2005 | Asher et al. |
| 2005/0054439 A1 | 3/2005 | Rowe et al. .................... 463/29 |
| 2005/0059397 A1 | 3/2005 | Zhao ........................... 455/345.2 |
| 2005/0059485 A1 | 3/2005 | Paulsen ........................... 463/29 |
| 2005/0064934 A1 | 3/2005 | Amaitis et al. |
| 2005/0071481 A1 | 3/2005 | Danieli |
| 2005/0086301 A1* | 4/2005 | Eichler et al. ................. 709/204 |
| 2005/0090294 A1 | 4/2005 | Narasimhan |
| 2005/0091529 A1* | 4/2005 | Manion ................. H04L 63/065 726/4 |
| 2005/0096109 A1 | 5/2005 | McNutt et al. ................... 463/6 |
| 2005/0096133 A1 | 5/2005 | Hoefelmeyer et al. ......... 463/40 |
| 2005/0101383 A1 | 5/2005 | Wells |
| 2005/0107022 A1 | 5/2005 | Wichelmann .................... 452/77 |
| 2005/0107156 A1 | 5/2005 | Potts et al. |
| 2005/0108365 A1 | 5/2005 | Becker et al. |
| 2005/0113172 A1 | 5/2005 | Gong |
| 2005/0116020 A1 | 6/2005 | Smolucha et al. |
| 2005/0130677 A1 | 6/2005 | Meunier et al. |
| 2005/0130728 A1 | 6/2005 | Nguyen .......................... 463/16 |
| 2005/0137014 A1 | 6/2005 | Vetelainen ...................... 463/42 |
| 2005/0143169 A1 | 6/2005 | Nguyen et al. ................. 463/25 |
| 2005/0144484 A1 | 6/2005 | Wakayama |
| 2005/0159212 A1 | 7/2005 | Romney et al. ................ 463/25 |
| 2005/0170845 A1 | 8/2005 | Moran |
| 2005/0170886 A1 | 8/2005 | Miller |
| 2005/0170890 A1 | 8/2005 | Rowe et al. .................... 463/42 |
| 2005/0170892 A1 | 8/2005 | Atkinson |
| 2005/0181859 A1 | 8/2005 | Lind et al. ...................... 463/17 |
| 2005/0181862 A1 | 8/2005 | Asher et al. |
| 2005/0181870 A1 | 8/2005 | Nguyen et al. ................. 463/29 |
| 2005/0187000 A1 | 8/2005 | Miller |
| 2005/0187020 A1 | 8/2005 | Amaitis et al. |
| 2005/0190901 A1 | 9/2005 | Oborn et al. |
| 2005/0192077 A1 | 9/2005 | Okuniewicz .................... 463/17 |
| 2005/0193118 A1 | 9/2005 | Le et al. |
| 2005/0193209 A1* | 9/2005 | Saunders et al. ............. 713/182 |
| 2005/0197189 A1 | 9/2005 | Schultz .......................... 463/42 |
| 2005/0197190 A1 | 9/2005 | Amaitis et al. |
| 2005/0209002 A1 | 9/2005 | Blythe et al. ................... 463/42 |
| 2005/0215306 A1 | 9/2005 | O'Donnell et al. ............. 463/17 |
| 2005/0227676 A1 | 10/2005 | De Vries |
| 2005/0234774 A1 | 10/2005 | Dupree |
| 2005/0239523 A1 | 10/2005 | Longman et al. |
| 2005/0239524 A1 | 10/2005 | Longman et al. |
| 2005/0239546 A1 | 10/2005 | Hedrick et al. |
| 2005/0245306 A1 | 11/2005 | Asher et al. |
| 2005/0245308 A1 | 11/2005 | Amaitis et al. |
| 2005/0251440 A1 | 11/2005 | Bednarek |
| 2005/0261061 A1 | 11/2005 | Nguyen et al. |
| 2005/0277471 A1* | 12/2005 | Russell et al. .................. 463/40 |
| 2005/0282638 A1 | 12/2005 | Rowe .............................. 463/42 |
| 2006/0005050 A1 | 1/2006 | Basson et al. |
| 2006/0009279 A1 | 1/2006 | Amaitis et al. |
| 2006/0016877 A1 | 1/2006 | Bonalle et al. |
| 2006/0019745 A1 | 1/2006 | Benbrahim |
| 2006/0020558 A1 | 1/2006 | Bonalle |
| 2006/0121987 A1 | 1/2006 | Bortnik et al. |
| 2006/0121992 A1 | 1/2006 | Bortnik et al. |
| 2006/0035707 A1* | 2/2006 | Nguyen et al. ................. 463/29 |
| 2006/0040717 A1 | 2/2006 | Lind et al. |
| 2006/0040741 A1 | 2/2006 | Griswold et al. |
| 2006/0058102 A1 | 3/2006 | Nguyen et al. |
| 2006/0058103 A1 | 3/2006 | Danieli |
| 2006/0068917 A1 | 3/2006 | Snoddy et al. .................. 463/42 |
| 2006/0069711 A1 | 3/2006 | Tsunekawa et al. |
| 2006/0093142 A1 | 5/2006 | Schneier et al. |
| 2006/0095790 A1 | 5/2006 | Nguyen et al. ................ 713/186 |
| 2006/0100019 A1 | 5/2006 | Hornik et al. |
| 2006/0112279 A1 | 5/2006 | Cohen |
| 2006/0116198 A1 | 6/2006 | Leen et al. |
| 2006/0116199 A1 | 6/2006 | Leen et al. |
| 2006/0116200 A1 | 6/2006 | Leen et al. |
| 2006/0121970 A1 | 6/2006 | Khal ............................... 463/16 |
| 2006/0128397 A1 | 6/2006 | Choti |
| 2006/0135252 A1 | 6/2006 | Amaitis et al. |
| 2006/0135259 A1 | 6/2006 | Nancke-Krogh et al. ...... 463/42 |
| 2006/0136296 A1 | 6/2006 | Amada |
| 2006/0136584 A1 | 6/2006 | Decker |
| 2006/0148560 A1 | 7/2006 | Arezina et al. ................. 463/29 |
| 2006/0148561 A1 | 7/2006 | Moser |
| 2006/0160626 A1 | 7/2006 | Gatto et al. |
| 2006/0161750 A1 | 7/2006 | Perkins |
| 2006/0163346 A1 | 7/2006 | Lee et al. ...................... 235/380 |
| 2006/0165235 A1 | 7/2006 | Carlson ......................... 380/268 |

(56) References Cited

U.S. PATENT DOCUMENTS

| | | |
|---|---|---|
| 2006/0166740 A1 | 7/2006 | Sufuentes |
| 2006/0173754 A1 | 8/2006 | Burton et al. |
| 2006/0178216 A1 | 8/2006 | Shea et al. ............... 463/42 |
| 2006/0183522 A1 | 8/2006 | Leen et al. |
| 2006/0184417 A1 | 8/2006 | Van der Linden et al. |
| 2006/0187029 A1 | 8/2006 | Thomas |
| 2006/0189382 A1 | 8/2006 | Muir et al. ............... 463/29 |
| 2006/0194589 A1 | 8/2006 | Sankisa ............... 455/456.1 |
| 2006/0199649 A1 | 9/2006 | Soltys et al. |
| 2006/0205489 A1 | 9/2006 | Carpenter et al. ............... 463/29 |
| 2006/0205497 A1 | 9/2006 | Wells et al. |
| 2006/0224046 A1 | 10/2006 | Ramadas et al. |
| 2006/0229520 A1 | 10/2006 | Yamashita |
| 2006/0234631 A1 | 10/2006 | Dieguez ............... 455/41.2 |
| 2006/0234791 A1 | 10/2006 | Nguyen et al. ............... 463/16 |
| 2006/0236395 A1 | 10/2006 | Barker et al. |
| 2006/0240856 A1* | 10/2006 | Counts ............... H04W 4/08 455/518 |
| 2006/0242234 A1 | 10/2006 | Counts |
| 2006/0242237 A1 | 10/2006 | Manion |
| 2006/0242639 A1 | 10/2006 | Manion |
| 2006/0246990 A1 | 11/2006 | Downes ............... 463/16 |
| 2006/0247039 A1 | 11/2006 | Lerner et al. ............... 463/29 |
| 2006/0247041 A1 | 11/2006 | Walker et al. ............... 463/29 |
| 2006/0247053 A1 | 11/2006 | Mattila |
| 2006/0248584 A1* | 11/2006 | Kelly ............... G06F 21/6245 726/18 |
| 2006/0252530 A1 | 11/2006 | Oberberger et al. ............... 463/29 |
| 2006/0258429 A1 | 11/2006 | Manning et al. |
| 2006/0277098 A1 | 12/2006 | Chung et al. |
| 2006/0277413 A1 | 12/2006 | Drews |
| 2006/0281541 A1 | 12/2006 | Nguyen et al. |
| 2006/0287092 A1* | 12/2006 | Walker et al. ............... 463/41 |
| 2006/0287098 A1 | 12/2006 | Morrow et al. ............... 463/42 |
| 2006/0293965 A1 | 12/2006 | Burton |
| 2007/0008987 A1 | 1/2007 | Manion |
| 2007/0015564 A1 | 1/2007 | Walker et al. ............... 463/16 |
| 2007/0021213 A1 | 1/2007 | Foe et al. ............... 463/42 |
| 2007/0026939 A1 | 2/2007 | Asher et al. |
| 2007/0030154 A1 | 2/2007 | Aiki et al. |
| 2007/0032301 A1 | 2/2007 | Acres et al. ............... 463/42 |
| 2007/0054739 A1 | 3/2007 | Amaitis et al. |
| 2007/0060305 A1 | 3/2007 | Amaitis et al. |
| 2007/0060306 A1 | 3/2007 | Amaitis et al. |
| 2007/0060312 A1 | 3/2007 | Dempsey et al. ............... 463/25 |
| 2007/0060326 A1 | 3/2007 | Juds et al. |
| 2007/0060355 A1 | 3/2007 | Amaitis et al. |
| 2007/0060358 A1* | 3/2007 | Amaitis et al. ............... 463/42 |
| 2007/0066401 A1 | 3/2007 | Amaitis |
| 2007/0066402 A1 | 3/2007 | Amaitis |
| 2007/0093296 A1 | 4/2007 | Asher et al. |
| 2007/0099697 A1 | 5/2007 | Nelson ............... 463/29 |
| 2007/0099703 A1 | 5/2007 | Terebilo ............... 463/42 |
| 2007/0117634 A1 | 5/2007 | Hamilton et al. ............... 463/42 |
| 2007/0130044 A1 | 6/2007 | Rowan |
| 2007/0136817 A1 | 6/2007 | Nguyen ............... 726/26 |
| 2007/0167237 A1 | 7/2007 | Wang et al. ............... 463/42 |
| 2007/0168570 A1 | 7/2007 | Martin et al. |
| 2007/0181676 A1 | 8/2007 | Mateen et al. |
| 2007/0190494 A1 | 8/2007 | Rosenberg ............... 434/11 |
| 2007/0191719 A1 | 8/2007 | Yamashita et al. |
| 2007/0213120 A1 | 9/2007 | Beal et al. ............... 463/25 |
| 2007/0235807 A1 | 10/2007 | Sobel et al. |
| 2007/0238443 A1 | 10/2007 | Richardson |
| 2007/0241187 A1 | 10/2007 | Alderucci et al. |
| 2007/0243927 A1 | 10/2007 | Soltys |
| 2007/0243935 A1 | 10/2007 | Huizinga |
| 2007/0257101 A1 | 11/2007 | Alderucci et al. |
| 2007/0258507 A1 | 11/2007 | Lee et al. |
| 2007/0259717 A1 | 11/2007 | Mattice et al. |
| 2007/0265089 A1* | 11/2007 | Robarts ............... A63F 13/12 463/42 |
| 2007/0275779 A1 | 11/2007 | Amaitis |
| 2007/0281782 A1 | 12/2007 | Amaitis |
| 2007/0281785 A1 | 12/2007 | Amaitis |
| 2007/0281792 A1 | 12/2007 | Amaitis |
| 2008/0004121 A1 | 1/2008 | Gatto et al. |
| 2008/0015013 A1 | 1/2008 | Gelman et al. |
| 2008/0022089 A1 | 1/2008 | Leedom |
| 2008/0026829 A1 | 1/2008 | Martin et al. |
| 2008/0039196 A1 | 2/2008 | Walther et al. |
| 2008/0051171 A1 | 2/2008 | Lutnick et al. |
| 2008/0051193 A1 | 2/2008 | Kaminkow et al. |
| 2008/0058048 A1 | 3/2008 | Lutnick et al. |
| 2008/0058049 A1 | 3/2008 | Lutnick et al. |
| 2008/0070667 A1 | 3/2008 | Lutnick et al. |
| 2008/0076505 A1 | 3/2008 | Nguyen et al. |
| 2008/0076506 A1 | 3/2008 | Nguyen et al. |
| 2008/0076572 A1 | 3/2008 | Nguyen et al. |
| 2008/0085752 A1 | 4/2008 | Okada |
| 2008/0085769 A1 | 4/2008 | Lutnick et al. |
| 2008/0096628 A1 | 4/2008 | Czyzewski et al. |
| 2008/0096659 A1 | 4/2008 | Kreloff et al. |
| 2008/0102956 A1 | 5/2008 | Burman et al. |
| 2008/0102957 A1 | 5/2008 | Burman et al. |
| 2008/0108423 A1 | 5/2008 | Benbrahim et al. |
| 2008/0113785 A1 | 5/2008 | Alderucci et al. |
| 2008/0113786 A1 | 5/2008 | Alderucci et al. |
| 2008/0132251 A1 | 6/2008 | Altman et al. |
| 2008/0139306 A1 | 6/2008 | Lutnick |
| 2008/0161101 A1 | 7/2008 | Lutnick et al. |
| 2008/0167106 A1 | 7/2008 | Lutnick et al. |
| 2008/0182644 A1 | 7/2008 | Lutnick et al. |
| 2008/0191418 A1 | 8/2008 | Lutnick et al. |
| 2008/0214286 A1 | 9/2008 | Lutnick et al. |
| 2008/0218312 A1 | 9/2008 | Asher et al. |
| 2008/0220871 A1 | 9/2008 | Asher et al. |
| 2008/0221396 A1 | 9/2008 | Graces et al. |
| 2008/0224822 A1 | 9/2008 | Asher et al. |
| 2008/0248849 A1 | 10/2008 | Lutnick et al. |
| 2008/0254881 A1 | 10/2008 | Lutnick et al. |
| 2008/0254897 A1 | 10/2008 | Saunders et al. |
| 2008/0305856 A1 | 12/2008 | Walker et al. |
| 2008/0311994 A1 | 12/2008 | Amaitis et al. |
| 2008/0318670 A1 | 12/2008 | Zinder et al. |
| 2009/0029780 A1 | 1/2009 | Amaitis et al. |
| 2009/0049542 A1 | 2/2009 | DeYonker et al. |
| 2009/0061974 A1 | 3/2009 | Lutnick et al. |
| 2009/0077645 A1 | 3/2009 | Kottahachchi |
| 2009/0088232 A1 | 4/2009 | Amaitis et al. |
| 2009/0093300 A1 | 4/2009 | Lutnick et al. |
| 2009/0098925 A1 | 4/2009 | Gagner et al. |
| 2009/0197684 A1 | 8/2009 | Arezina et al. |
| 2009/0204905 A1 | 8/2009 | Toghia |
| 2009/0312032 A1 | 12/2009 | Bornstein et al. |
| 2009/0325708 A9 | 12/2009 | Kerr |
| 2010/0023372 A1 | 1/2010 | Gonzalez |
| 2010/0048302 A1 | 2/2010 | Lutnick et al. |
| 2010/0062834 A1 | 3/2010 | Ryan |
| 2010/0069144 A1 | 3/2010 | Curtis |
| 2010/0075760 A1 | 3/2010 | Shimabukuro et al. |
| 2010/0127919 A1 | 5/2010 | Curran et al. |
| 2010/0205255 A1 | 8/2010 | Alderucci |
| 2010/0211431 A1 | 8/2010 | Lutnick |
| 2010/0227691 A1 | 9/2010 | Karsten |
| 2011/0035431 A1 | 2/2011 | Geary |
| 2011/0269520 A1 | 11/2011 | Amaitis et al. |
| 2012/0190452 A1 | 7/2012 | Weston et al. |
| 2013/0005486 A1 | 1/2013 | Amaitis et al. |
| 2013/0065672 A1 | 3/2013 | Gelman et al. |
| 2013/0065679 A1 | 3/2013 | Gelman et al. |
| 2013/0072295 A1 | 3/2013 | Alderucci et al. |
| 2013/0084933 A1 | 4/2013 | Amaitis et al. |
| 2013/0165212 A1 | 6/2013 | Amaitis et al. |
| 2013/0165213 A1 | 6/2013 | Alderucci et al. |
| 2013/0165221 A1 | 6/2013 | Alderucci et al. |
| 2013/0178277 A1 | 7/2013 | Burman et al. |
| 2013/0210513 A1 | 8/2013 | Nguyen |
| 2013/0244742 A1 | 9/2013 | Amaitis et al. |
| 2013/0260878 A1 | 10/2013 | Saunders et al. |
| 2014/0057724 A1 | 2/2014 | Alderucci et al. |
| 2014/0113707 A1 | 4/2014 | Asher et al. |
| 2014/0200465 A1 | 7/2014 | McIntyre |
| 2014/0220514 A1 | 8/2014 | Waldron et al. |

(56) References Cited

U.S. PATENT DOCUMENTS

| | | | |
|---|---|---|---|
| 2014/0228127 A1 | 8/2014 | Alderucci et al. | |
| 2014/0288401 A1 | 9/2014 | Ouwerkerk | |
| 2014/0300491 A1 | 10/2014 | Chen | |
| 2015/0080111 A1 | 3/2015 | Amaitis et al. | |
| 2015/0141131 A1 | 5/2015 | Gelman et al. | |
| 2015/0157947 A1 | 6/2015 | Amaitis et al. | |
| 2015/0238857 A1 | 8/2015 | Amaitis et al. | |
| 2016/0054838 A1 | 2/2016 | Amaitis et al. | |
| 2016/0321864 A1 | 11/2016 | Burman et al. | |
| 2017/0039806 A1 | 2/2017 | Alderucci et al. | |
| 2017/0091435 A1 | 3/2017 | Alderucci et al. | |
| 2017/0144065 A1 | 5/2017 | Amaitis et al. | |

FOREIGN PATENT DOCUMENTS

| | | | |
|---|---|---|---|
| DE | 31 29 550 A1 | 4/1982 | ............ G07F 17/34 |
| DE | 37 36 770 A1 | 5/1989 | ............ A63F 5/00 |
| DE | 43 16 652 A1 | 11/1994 | ............ G07F 17/32 |
| EP | 0840639 | 7/1996 | ............ A63B 71/06 |
| EP | 0506873 | 3/2000 | |
| EP | 1 066 868 A2 | 1/2001 | ............ A63F 13/12 |
| EP | 1066867 | 1/2001 | |
| EP | 1202528 | 5/2002 | ............ H04L 29/06 |
| EP | 1217792 | 6/2002 | |
| EP | 1291830 A2 | 3/2003 | |
| EP | 1475755 | 12/2003 | ............ G07C 15/00 |
| EP | 1 475 756 A2 | 11/2004 | ............ G07F 17/32 |
| EP | 1531646 | 5/2005 | ............ H04Q 7/38 |
| EP | 1259930 B1 | 6/2005 | |
| GB | 2 248 404 | 4/1992 | ............ A63F 9/02 |
| GB | 2 256 594 | 12/1992 | ............ A63F 3/06 |
| GB | 2391432 | 2/2004 | ............ H04Q 7/22 |
| GB | 2391767 | 2/2004 | ............ H04Q 7/22 |
| GB | 2394675 | 5/2004 | |
| GB | 2 406 291 | 3/2005 | ............ A63F 13/12 |
| JP | H11-220766 | 1/1988 | |
| JP | 5-317485 | 12/1993 | ............ A63F 3/06 |
| JP | H09-182143 | 7/1997 | |
| JP | 2000-69540 | 8/1998 | |
| JP | 2000049046 | 2/2000 | |
| JP | 2000-160016 | 6/2000 | |
| JP | 2000218125 | 7/2000 | |
| JP | 2000326491 | 10/2000 | |
| JP | 2000345435 | 11/2000 | |
| JP | 2000387614 | 12/2000 | |
| JP | 2001-70658 | 3/2001 | |
| JP | 2001-204971 | 7/2001 | |
| JP | 2001236458 | 8/2001 | ............ G07C 15/00 |
| JP | 2001-514909 | 9/2001 | |
| JP | 2001-344400 | 12/2001 | |
| JP | 2002032515 | 1/2002 | ............ G06Q 50/00 |
| JP | 2002107224 | 2/2002 | |
| JP | 2002-109376 | 4/2002 | |
| JP | 2002-123642 | 4/2002 | |
| JP | 2002-66144 | 5/2002 | |
| JP | 2002-135468 | 5/2002 | |
| JP | 2002133009 | 5/2002 | ............ G06Q 50/00 |
| JP | 2002149894 | 5/2002 | ............ G06Q 50/00 |
| JP | 2002-175296 | 6/2002 | |
| JP | 2002189831 | 7/2002 | ............ G06Q 50/00 |
| JP | 2002-253866 | 9/2002 | |
| JP | 2002-263375 | 9/2002 | |
| JP | 2002-279157 | 9/2002 | |
| JP | 2002-292113 | 10/2002 | |
| JP | 2003-053042 | 2/2003 | |
| JP | 2003-062353 | 3/2003 | |
| JP | 2003078591 | 3/2003 | ............ A63F 13/00 |
| JP | 2003-518677 | 6/2003 | |
| JP | 2003166050 | 6/2003 | |
| JP | 2003-210831 | 7/2003 | |
| JP | 2003-210852 | 7/2003 | |
| JP | 2002024979 | 8/2003 | |
| JP | 2003228642 | 8/2003 | ............ G06Q 50/00 |
| JP | 2004-136009 | 4/2004 | |
| JP | 2004-512865 | 4/2004 | |
| JP | 2004-261202 | 9/2004 | |
| JP | 2004-321558 | 11/2004 | |
| JP | 2004-329948 | 11/2004 | |
| JP | 2004-536638 | 12/2004 | |
| JP | 2005005936 | 1/2005 | ............ H04M 3/42 |
| JP | 2005-027853 | 2/2005 | |
| JP | 2005-073711 | 3/2005 | |
| JP | 2007-011420 | 1/2007 | |
| WO | WO 80/02512 A1 | 11/1980 | ............ A63F 5/04 |
| WO | WO 95/24689 | 9/1995 | |
| WO | WO 95/30944 | 11/1995 | |
| WO | WO 96/00950 | 1/1996 | ............ G06F 155/00 |
| WO | WO 96/15837 | 5/1996 | ............ A63F 9/22 |
| WO | WO97/44750 | 11/1997 | |
| WO | WO 98/09694 | 3/1998 | ............ A63F 3/04 |
| WO | WO 99/04873 | 2/1999 | ............ A63F 3/06 |
| WO | WO 99/08762 | 2/1999 | ............ A63F 9/22 |
| WO | WO 99/12135 | 3/1999 | |
| WO | WO99/42964 | 8/1999 | |
| WO | WO 1999/055102 | 10/1999 | |
| WO | WO 00/77753 A1 | 12/2000 | ............ G07F 17/32 |
| WO | 01/20538 | 3/2001 | |
| WO | WO 01/17262 A1 | 3/2001 | ............ H04N 7/173 |
| WO | WO 01/40978 A2 | 6/2001 | ............ G06F 17/00 |
| WO | WO 01/48712 A1 | 7/2001 | ............ G07F 17/32 |
| WO | WO 01/48713 | 7/2001 | |
| WO | WO 01/48713 A1 | 7/2001 | ............ G07F 17/32 |
| WO | 01/67218 | 9/2001 | |
| WO | WO 01/77861 | 10/2001 | |
| WO | WO 01/84817 | 11/2001 | ............ H04M 11/00 |
| WO | WO 01/89233 | 11/2001 | ............ G07F 17/32 |
| WO | WO 02/010931 | 2/2002 | ............ G06F 13/00 |
| WO | WO 02/021457 | 3/2002 | ............ G07C 15/00 |
| WO | WO 02/31739 | 4/2002 | |
| WO | WO 02/039605 | 5/2002 | ............ H04B 1/38 |
| WO | WO 02/041199 | 5/2002 | ............ H04N 7/16 |
| WO | WO 02/065750 A1 | 8/2002 | |
| WO | WO 02/071351 | 9/2002 | ............ G07F 17/32 |
| WO | WO 02/077931 | 10/2002 | ............ G07C 15/00 |
| WO | WO 02/101486 | 12/2002 | ............ A63F 9/24 |
| WO | 03/015299 A1 | 2/2003 | |
| WO | WO 03/013678 | 2/2003 | ............ A63F 13/00 |
| WO | WO 2003/015299 | 2/2003 | |
| WO | WO 03/027970 | 4/2003 | ............ G07F 17/32 |
| WO | WO 2004/000428 A1 | 12/2003 | ............ A63F 3/08 |
| WO | WO 04/003810 | 1/2004 | ............ G06F 17/60 |
| WO | WO 04/014506 | 2/2004 | ............ A63F 9/24 |
| WO | WO 2004/013820 | 2/2004 | |
| WO | WO 04/023253 | 3/2004 | ............ G08B 1/08 |
| WO | 2004/027689 A2 | 4/2004 | |
| WO | WO 2004/027689 | 4/2004 | |
| WO | WO 2004/034223 | 4/2004 | |
| WO | WO 04/073812 | 9/2004 | |
| WO | WO 04/114235 | 12/2004 | ............ G07F 17/32 |
| WO | WO 2004/104763 A2 | 12/2004 | |
| WO | WO 2004/109321 | 12/2004 | |
| WO | WO 2005/001651 | 1/2005 | |
| WO | WO 05/015458 | 2/2005 | ............ G06F 17/60 |
| WO | WO 05/026870 | 3/2005 | |
| WO | WO 05/031627 | 4/2005 | ............ G06F 19/00 |
| WO | WO 05/031666 | 4/2005 | ............ G07F 17/32 |
| WO | WO 05/036425 | 4/2005 | ............ G07F 17/60 |
| WO | WO 05/050574 | 6/2005 | |
| WO | WO 2005/082011 | 9/2005 | |
| WO | WO 2005/098650 | 10/2005 | |
| WO | 2006/023230 | 3/2006 | |
| WO | WO 2007/008601 A2 | 1/2007 | ............ A63F 9/24 |
| WO | WO 2008/005264 | 1/2008 | |
| WO | WO 2008/016610 | 2/2008 | |

OTHER PUBLICATIONS

*Notification of Transmittal of the International Search Report and the Written Opinion of the International Searching Authority, or the Declaration* for International Application No. PCT/US06/26350; 8 pages, dated Apr. 27, 2007.
*Notification of Transmittal of the International Search Report and the Written Opinion of the International Searching Authority, or the*

(56) References Cited

OTHER PUBLICATIONS

*Declaration* for International Application No. PCT/US05/05905; 10 pages, dated Apr. 10, 2007.
*Notification of Transmittal of the International Search Report and the Written Opinion of the International Searching Authority, or the Declaration* for International Application No. PCT/US06/26346; 8 pages, dated Mar. 29, 2007.
Business Wire; *Home Gambling Network Inc., With U.S. Pat. No. 5,800,268—Business/Gambling—HGN and UUNET, a WorldCom/MCI Company, Reach a Mutually Satisfactory Resolution in Patent Suit*; 2 pages, Mar. 19, 1999.
PR Newswire; *Nokia N-Gage (TM) Mobile Game Deck—The Revolutionary Gaming Experience; Major Global Games Publishers Excited to Publish on Wireless Multiplayer Platform*; 3 pages, Feb. 6, 2003.
Business Wire; *GoldPocket Interactive Launches EM Mobile Matrix, Industry's First Fully Synchronous Interactive Television and Massively Multi-Player Gaming Solution*; 2 pages, Mar. 17, 2003.
Brand Strategy; *The National Lottery has Announced that UK Consumers Will be Able to Purchase Tickets Using the Internet, TV and Mobile Phones*; (Launches & Rebrands); ISSN 0965-9390; 1 page, Apr. 2003.
PR Newswire; *Ideaworks3D Appointed by Eidos Interactive to Develop Blockbuster Line-Up for Nokia N-Gage Mobile Game Deck*; 2 pages, May 23, 2003.
Telecomworldwide; *New Mobile Lottery Service Launched by mLotto*; 1 page, Oct. 30, 2003.
Singh, et al.; *Anywhere, Any-Device Gaming*; Human Interface Technology Laboratory; National University of Singapore; 4 pages, 2004.
Wu, et al.; The Electronic Library; *Real Tournament—Mobile Context-Aware Gaming for the Next Generation*; vol. 22; No. 1; ISBN 0-86176-934-1; ISSN 0264-0473; 11 pages, 2004.
*Precision Marketing*; vol. 16; No. 11; ISSN 0955-0836; 2 pages, Jan. 9, 2004.
Online Reporter; *GTECH Takes Lottery Mobile*; 1 page, Feb. 28, 2004.
Personal and Ubiquitous Computing; *Human Pacman: a Mobile, Wide-Area Entertainment System Based on Physical, Social, and Ubiquitous Computing*; 12 pages, May 2004.
PR Newswire; *M7 Networks Partners With Terraplay to Deliver Real-Time Multiplayer Gaming Functionality to its Community Services Offerings*; 2 pages, Jun. 1, 2004.
China Telecom; *Win Win Gaming Inc. Announces Agreement to Provide Wireless Lottery and Entertainment Content in Shanghai*; vol. 11; No. 9; 2 pages, Sep. 2004.
Business Wire; *EA Announces Next Step Into Mobile Gaming; Digital Bridges Named as Strategic Partner for Distribution of Mobile Interactive Entertainment in Europe; North and South America*; 3 pages, Sep. 2, 2004.
Wireless News; *Mobile Casinos, Lotteries Good News for Mobile Revenues*; 2 pages, Feb. 23, 2005.
Business Wire; *MobileGamingNow, Inc. Announces the Launch of the First Ever Mobile Phone Interactive, Multi-Player Gaming System for Poker*; 2 pages, Apr. 4, 2005.
Business Wire; *InfoSpace's Golf Club 3D Scores Hole-in-One for Exciting and Realistic Game Play; InfoSpace's 3D Golf Captures the Challenge and Realism of the Sport With Real-Time 3D Animation, Weather Effects, and Customizable Characters*; 2 pages, Apr. 21, 2005.
Business Wire; *July Systems' Play2Win Interactive Game Service Launched on UK's MobileGaming.com; Speedy Customer Deployments Now Possible With July's New UK Mobile Retailing Infrastructure*; 2 pages, May 4, 2005.
Pending U.S. Appl. No. 10/835,995 entitled *System and Method for a Convenience Gaming* by Lee M. Amaitis, et al; 46 total pages, filed Apr. 29, 2004.
Pending U.S. Appl. No. 11/063,311 entitled *System and Method for Convenience Gaming* by Lee M. Amaitis, et al; 44 total pages, filed Feb. 21, 2005.
Pending U.S. Appl. No. 11/199,835 entitled *System and Method for Wireless Gaming System With User Profiles* by Lee M. Amaitis, et al; 72 total pages, filed Aug. 9, 2005.
Pending U.S. Appl. No. 11/199,831 entitled *System and Method for Wireless Gaming System With Alerts* by Lee M. Amaitis, et al; 66 total pages, filed Aug. 9, 2005.
Pending U.S. Appl. No. 11/201,812 entitled *System and Method for Wireless Gaming With Location Determination* by Lee M. Amaitis, et al; 53 total pages, filed Aug. 10, 2005.
Pending U.S. Appl. No. 11/199,964 entitled *System and Method for Providing Wireless Gaming as a Service Application* by Lee M. Amaitis, et al; 76 total pages, filed Aug. 9, 2005.
Pending U.S. Appl. No. 11/256,568 entitled *System and Method for Wireless Lottery* by Joseph M. Asher, et al; 32 total pages, filed Oct. 21, 2005.
Pending U.S. Appl. No. 11/557,125 entitled *System and Method for Convenience Gaming* by Lee M. Amaitis, et al; 44 total pages, filed Nov. 7, 2006.
Pending U.S. Appl. No. 11/557,131 entitled *System for Convenience Gaming* by Lee M. Amaitis, et al; 44 total pages, filed Nov. 7, 2006.
PCT Notification of Transmittal of the International Search Report and the Written Opinion of the International Searching Authority, or the Declaration with attached PCT International Search Report and Written Opinion of the International Se-Arching Authority in International Application No. PCT/US06/26343 filed Jul. 7, 2006 (10 pages), dated Jan. 19, 2007.
PCT Notification of Transmittal of the International Search Report and the Written Opinion of the International Searching Authority, or the Declaration with attached PCT International Search Report and Written Opinion of the International Searching Authority in International Application No. PCT/US06/26600 filed Jul. 7, 2006 (8 pages), dated Jan. 19, 2007.
U.S. PTO Office Action for U.S. Appl. No. 11/199,831; 9 pages; dated Dec. 19, 2008.
U.S. PTO Office Action for U.S. Appl. No. 11/256,568; 17 pages; dated Oct. 21, 2008.
U.S. PTO Office Action for U.S. Appl. No. 10/835,995; 11 pages; dated Jan. 22, 2009.
U.S. PTO Office Action for U.S. Appl. No. 11/406,783; dated Feb. 9, 2009.
Solutions for Restaurants, Hotels & Resorts and Clubs—Guestbridge, Inc. (online). Guestbridge, Inc. Feb. 6, 2007 [retrieved on Aug. 21, 2008]. Retrieved from the Internet: <URL: http://web.archive.org/web/20070206134139/www.guestbridge.com/solutions.html, entire document especially p. 1.
*Notification of Transmittal of the International Search Report and the Written Opinion of the International Searching Authority, or the Declaration* for International Application No. PCT/US08/56120, 14 pages, Aug. 29, 2008.
Pending U.S. Appl. No. 11/839,404, filed Aug. 15, 2007.
Pending U.S. Appl. No. 11/839,412, filed Aug. 15, 2007.
Pending U.S. Appl. No. 11/683,476, filed Mar. 8, 2007.
Pending U.S. Appl. No. 11/683,508, filed Mar. 8, 2007.
Pending U.S. Appl. No. 11/685,999, filed Mar. 14, 2007.
Pending U.S. Appl. No. 12/197,809, filed Aug. 25, 2008.
U.S. Appl. No. 11/686,354, filed Mar. 15, 2007, entitled "Game Access Device with Time Varying Signal."
*United States Patent and Trademark Office: Office Action* for U.S. Appl. No. 11/199,835, filed Aug. 9, 2005; in the name of Lee M. Amaitis; 17 pages; dated Mar. 2, 2007.
*Australian Patent Office Written Opinion and Search Report* for Application No. SG 200605830-9; 11 pages; dated Nov. 29, 2007.
*Notification of Transmittal of the International Search Report and the Written Opinion of the International Searching Authority* for International Application No. PCT/US06/26348; 9 pages; daed Dec. 28, 2007.
*United States Patent and Trademark Office: Office Action* for U.S. Appl. No. 11/063,311, filed Feb. 21, 2005, in the name of Lee M. Amaitis; 18 pages; dated May 4, 2007.
*United States Patent and Trademark Office: Office Action* for U.S. Appl. No. 11/063,311, filed Feb. 21, 2005 in the name of Lee M. Amaitis; 27 pages; dated Oct. 31, 2007.

(56) References Cited

OTHER PUBLICATIONS

Pending U.S. Appl. No. 11/063,311 entitled System and Method for Convenience Gaming by Lee M. Amaitis, et al.; Jul. 10, 2008.
USPTO Office Action for U.S. Appl. No. 11/418,939, dated Dec. 17, 2007 (13 pages).
USPTO Office Action for U.S. Appl. No. 11/418,939, dated Aug. 20, 2008 (12 pages).
USPTO Office Action for U.S. Appl. No. 11/418,939, dated Apr. 10, 2007.
U.S. Appl. No. 11/418,939, filed May 5, 2006, entitled "Systems and methods for providing access to wireless gaming devices."
U.S. Appl. No. 11/406,783, filed May 5, 2006 entitled "Systems and methods for providing access to wireless gaming devices."
*Australian Patent Office; Examination Report* for Singapore Patent Application No. 0605830-9; 5 pages, dated Jul. 7, 2008.
*PCT Notification of Transmittal of the International Search Report and the Written Opinion of the International Searching Authority* for International Application No. PCT/US07/66873; 4 pages, dated Aug. 4, 2008.
*PCT Notification of Transmittal of the International Search Report and the Written Opinion of the International Searching Authority* for International Application No. PCT/US2008/057239; 8 pages, dated Aug. 7, 2008.
*Notification of Transmittal of the International Search Report and the Written Opinion of the International Searching Authority* for International Application No. PCT/US06/06315; 10 pages, dated Sep. 24, 2007.
*Notification of Transmittal of the International Search Report and the Written Opinion of the International Searching Authority* for International Application No. PCT/US06/26599; 7 pages, dated Sep. 24, 2007.
*USPTO Office Action Summary* for U.S. Appl. No. 11/201,812, filed Aug. 10, 2005; 32 pages, dated Sep. 27, 2007.
Janna Lindsjö, et al.; *Gigant—an Interactive, Social, Physical and Mobile Game*; PDC 2002 Proceedings of the Participatory Design Conference; Malmö, Sweden; 5 pages, Jun. 23-25, 2002.
Gaming Labs Certified™; Standard Series: *GLI-26: Wireless Gaming System Standards*; Version 1.1; 28 pages, Jan. 18, 2007.
Gaming Labs Certified™; Standard Series: *GLI-11: Gaming Devices in Casinos*; Version 2.0; 96 pages, Apr. 20, 2007.
Gaming Labs Certified™; Standard Series: *GLI-21: Client-Server Systems*; Version 2.1; 85 pages, May 18, 2007.
U.S. Appl. No. 12/147,005, filed Jun. 26, 2008 in the name of Howard Lutnick.
U.S. PTO Office Action for U.S. Appl. No. 11/683,476; 8 pages; dated Jun. 24, 2009.
U.S. PTO Office Action for U.S. Appl. No. 10/897,822; 7 pages; dated Jan. 23, 2009.
U.S. PTO Office Action for U.S. Appl. No. 10/897,822; 7 pages; dated Jul. 16, 2008.
U.S. PTO Office Action for U.S. Appl. No. 10/897,822; 14 pages; dated Aug. 31, 2007.
U.S. PTO Office Action for U.S. Appl. No. 10/897,822; 16 pages; dated Feb. 22, 2007.
U.S. PTO Office Action for U.S. Appl. No. 10/897,822; 17 pages; dated Aug. 5, 2009.
U.S. PTO Office Action for U.S. Appl. No. 10/897,822; 7 pages; dated Feb. 6, 2008.
Applicants Response, Claims, Arguments and Remarks dated Apr. 23, 2009 for U.S. Appl. No. 10/897,822;; 18 pages.
Applicants Response, Claims, Arguments and Remarks dated Oct. 13, 2008 for U.S. Appl. No. 10/897,822; 14 pages.
U.S. Appl. No. 12/194,593, filed Aug. 20, 2008, Lutnick et al.
U.S. Appl. No. 11/567,322, filed Dec. 6, 2006, Lutnick et al.
U.S. Appl. No. 11/621,369, filed Jan. 9, 2007, Lutnick et al.
U.S. Appl. No. 12/147,005, filed Jun. 26, 2008, Lutnick et al.
Applicants Response, Claims, Arguments and Remarks dated Jun. 4, 2008 for U.S. Appl. No. 10/897,822; 14 pages.
Applicants Response, Claims, Arguments and Remarks dated Nov. 19, 2007 for U.S. Appl. No. 10/897,822; 13 pages.
Applicants Response, Claims, Arguments and Remarks dated May 23, 2007 for U.S. Appl. No. 10/897,822; 17 pages.
Applicants Summary of Interview with Examiner dated Jun. 13, 2007 for U.S. Appl. No. 10/897,822; 2 pages.
EPO Examination Report for EP Application No. 05775503.5-1238 dated Jul. 23, 2007; 5; 5 pages.
PCT International Seacrh Report and Written Opinion for International Application No. PCT/US2005/025722; 051102; 11 pages.
International Search Report for International Application No. PCT/US07/84669; 2 pages; dated Jun. 6, 2008.
U.S. Appl. No. 11/559,933, filed Nov. 15, 2006 in the name of Alderucci et al.
U.S. Appl. No. 11/559,829, filed Nov. 14, 2006 in the name of Alderucci et al.
U.S. Appl. No. 11/559,484, filed Nov. 14, 2006 in the name of Alderucci et al.
USPTO Office Action for U.S. Appl. No. 11/553,130, dated Dec. 24, 2008 (12 pages).
USPTO Office Action for U.S. Appl. No. 11/553,142, dated Dec. 23, 2008 (11 pages).
USPTO Office Action for U.S. Appl. No. 11/553,130, dated Oct. 6, 2009 (14 pages).
USPTO Office Action for U.S. Appl. No. 11/553,142, dated Sep. 3, 2009 (28 pages).
AU 1st examination report for AU Applciation No. 2006269267; dated Feb. 16, 2009; 4 pages.
AU 2nd examination report for AU Applciation No. 2006269267; dated Oct. 21, 2009; 5 pages.
U.S. PTO Office Action for U.S. Appl. No. 11/557,125; 10 pages; dated Nov. 9, 2009.
USPTO Office Action for U.S. Appl. No. 11/559,829, dated Nov. 3, 2009, 23 pp.
USPTO Office Action for U.S. Appl. No. 11/559,933, dated Oct. 20, 2009, 18 pp.
USPTO Office Action for U.S. Appl. No. 11/559,484, dated Nov. 3, 2009, 32 pp.
U.S. PTO Office Action for U.S. Appl. No. 11/199,964; 18 pages; dated Nov. 30, 2009.
U.S. PTO Office Action for U.S. Appl. No. 11/683,476; 12 pages; dated Dec. 24, 2009.
Australian Examination Report for AU Application 2006269418; 2 pages; dated Mar. 12, 2009.
U.S. PTO Office Action for U.S. Appl. No. 11/063,311; 14 pages; dated Apr. 29, 2009.
AU Examination Report for Application No. 2010214792 dated May 18, 2011; 2 pages.
EP Office Action for Application No. 07760844.6 dated Jan. 5, 2009; 7 pages.
Notice of Acceptance for Application No. 2010214792 dated Aug. 3, 2011; 3 pages.
Notice of Allowance for U.S. Appl. No. 12/367,566; 12 pages; dated Aug. 22, 2011.
U.S. PTO Office Action for U.S. Appl. No. 11/063,311; 11 pages; dated May 12, 2011.
U.S. PTO Office Action for U.S. Appl. No. 11/683,476; 6 pages; dated Jun. 30, 2011.
U.S. PTO Office Action for U.S. Appl. No. 12/324,221; 13 pages; dated Aug. 10, 2011.
U.S. PTO Office Action for U.S. Appl. No. 12/324,269; 14 pages; dated Aug. 15, 2011.
U.S. PTO Office Action for U.S. Appl. No. 12/324,355; 14 pages; dated Aug. 18, 2011.
Notice of Allowance for U.S. Appl. No. 11/559,484; 8 pages; dated Jun. 20, 2011.
Examiners second Report for AU Application No. 2010212329; 2 pages; dated Aug. 16, 2011.
Examination Report for AU Application No. 2010212329; 2 pages; dated May 6, 2011.
Examination Report for AU Application No. 2010202517; 2 pages; dated Jun. 23, 2011.
AU Examination Report for AU Application No. 2008201005; 4 pages; dated Mar. 21, 2011.

(56) References Cited

OTHER PUBLICATIONS

GB Office Action for Application No. GB0910202.1; 4 pages; dated Jul. 11, 2011.
Notice of Allowance for CA Application No. 2613333; 1 pages; dated Jul. 20, 2011.
Notice of Acceptance for AU Application No. 2006269268 dated Jun. 2, 2011; 3 pages.
JP Office Action for Application No. 2008-520393; dated Aug. 16, 2011; 16 pages total with English Translation.
Chinese Office Action for Application No. 200580009075.5; dated Aug. 3, 2011; 8 pages.
U.S. PTO Office Action for U.S. Appl. No. 11/839,412; 24 pages; dated Sep. 7, 2011.
Notice of Allowance for U.S. Appl. No. 10/835,995; 11 pages; dated Sep. 2, 2011.
Notice of Acceptance of AU Application No. 20100212329; 3 pages; dated Jul. 27, 2011.
U.S. PTO Office Action for U.S. Appl. No. 10/897,822; 14 pages; dated Sep. 28, 2010.
U.S. PTO Office Action for U.S. Appl. No. 10/897,822; 15 pages; dated Jan. 12, 2011.
Notice of Allowance for U.S. Appl. No. 10/897,822; 7 pages; dated Jun. 7, 2011.
U.S. PTO Office Action for U.S. Appl. No. 10/395,963; 25 pages; dated Jun. 29, 2011.
Notice of Allowance dated Sep. 20, 2010 for U.S. Appl. No. 10/395,988 ; 4 pages.
Canadian Examination Report for CA Application No. 2613338; 4 pages; dated Aug. 16, 2011.
U.S. PTO Office Action for U.S. Appl. No. 11/839,425; dated Sep. 26, 2011; 10 pages.
Notice of Allowance for U.S. Appl. No. 11/557,125; dated Nov. 16, 2011; 10 pages.
Notice of Allowance for U.S. Appl. No. 11/839,404; dated Nov. 3, 2011; 56 pages.
U.S. PTO Office Action for U.S. Appl. No. 11/839,418; 28 pages; dated Nov. 9, 2011.
U.S. PTO Office Action for U.S. Appl. No. 11/681,443; 13 pages; dated Nov. 28, 2011.
Notice of Allowance for U.S. Appl. No. 12/324,221; 7 pages; dated Dec. 28, 2011.
Notice of Allowance for U.S. Appl. No. 12/324,269; 7 pages; dated Dec. 6, 2011.
Notice of Allowance for U.S. Appl. No. 12/324,355; 7 pages; dated Dec. 12, 2011.
AU Examination Report for Application No. 2011202267; 2 pages; dated Nov. 30, 2011.
AU Examination Report for Application No. 2011224094; 5 pages; dated Nov. 25, 2011.
EP Office Action for Application No. 06786672.3 dated Nov. 22, 2011; 7 pages.
EP Office Action for Application No. 06774541.4 dated Nov. 22, 2011; 6 pages.
U.S. PTO Office Action for U.S. Appl. No. 11/553,142; dated Nov. 8, 2011; 105 pages.
U.S. PTO Office Action for U.S. Appl. No. 11/553,130; 14 pages; dated Sep. 26, 2011.
Notice of Allowance for U.S. Appl. No. 11/559,484; 8 pages; dated Dec. 13, 2011.
Notice of Allowance for U.S. Appl. No. 11/839,418; dated Jan. 27, 2012; 8 pages.
Notice of Allowance for U.S. Appl. No. 12/247,623; dated Jan. 24, 2012; 8 pages.
Examination Report for CA Application No. 2557209 dated Jan. 20, 2012; 6 pages.
Examination Report for CA Application No. 2598041 dated Jan. 27, 2012; 6 pages.
U.S. PTO Office Action for U.S. Appl. No. 12/647,887; dated Jan. 23, 2012; 11 pages.
Notice of Panel Decision for U.S. Appl. No. 11/683,476; 2 pages; dated Jan. 13, 2012.
U.S. PTO Office Action for U.S. Appl. No. 12/197,809; dated Feb. 10, 2012; 19 pages.
Notice of Allowance for U.S. Appl. No. 11/559,829; dated Jan. 10, 2012; 14 pages.
U.S. PTO Office Action for U.S. Appl. No. 12/792,361; dated Feb. 13, 2012; 14 pages.
U.S. PTO Office Action for U.S. Appl. No. 11/063,311; 8 pages; dated Jan. 13, 2012.
Canadian Office Action for CA Application No. 2613084; dated Feb. 16, 2012; 3 pages.
Extended EP Search report for Application No. 07871467.2; dated Feb. 8, 2012; 8 pages.
U.S. PTO Office Action for U.S. Appl. No. 12/685,381; 8 pages; dated Feb. 28, 2012.
U.S. PTO Office Action for U.S. Appl. No. 11/559,933; 23 pages; dated Mar. 2, 2012.
JP Office Action for Application No. 2007-500972; dated Jan. 24, 2012; 4 pages (includes English Translation).
Notice of Allowance for U.S. Appl. No. 11/839,404; dated Mar. 5, 2012; 9 pages.
Notice of Allowance for U.S. Appl. No. 11/839,418; dated Mar. 14, 2012; 9 pages.
JP Office Action for Application No. 2008-520389; dated Jan. 24, 2012; 5 pages (includes English Translation).
AU Examination Report for AU Application No. 2007319235; dated Mar. 13, 2012; 2 pages.
AU Examination Report for AU Application No. 2008201005; dated Mar. 21, 2011; 4 pages.
JP Office Action for Application No. 2008-520391; dated Apr. 10, 2012; 6 pages total with English Translation.
Notice of Panel Decision for U.S. Appl. No. 11/839,425; dated Mar. 28, 2012; 2 pages.
Notice of Acceptance for AU Application No. 2011202267; 3 pages; dated Mar. 6, 2012.
Notice of Allowance for U.S. Appl. No. 12/324,269; 9 pages; dated Mar. 22, 2012.
US PTO Office Action for U.S. Appl. No. 11/683,508; dated Apr. 13, 2012; 9 pages.
Notice of Allowance for U.S. Appl. No. 11/559,484; 17 pages; dated Jun. 1, 2012.
Notice of Allowance for U.S. Appl. No. 11/559,829; dated May 11, 2012; 10 pages.
AU Examination report for Application No. 2011244922; dated Jun. 12, 2012; 2 pages.
AU Examination report for Application No. 2011203051; dated May 28, 2012; 4 pages.
CA Examination Report for Application No. 2754756; 6 pages; dated May 29, 2012.
EP Office Action for Application No. 06786486.8; 5 pages; dated May 14, 2012.
EP Office Action for Application No. 06786483.5; 7 pages; dated May 14, 2012.
AU Examination Report for Application No. 2011235990; 2 pages; dated May 23, 2012.
JP Office Action for Application No. 2008-520395; dated Apr. 10, 2012; 4 pages (includes English Translation).
Notice of Allowance for U.S. Appl. No. 12/324,355; 10 pages; dated Jun. 15, 2012.
Notice of Panel Decision for U.S. Appl. No. 11/553,130; 2 pages; dated Apr. 25, 2012.
Notice of Allowance for U.S. Appl. No. 11/553,142; dated Jun. 12, 2012; 8 pages.
AU Examination Report for Application No. 2011202178; dated May 28, 2012; 2 pages.
Notice of Allowance for U.S. Appl. No. 11/839,418; dated Jul. 2, 2012; 10 pages.
U.S. PTO Office Action for U.S. Appl. No. 12/647,887; dated Aug. 3, 2012; 9 Pages.
JP Office Action for Application No. 2011-12803; dated Jun. 12, 2012; 36 pages total with English Translation.

(56) References Cited

OTHER PUBLICATIONS

NZ Examination Report for NZ Application No. 577177; dated Jun. 29, 2012; 2 pages.
JP Office Action for Application No. 2008-520393; dated Jul. 3, 2012; 4 pages total with English Translation.
U.S. PTO Office Action for U.S. Appl. No. 11/681,443; 14pages; dated Jul. 11, 2012.
Notice of Allowance for U.S. Appl. No. 11/685,997; dated Jul. 10, 2012; 10 pages.
Notice of Allowance for U.S. Appl. No. 12/685,381; 7 pages; dated Sep. 12, 2012.
Supplemental Notice of Allowance for U.S. Appl. No. 11/685,997; dated Sep. 7, 2012; 10 pages.
U.S. PTO Office Action for U.S. Appl. No. 12/792,361; dated Sep. 26, 2012; 14 pages.
U.S. Office Action for U.S. Appl. No. 13/561,279; dated Oct. 11, 2012; 11 pages.
U.S. Office Action for U.S. Appl. No. 13/561,299; dated Oct. 10, 2012; 11 pages.
AU Examiners Report for Application No. 2005216239 dated Nov. 18, 2009; 2 pages.
Chinese Office Action for Application No. 200580009075.5; dated Jun. 5, 2012; 9 pages.
European Extended Search Report for Application No. 05723674.7; dated Dec. 7, 2011; 6 pages.
U.S. PTO Office Action for U.S. Appl. No. 11/839,412; 17 pages; dated Oct. 19, 2012.
AU Notice of Acceptance for AU Application No. 2006216723; 3 pages; dated Mar. 20, 2012.
European Extended Search Report for Application No. 06735821.8; dated Dec. 7, 2011; 9 pages.
Office Action for Japanese Patent Application No. 2010-186542; dated May 22, 2012; 6 pages.
U.S. PTO Office Action for U.S. Appl. No. 13/616,356; 8 pages; dated Dec. 4, 2012.
U.S. Notice of Allowance for U.S. Appl. No. 12/197,809; dated Nov. 15, 2012; 15 pages.
Examination Report for AU Application No. 2010202517; 2 pages; dated Aug. 16, 2011.
European Extended Search Report for Application No. 06786488.4; dated May 14, 2012; 6 pages.
Notice of Acceptance for AU Application No. 2010212278 dated Nov. 20, 2012; 3 pages.
Extended EP Search report for Application No. 06774581.0; dated Nov. 22, 2011; 7 pages.
JP Office Action for Application No. 2008-520419; dated Jun. 12, 2012; 36 pages total with English Translation.
CA Examination report for CA Application No. 2596474; dated Mar. 20, 2012; 1 page.
Notice of Allowance for U.S. Appl. No. 11/559,484; 17 pages; dated Oct. 12, 2012.
U.S. PTO Final Office Action for U.S. Appl. No. 11/559,933; 24 pages; dated Dec. 6, 2012.
AU Examination Report for AU Application No. 2007319235; dated Apr. 16, 2012; 2 pages.
Yampolskiy et al., 2006, "Use of Behavioral Biometrics in Intrusion detection and Online Gaming", Biometric technology for Human Identification III, edited by Patrick J. Flynn, Sharath Pankanti, Proc. of SPIE vol. 6202.
NZ Examination Report for NZ Application No. 577177; dated Oct. 12, 2012; 2 pages.
NZ Examination Report and Notice of Acceptance for NZ Application No. 577177; dated Nov. 6, 2012; 2 pages.
Notice of Allowance for U.S. Appl. No. 11/559,829; dated Oct. 9, 2012; 9 pages.
AU Examination Report for Application No. 2011202178; dated Sep. 4, 2012; 3 pages.
Notice of Allowance for U.S. Appl. No. 12/685,381; dated Jan. 9, 2013; 16 pages.
Notice of Allowance for U.S. Appl. No. 12/324,269; 27 pages; dated Oct. 17, 2012.
Notice of Allowance for U.S. Appl. No. 12/324,355; 34 pages; dated Jan. 16, 2013.
Notice of Allowance for U.S. Appl. No. 113/586,142; 8 pages; dated Dec. 24, 2012.
US PTO Office Action for U.S. Appl. No. 13/615,440; 17 pages; dated Jan. 15, 2013.
US PTO Office Action for U.S. Appl. No. 11/839,425; 11 pages; dated Jan. 24, 2013.
Office Action for Japanese Patent Application No. 2010-186542; dated Jan. 8, 2013; 5 pages.
US PTO Office Action for U.S. Appl. No. 13/346,133; 24 pages; dated Oct. 10, 2012.
U.S. Office Action for U.S. Appl. No. 13/561,335; dated Dec. 28, 2012; 10 pages.
U.S. Office Action for U.S. Appl. No. 13/616,268; dated Dec. 20, 2012; 7 pages.
European Communication for Application No. 05723674.7; dated Sep. 12, 2012; 5 pages.
Notice of Allowance for U.S. Appl. No. 11/557,125; 31 pages; dated Jan. 2, 2013.
U.S. PTO Office Action for U.S. Appl. No. 13/180,065; 9 pages; dated Oct. 10, 2012.
AU Examination Report for Application No. 2011235990; 3 pages; dated Aug. 2, 2012.
Notice of Allowance for U.S. Appl. No. 12/647,887; 35 pages; dated Mar. 13, 2013.
Notice of Allowance for U.S. Appl. No. 12/194,809; 27 pages; dated Mar. 6, 2013.
AU Notice of Acceptance for Au Application No. 2010202517; 2 pages; dated Mar. 18, 2013.
EP Communication for Application No. 06774581.0; dated Feb. 15, 2013; 5 pages.
EP Office Action for Application No. 06774541.4 dated Feb. 15, 2013; 5 pages.
JP Office Action for Application No. 2009-506743 dated Jan. 22, 2013; 5 pages.
JP Office Action for Application No. 2009-537329 dated Feb. 26, 2013; 13 pages.
Notice of Allowance for U.S. Appl. No. 11/559,484; 11 pages; dated Mar. 26, 2013.
Notice of Allowance for U.S. Appl. No. 11/063,311, 8 pages; dated Apr. 8, 2013.
U.S. Office Action for U.S. Appl. No. 13/561,274; 13 pages; dated May 10, 2013.
JP Office Action for Application No. 2008-520389; dated Apr. 9, 2013; 5 pages (includes English Translation).
JP Decision on Appeal for Application No. 2008-520419; dated Apr. 2, 2013; 30 pages [includes English Translation].
Notice of Allowance for U.S. Appl. No. 11/559,829; dated Apr. 25, 2013; 13 pages.
JP Office Action for Application No. 2008-051097; dated Mar. 19, 2013; 6 pages [includes English Translation].
USPTO Notice of Allowance for U.S. Appl. No. 13/070,893, 8 pages; dated Feb. 25, 2013.
U.S. Office Action for U.S. Appl. No. 13/070,893; 13 pages; dated Apr. 30, 2012.
U.S. Office Action for U.S. Appl. No. 13/080,098; 14 pages; dated May 25, 2012.
Notice of Allowance for U.S. Appl. No. 11/063,311, 6 pages; dated May 23, 2013.
Australian Examination Report for AU Application No. 2011250750, 3 pages; dated May 22, 2013.
EP Communication for Application No. 07871467.2; dated Feb. 22, 2013; 7 pages.
US PTO Notice of Allowance for U.S. Appl. No. 11/683,508; dated May 30, 2013; 18 pages.
PCT International Search Report and Written Opinion for International Application No. PCT/US2011/047588; 13 pages; dated Jan. 13, 2012.
PCT Preliminary Report on Patentability for International Application No. PCT/US2011/047588; 13 pages; dated Feb. 28, 2013.

(56) References Cited

OTHER PUBLICATIONS

U.S. Final Office Action for U.S. Appl. No. 13/561,299; 13 pages; dated Jun. 7, 2013.
CN Notice of Reexamination for Application No. 200580009075.5; 6 pages; dated May 24, 2013 (w/ English translation).
U.S. Final Office Action for U.S. Appl. No. 11/839,412; 18 pages; dated Jun. 6, 2013.
JP Decision to Grant a Patent for Application No. 2008-520391, 4 pages; dated Jun. 12, 2013; (w/ English translation).
U.S. Notice of Allowance for U.S. Appl. No. 12/647,887; 9 pages; dated Jun. 7, 2013.
Hiroshi Kakii, Complete illustration for understanding the latest i-mode, Gijutsu-Hyohron Co. Ltd., Sep. 29, 2000. Second Print of the first edition, p. 36-37, 48-49, 62-63, 78-83, 94-95, and 108-111.
U.S. Office Action for U.S. Appl. No. 13/561,299; 15 pages; dated Jun. 19, 2013.
U.S. Office Action for U.S. Appl. No. 13/561,335; dated Jun. 21, 2013; 13 pages.
European Extended Search Report for Application No. 06735821.8; dated Jan. 17, 2013; 5 pages.
U.S. Office Action for U.S. Appl. No. 13/657,221; dated Jul. 9, 2013; 19 pages.
U.S. Office Action for U.S. Appl. No. 11/559,933; dated Jul. 15, 2013; 32 pages.
U.S. Office Action for U.S. Appl. No. 13/616,535; dated Jul. 9, 2013; 11 pages.
U.S. Office Action for U.S. Appl. No. 11/683,476; dated Jul. 9, 2013; 5 pages.
U.S. Notice of Allowance for U.S. Appl. No. 12/647,887; 6 pages; dated Jul. 19, 2013.
U.S. Notice of Allowance for U.S. Appl. No. 13/311,099; 8 pages; dated Jul. 23, 2013.
JP Office Action for Application No. 2008-520395; dated Jun. 11, 2013; 8 pages.
U.S. Final Office Action for U.S. Appl. No. 13/080,098; 15 pages; dated Jul. 22, 2013.
U.S. Final Office Action for U.S. Appl. No. 13/346,133; 13 pages; dated Aug. 12, 2013.
U.S. Final Office Action for U.S. Appl. No. 13/616,268; 13; pages; dated Aug. 15, 2013.
U.S. Final Office Action for U.S. Appl. No. 11/839,425; 11; pages; dated Aug. 15, 2013.
U.S. PTO Office Action for U.S. Appl. No. 13/180,065; 13 pages; dated Aug. 2, 2013.
Notice of Allowance for U.S. Appl. No. 12/247,623; dated Aug. 2, 2013; 6 pages.
U.S. Office Action for U.S. Appl. No. 13/616,356; dated Aug. 15, 2013; 11 pages.
Notice of Allowance for U.S. Appl. No. 11/559,829; dated Aug. 23, 2013; 10 pages.
U.S. Office Action for U.S. Appl. No. 13/616,588; dated Aug. 20, 2013; 17 pages.
Australian Examination Report for AU Application No. 2012203722; 2 pages; dated Aug. 23, 2013.
U.S. Notice of Allowance for U.S. Appl. No. 11/063,311; dated Sep. 10, 2013; 7 pages.
Notice of Allowance for U.S. Appl. No. 11/559,829; dated Sep. 12, 2013; 10 pages.
U.S. Final Office Action for U.S. Appl. No. 13/615,440; 10; pages; dated Sep. 9, 2013.
U.S. Office Action for U.S. Appl. No. 13/615,981; dated Sep. 13, 2013; 12 pages.
U.S. Office Action for U.S. Appl. No. 13/616,492; dated Sep. 13, 2013; 13 pages.
JP Final Decision for Appeal No. 2012-9549; dated Sep. 10, 2013; 26 Pages (w/English translation).
CA Examiner's Requisition for Application No. 2,613,362; dated Sep. 16, 2013; 3 pages.
U.S. Notice of Allowance for U.S. Appl. No. 12/324,221; dated Sep. 20, 2013; 8 pages.
JP Decision on Appeal for Application No. 2005-520393; dated Sep. 10, 2013; 45 pages (w/English translation).
AU Examination Report No. 1 for Application No. 2012201974; dated Oct. 21, 2013; 3 pages.
U.S. Notice of Allowance for U.S. Appl. No. 12/324,269; dated Oct. 30, 2013; 9 pages.
AU Examination Report No. 1 for Application No. 2012202954; dated Oct. 30, 2013; 2 pages.
U.S. Notice of Allowance for U.S. Appl. No. 13/586,142; dated Nov. 21, 2013; 7 pages.
CN Reexamination Decision for Application No. 200580009075.5; dated Dec. 5, 2013; 7 pages (w/English translation).
U.S. Notice of Allowance for U.S. Appl. No. 11/557,125; dated Nov. 26, 2013; 7 pages.
U.S. Office Action for U.S. Appl. No. 11/839,412; dated Jan. 10, 2014; 18 pages.
CA Examination Report for App. No. 2,754,756; dated Dec. 30, 2013; 3 pages.
U.S. Office Action for U.S. Appl. No. 13/616,414; dated Jan. 17, 2014; 11 pages.
U.S. Office Action for U.S. Appl. No. 13/849,690; dated Jan. 14, 2014; 13 pages.
CA Examination Report for App. No. 2,596,474; dated Dec. 17, 2013; 2 pages.
NZ Examination Report for App. No. 618654; dated Dec. 20, 2013; 2 pages.
EP Examination Report for App. No. 06786486.8; dated Jan. 16, 2014; 5 pages.
EP Examination Report for App. No. 06786483.5; dated Jan. 16, 2014; 5 pages.
U.S. Final Office Action for U.S. Appl. No. 13/561,299; 23 pages; dated Feb. 6, 2014.
"Probability, Odds, and Random Chance", Problem Gambling Institute of Ontario, retrieved from Internet on Jan. 27, 2014 <http://www.problemgambling.ca/en/resourcesforprofessionals/pages/probabilityoddsandrandomchance.aspx>.
"Changing Probability to Odds", Math Magic, retrieved from Internet on Jan. 27, 2014 <http://www.mathmagic.com/probability/prob_to_odds.htm>.
"Craps From Wikipedia, the free encyclopedia", Wikipedia, retrieved from Internet on Jan. 27, 2014 <http://en.wikipedia.org/wikilCraps#8et_odds_and_summary>.
JP Office Action for App. No. 2012-117867; 5 pages; dated Jan. 7, 2014 (w/English translation).
U.S. Notice of Allowance for U.S. Appl. No. 11/683,476; dated Feb. 10, 2014; 7 pages.
EP Office Action for Application No. 06786488.4; dated Jan. 27, 2014; 7 pages.
Bahl and Padmanabhan, 2000, "RADAR: An In-Building RF-based User Location and Tracking System", Microsoft Research, p. 775-784.
U.S. Office Action for U.S. Appl. No. 11/686,354; dated Feb. 25, 2014; 10 pages.
AU Examination Report No. 1 for App. No. 2012258503; dated Feb. 24, 2014; 2 pages.
U.S. Final Office Action for U.S. Appl. No. 13/616,356; dated Mar. 6, 2014; 13 pages.
CA Examiners Report for App. No. 2,612,895; dated Feb. 24, 2014; 4 pages.
U.S. Office Action for U.S. Appl. No. 12/792,361; dated Mar. 7, 2014; 13 pages.
EP Decision to Refuse a European Patent for App. No. 07871467.2; dated Mar. 3, 2014; 20 pages.
CA Examiners Report for App. No. 2,669,836; dated Feb. 24, 2014; 2 pages.
U.S. Office Action for U.S. Appl. No. 13/557,395; dated Mar. 17, 2014; 10 pages.
CN Office Action for App. No. 200580009075.5; dated Mar. 26, 2014; 6 pages.
JP Office Action for App. No. 2012-208520; dated Mar. 18, 2014; 6 pages (w/English translation).
JP Office Action for App. No. 2012-225339; dated Mar. 25, 2014; 5 pages (w/English translation).

(56) References Cited

OTHER PUBLICATIONS

AU Examination Report for App. No. 2011289295; dated May 1, 2014; 5 pages.
U.S. Final Office Action for U.S. Appl. No. 13/616,535; dated May 8, 2014; 8 pages.
U.S. Final Office Action for U.S. Appl. No. 13/616,492; dated May 15, 2014; 36 pages.
U.S. Final Office Action for U.S. Appl. No. 11/559,933; dated May 21, 2014; 38 pages.
U.S. Final Office Action for U.S. Appl. No. 13/616,588; dated May 21, 2014; 31 pages.
U.S. Notice of Allowance for U.S. Appl. No. 13/615,440; dated May 12, 2014; 7 pages.
JP Final Notification for Reasons for Refusal for App. No. 2009-506743; dated May 7, 2014; 4 pages (w/English translation).
U.S. Notice of Allowance for U.S. Appl. No. 13/616,535; dated May 30, 2014; 11 pages.
AU Examination Report No. 1 for App. No. 2012241133; dated Jun. 2, 2014; 3 pages.
U.S. Office Action for U.S. Appl. No. 13/615,981; dated Jun. 24, 2014; 13 pages.
U.S. Final Office Action for U.S. Appl. No. 13/180,065; dated Jun. 18, 2014; 13 pages.
CA Examiner's Requisition for Application No. 2,557,209; dated Jun. 25, 2014; 2 pages.
JP Office Action for App. No. 2008-0514097; dated Jun. 3, 2014; 7 pages (w/English translation).
U.S. Office Action for U.S. Appl. No. 12/903,112; dated Jul. 28, 2014; 10 pages.
EP Summons to Attend Oral Hearings for App. No. 06774541.4; dated Aug. 1, 2014; 6 pages.
AU Examination Report for App. No. 2014200947; dated Aug. 14, 2014; 2 pages.
CA Examiner's Requisition for App. No. 2,598,041; dated Jul. 17, 2014; 2 pages.
CA Examiner's Requisition for App. No. 2,754,756; dated Sep. 3, 2014; 3 pages.
EP Preliminary Opinion of the Examining Division for EP App. No. 06774541.4; 4 pages; dated Nov. 10, 2014.
CN Office Action for App. No. 200580009075.5; dated Nov. 15, 2014; 5 pages.
EP Summons to Atten Oral Hearings for App. No. 06774581.0; Nov. 11, 2014; 6 pages.
AU Examination Report No. 1 for App. No. 2013201174; dated Feb. 4, 2015; 5 pages.
CA Examiner's Requisition for App. No. 2623038; dated Jan. 21, 2015; 4 pages.
EP Decision to Refuse a European Patent for App. No. 06774541.4; dated Jan. 26, 2015; 15 pages.
CA Examiner's Requisition for App. No. 2,669,836; dated Mar. 13, 2015; 4 pages.
CA Examiner's Requisition for App. No. 2,613,362; dated Apr. 1, 2015; 4 pages.
CA Examiners Requisition for App. No. 2,557,209; dated Mar. 31, 2015; 4 pages.
CN Office Action for App No. 200580009075.5; dated May 14, 2015; 4 pages (w/English translation).
JP Office Action for App. No. 2012-117867; dated Apr. 21, 2015; 6 pages (w/English translation).
JP Final Decision for App. No. 2012-208520; dated Apr. 21, 2015; 9 pages (w/English translation).
CA Examiners Requisition for App. No. 2,754,756; dated May 12, 2015; 6 pages.
AU Examination Report No. 1 for App. No. 2013219208; dated May 18, 2015; 4 pages.
NZ First Examination Report for App. No. 706217; dated Apr. 9, 2015; 2 pages.
EP Summons to Attend Oral Hearings for App. No. 08723674.7; dated Jul. 10, 2015; 6 pages.
JP Final Decision for App. No. 2012-225097; dated Jul. 7, 2015; 12 pages (w/English translation).
JP Final Decision for App. No. 2013-165976; dated Jun. 30, 2015; 6 pages (w/English translation).
JP Office Action for App. No. 2012-225339; dated Jun. 30, 2015; 9 pages (w/English translation).
EP Communication for App. No. 07760844.6; dated Jun. 23, 2015; 7 pages.
AU Examination Report No. 2 for App. No. 2012202954; dated Jul. 29, 2015; 4 pages.
US PTO Final Office Action for U.S. Appl. No. 11/685,997; dated Oct. 27, 2011; 15 pages.
US PTO Notice of Allowance for U.S. Appl. No. 11/683,508; dated Dec. 17, 2012; 2 pages.
US PTO Notice of Allowance for U.S. Appl. No. 11/683,508; dated Sep. 18, 2013; 2 pages.
US PTO Notice of Allowance for U.S. Appl. No. 11/683,508; dated Oct. 25, 2012; 16 pages.
CA Examiner's Requisition for App. No. 2,598,041; dated Jul. 28, 2015; 4 pages.
JP Office Action for Application No. 2014-100471 dated Aug. 18, 2015; 6 pages.
AU Patent Examination Report No. 1 for App. No. 2014201396; dated Sep. 15, 2015; 3 pages.
Defendants' Joint Unenforceability and Invalidity Contentions dated Mar. 21, 2017 (51 pages).
IPR Decision for U.S. Pat. No. 9,306,952, Case IPR2017-01333, Nov. 13, 2017 (30 pages).
Patent Owner's Preliminary Response for U.S. Pat. No. 9,306,952, Case IPR2017-01333, dated Aug. 16, 2017 (49 pages).
Petition for Inter Partes Review of U.S. Pat. No. 9,306,952, Case IPR2017-01333, May 1, 2017 (74 pages).
IPR Decision for U.S. Pat. No. 9,355,518, Case IPR2017-01532, Dec. 13, 2017 (29 pages).
Patent Owner's Preliminary Response for U.S. Pat. No. 9,355,518, Case IPR2017-01532, daed Sep. 19, 2017 (27 pages).
Petition for Inter Partes Review of U.S. Pat. No. 9,355,518, Case IPR2017-01532, Jun. 8, 2017 (74 pages).
ImagiNation—OnLine Games, 1995, 58 pages.
ImagiNation, 1993 ImagiNation Network—A Quick Guide to Using Your Imagination, 16 pages.
ImagiNation Network [R] General Documentation (INN), 27 pages.
Byte Magazine, Mar. 1984, vol. 9, No. 3 (552 pages).
IBM Technical Reference, 1st Ed. Revised, Nov. 1983 (572 pages).
IBM PC Jr. Advertising Booklet, 1983, 14 pages.
IBM PC Jr. Order Form, Nov. 1983, 2 pages.
Sierra 3-D Animated Adventure Game Reference Card for MS DOS, 1987 (4 pages).
Leisure Suit Larry in the Land of the Lounge Lizards Manual, Jun. 4, 1987, 13 pages.
Electronic Gaming Monthly, No. 89, Dec. 1996 (352 pages).
Wireless Pro Fighter 8 Box Cover (1 page), Dec. 1996.
Naki Wireless Pro Fighter 8 controller (1 page), Dec. 1996.
Sega Saturn Instruction Manual (24 pages), May 11, 1995.
Sega Saturn Overview Manual (67 pages), Jun. 27, 1995.
Sega Saturn Overview Manual unlocked (67 pages), Jun. 27, 1995.
Sega Saturn Introduction Manual (10 pages), Jun. 27, 1995.
Game FAQs: Tokimeki Memorial: Forever With You, Dec. 13, 1996 (17 pages).
How to get the most out of CompuServe, Charles Bowen and David Peyton, 1986 (58 pages).
Alfred Glossbrenner's Master Guide to Compuserve, 1987 (25 pages).
CompuServe Information Service Users Guide, Sep. 1986 (42 pages).
The Official Guide to the Prodigy Service, John L. Vierscas, 1998 (77 pages).
Wireless Gaming Makes Strides in Nevada by Libe Goad, PCMag.com, Jun. 9, 2005 (3 pages).
Guinn gives OK to wireless gaming devices in casinos by Elizabeth White, Las Vegas Sun, Jun. 2, 2005 (8 pages).
Welcome to Cantor Casino, Wayback machine, Oct. 2005 (1 page).

(56) References Cited

OTHER PUBLICATIONS

Hand-held devices next wave in gaming, The Times, Aug. 12, 2005 (1 page).
Rolling the dice, Casinos ready to put their money on wireless gaming devices, The Journal News, Nov. 14, 2005 (2 pages).
Nevada Oks gambling on the go, The Courier Journal, Apr. 2, 2006 (1 page).
Devices could bring mobile gaming to casinos, Reno Gazette-Journal, Mar. 24, 2006 (2 pages).
Regulators approve wireless device by Ryan Randazzo, Reno Gazette Journal, Aug. 25, 2006.
Nevada Gaming Commission Mobile Gaming Policies, May 18, 2006 (5 pages).
Handheld gambling devices will show up soon in casinos by the Associated Press in the Florida Today Newspaper Aug. 3, 2005 (1 page).
Cantor Fitzgerald Press Release—Cantor Fitzgerald Launches Cantor Casino and Cantor Gaming, Sep. 29, 2005 (2 pages).
Coming to a Nevada casino soon: Playing the slots wirelessly, by the New York Times in the Arizona Republic Newspaper—Fox Butterfield, Jul. 4, 2005 (1 page).
Minutes of the Meeting on the Assembly Committee on Judiciary, Seventy-Third Session, Apr. 8, 2005 (42 pages).
O2 and Cantor Index bring gambling to PDAs by Jo Best of ZDNet, Sep. 3, 2003 (6 pages).
Stocking fillers by Ashley Norton of the Guardian, Sep. 20, 2003 (5 pages).
O2 XDA II Coming November by Fabrizio Pilato of Mobile Mag, Oct. 23, 2003 (6 pages).
Securities and Exchange Commission—The XDA II from O2 Corners a Third of the Market in First Six Months Jul. 15, 2004 (3 pages).
Final Notice to Cantor Index Limited from the Financial Services Authority, dated Dec. 30, 2004 (13 pages).
Handheld devices can be used for games in Casino public areas by the Associated Press in NBC News, Mar. 24, 2006 (2 pages).
Nevada approves new mobile gambling rules, GMA News Online, Mar. 24, 2006 (5 pages).
Legalized Gambling as a Strategy for Economic Development by Robert Goodman Mar. 1994 (225 pages.
New York Times—Two inventors contend that the V-chip is an idea they've seen before—in their own patent.—By Teresa Riordan Oct. 28, 1996 (4 pages).
Wireless ATM & Ad-Hoc Networks by C-K Toh, Dec. 31, 1996 (23 pages).
PC Mag—Wireless Gaming Makes Strides in Nevada, Jun. 9, 2005 (3 pages).
The Times Money, Hanld-held devices next wave in gaming, Aug. 12, 2005 (1 page).
AOL—The Official America Online Tour Guide for Windows 3.1, 1996 Tom Lichty, Jul. 1996 (14 pages).
Business Wire—Diamond I Opens Online Interactive Demo of its WifiCasino GS Gaming System, Apr. 27, 2005 (3 pages).
Diamond I PRN Wire Diamond I Comments on Future of Hand-held Gambling Devices in Nevada, Jun. 2, 2005 (4 pages).
Diamond I Rolls the Dice by Naomi Graychase, Feb. 23, 2005 (3 pages).
Diamond I Opens Online Interactive Demo of its WifiCasino GS Gaming System, Business Wire, Apr. 27, 2005 (3 pages).
Diamond I Responds to Inquiries: What is "WifiCasino GS"?, Business Wire, Jan. 27, 2005 (3 pages).
Diamond I Technologies—Products, Wayback Machine, Apr. 29, 2005-Aug. 12, 2007, (2 pages).
Diamond I Technologies—Products, Wayback Machine, Apr. 29, 2005-Jan. 6, 2010, (2 pages).
Kidnet, Kid's Guide to Surfing through Cyberspace by Brad and Debra Schepp—Nov. 1995 (9 pages).
The New York Times—Nintendo and Minnesota Set a Living-Room Lottery Test, Sep. 27, 1991, (4 pages).
The New York Times—Minnesota Cancels Plan to Play Lottery on Nintendo, Oct. 19, 1991 (3 pages).
Case 2:16-cv-00856-RCJ-VCF, Document 1, "Plaintiffs' Complaint for Patent Infringement" filed Apr. 14, 2016 (39 pages).
Case 2:16-cv-00856-RCJ-VCF, Document 19, "Plaintiffs' First Amended Complaint for Patent Infringement", filed Jul. 11, 2016 (57 pages).
Case 2:16-cv-00856-RCJ-VCF, Document 23, "Defendant 888's Motion to Dismiss Plaintiffs First Amended Complaint Under Fed. R. Civ. P. 12(B)(6)", filed Aug. 12, 2016 (22 pages).
Case 2:16-cv-00856-RCJ-VCF, Document 26, "Defendant's Notice of Joinder to Motions to Dismiss in Related Cases", filed Aug. 12, 2016 (4 pages).
Case 2:16-cv-00856-RCJ-VCF, Document 36, "Plaintiffs' Opposition to 888 Holdings PLC's Motion to Dismiss", filed Sep. 8, 2016 (32 pages).
Case 2:16-cv-00856-RCJ-VCF, Document 37, "Index of Exhibits to Plaintiffs' Opposition to Defendant's Motion to Dismiss" filed Sep. 8, 2016 (3 pages).
Case 2:16-cv-00856-RCJ-VCF, Document 45, Defendant 888's Reply in Support to Dismiss Plaintiffs' First Amended Complaint Under Fed. R. Civ. P. 12(B)(6), filed Sep. 26, 2016 (19 pages).
Case 2:16-cv-00856-RCJ-VCF, Document 46, Defendant 888's Reply in Support of Motion to Dismiss Plaintiffs' First Amended Complaint Under Fed. R. Civ. P. 12(B)(6), filed Sep. 26, 2016.
Case 2:16-cv-00856-RCJ-VCF, Document 54, "Order", filed Dec. 6, 2016 (8 pages).
Case 2:16-cv-00856-RCJ-VCF, Document 57, "Defendant 888's Holdings PLC's Answer to Plaintiffs' First Amended Complaint", filed Jan. 18, 2017 (67 pages).
Case 2:16-cv-00857-APG-VCF, Document 1, "Plaintiffs' Complaint for Patent Infringement" filed Apr. 14, 2016 (29 pages).
Case 2:16-cv-00857-RCJ-VCF, Document 27, "Defendant Big Fish Games, Inc.'s Motion to Dismiss", filed Jun. 17, 2016 (30 pages).
Case 2:16-cv-00857-RCJ-VCF, Document 32, "[Corrected] Defendant Big Fish Games, Inc.'s Motion to Dismiss", filed Jul. 8, 2016 (30 pages).
Case 2:16-cv-00857-RCJ-VCF, Document 33, "Plaintiffs' Opposition to Big Fish Games, Inc.'s Motion to Dismiss", filed Jul. 25, 2016 (32 pages).
Case 2:16-cv-00857-RCJ-VCF, Document 34, "Reply in Support of Defendant Big Fish Games, Inc.'s Motion to Dismiss", filed Aug. 4, 2016 (17 pages).
Case 2:16-cv-00857-RCJ-VCF, Document 36, "Order" filed Aug. 29, 2016 (29 pages).
Case 2:16-cv-00857-RCJ-VCF, Document 37, "Plaintiffs' First Amended Complaint for Patent Infringement", filed Sep. 28, 2016 (38 pages).
Case 2:16-cv-00857-RCJ-VCF, Document 39, "Defendant Big Fish Games, Inc.'s Motion to Dismiss Plaintiffs' First Amended Complaint", filed Oct. 12, 2016 (17 pages).
Case 2:16-cv-00857-RCJ-VCF, Document 45, "Plaintiffs' Opposition to Big Fish Games, Inc.'s Motion to Dismiss", filed Oct. 31, 2016 (22 pages).
Case 2:16-cv-00857-RCJ-VCF, Document 49, "Reply in Support of Defendant Big Fish Games, Inc.'s Motion to Dismiss", filed Nov. 10, 2016 (16 pages).
Case 2:16-cv-00857-RCJ-VCF, Document 59, "Order", filed Jan. 4, 2017 (9 pages).
Case 2:16-cv-00857-RCJ-VCF, Document 60, "Defendant Big Fish Games, Inc.'s Answer to First Amended Complaint", filed Jan. 19, 2017 (17 pages).
Case 2:16-cv-00871-JAD-VCF, Document 1, "Plaintiffs' Complaint for Patent Infringement" filed Apr. 15, 2016 (39 pages).
Case 2:16-cv-00871-JAD-VCF, Document 23, "Plaintiffs' First Amended Complaint for Patent Infringement" filed Jul. 11, 2016 (57 pages).
Case 2:16-cv-00871-JAD-VCF, Document 31, "Motion to Dismiss Under 35 U.S.C. §101" filed Aug. 12, 2016 (16 pages).
Case 2:16-cv-00871-RCJ-VCF, Document 35, "Plaintiffs' Opposition to Defendants' Motion to Dismiss" filed Sep. 8, 2016 (25 pages).

(56) References Cited

OTHER PUBLICATIONS

Case 2:16-cv-00871-RCJ-VCF, Document 40, "Reply in Support of Motion to Dismiss Under 35 U.S.C. §101" filed Sep. 26, 2016 (14 pages).
Case 2:16-cv-00871-RCJ-VCF, Document 42, "Order" filed Oct. 18, 2016 (15 pages).
Case 2:16-cv-00871-RCJ-VCF, Document 46, "Motion for Reconsideration" filed Oct. 31, 2016 (7 pages).
Case 2:16-cv-00871-RCJ-VCF, Document 47, Motion to Dismiss Under Fed. R. Civ. P. 12(B)(6) filed Nov. 1, 2016 (7 pages).
Case 2:16-cv-00871-RCJ-VCF, Document 49, "Plaintiffs' Opposition to Defendants' Motion for Reconsideration", filed Nov. 17, 2016 (11 pages).
Case 2:16-cv-00871-RCJ-VCF, Document 50, "Plaintiffs' Opposition to Defendants' Motion to Dismiss", filed Nov. 17, 2016 (12 pages).
Case 2:16-cv-00871-RCJ-VCF, Document 55, Reply in Support of Defendants' Motion to Dismiss Under Fed. R. Civ. P. 12(B)(6), filed Nov. 30, 2016 (6 pages).
Case 2:16-cv-00871-RCJ-VCF, Document 56, "Reply in Support of Motion for Reconsideration" filed Nov. 30, 2016 (7 pages).
Case 2:16-cv-00871-RCJ-VCF, Document 63, "Order" filed Jan. 4, 2017 (10 pages).
Case 2:16-cv-00871-RCJ-VCF, Document 64, "Bwin's Answer to Plaintiffs' First Amended Complaint" filed Jan. 6, 2017 (15 pages).
Case 2:16-cv-00858-MMD-GWF, Document 1, "Plaintiffs' Complaint for Patent Infringement" filed Apr. 14, 2016 (30 pages).
Case 2:16-cv-00858-RCJ-VCF, Document 19, "Defendant Double Down Interactive LLC's Motion to Dismiss", filed Jun. 7, 2016 (32 pages).
Case 2:16-cv-00858-RCJ-VCF, Document 30, "Plaintiffs' Opposition to Double Down's Motion to Dismiss", filed Jul. 8, 2016 (31 pages).
Case 2:16-cv-00858-RCJ-VCF, Document 51, "Reply in Support of Defendant Double Down Interactive LLC's Motion to Dismiss", filed Jul. 18, 2016 (14 pages).
Case 2:16-cv-00858-RCJ-VCF, Document 58, "Plaintiffs' First Amended Complaint for Patent Infringement", filed Sep. 28, 2016 (38 pages).
Case 2:16-cv-00858-RCJ-VCF, Document 63, "Defendant Double Down Interactive LLC's Motion to Dismiss Plaintiffs' First Amended Complaint for Patent Infringement", Oct. 17, 2016 (31 pages).
Case 2:16-cv-00858-RCJ-VCF, Document 69, "Plaintiffs' Opposition to Double Down Interactive, Inc.'s Motion to Dismiss", filed Nov. 3, 2016 (24 pages).
Case 2:16-cv-00858-RCJ-VCF, Document 76, "Defendant Double Down Interactive LLC's Reply in Support of Motion to Dismiss Plaintiffs' First Amended Complaint for Patent Infringement", filed Nov. 14, 2016 (18 pages).
Case 2:16-cv-00858-RCJ-VCF, Document 83, "Defendant Double Down Interactive LLC's Answer, Defenses, and Counterclaims to Plaintiffs' First Amended Complaint for Patent Infringement", filed Jan. 18, 2017 (19 pages).
Case 2:16-cv-00858-RCJ-VCF, Document 84, "Plaintiffs' Answer to Double Down Interactive LLC's Counterclaims Against CG Technology Development, LLC", filed Feb. 8, 2017 (4 pages).
Case 2:16-cv-00781-RFB-CWH, Document 1, "Plaintiffs' Complaint for Patent Infringement" filed Apr. 7, 2016 (33 pages).
Case 2:16-cv-00781-MMD-CWH, Document 29, "Plaintiffs' First Amended Complaint for Patent Infringement" filed Jun. 13, 2016 (42 pages).
Case 2:16-cv-00781-MMD-CWH, Document 37, "Defendant's Motion to Dismiss Plaintiffs' Amended Complaint Under Fed.R. Civ. P. 12(B)(6)" filed Jul. 29, 2016 (38 pages).
Case 2:16-cv-00781-MMD-CWH, Document 44, "Defendant's Motion for Protective Order Staying Discovery Pending Ruling on Motion to Dismiss" filed Aug. 22, 2016 (12 pages).
Case 2:16-cv-00781-MMD-CWH, Document 45, "Plaintiffs' Opposition to DraftKings, Inc.'s Motion to Dismiss" filed Aug. 24, 2016 (38 pages).
Case 2:16-cv-00781-MMD-CWH, Document 50, "Plaintiffs' Opposition to DraftKings, Inc.'s Motion to Stay" filed Sep. 8, 2016 (12 pages).
Case 2:16-cv-00781-MMD-CWH, Document 57, "Defendant's Reply in Support of it's Motion to Dismiss Plaintiffs' Amended Complaint Under Fed. R. Civ. P. 12(B)(6)" filed Sep. 26, 2016 (19 pages).
Case 2:16-cv-00781-MMD-CWH, Document 59, "Order" filed Sep. 27, 2016 (3 pages).
Case 2:16-cv-00781-RCJ-VCF, Document 64, "Plaintiffs" Motion to Lift Stay filed Nov. 23, 2016 (6 pages).
Case 2:16-cv-00781-RCJ-VCF, Document 69, "Order" filed Dec. 12, 2016 (11 pages).
Case 2:16-cv-00781-RCJ-VCF, Document 72, "DraftKings' Answer to Plaintiffs' First Amended Complaint and Affirmative Defenses" filed Dec. 27, 2016 (29 pages).
Case 2:16-cv-00801-JCM-VCF, Document 1, "Plaintiffs' Complaint for Patent Infringement" filed Apr. 8, 2016 (31 pages).
Case 2:16-cv-00801-RCJ-VCF, Document 31, "Plaintiffs' First Amended Complaint for Patent Infringement" filed Jun. 13, 2016 (48 pages).
Case 2:16-cv-00801-RCJ-VCF, Document 32, "Index of Exhibits to Plaintiffs' First Amended Complaint for Patent Infringement" filed Jun. 13, 2016 (3 pages).
Case 2:16-cv-00801-RCJ-VCF Document 44, "Defendant Fanduel, Inc's Motion to Dismiss for Failure to State a Claim Upon Which Relief Can be Granted" filed Jul. 14, 2016 (18 pages).
Case 2:16-cv-00801-RCJ-VCF Document 75, "Defendant Fanduel, Inc's Motion for Leave to Supplement Briefing Under LR 7-2(g)" filed Sep. 22, 2016 (3 pages).
Case 2:16-cv-00801-RCJ-VCF Document 77, "Plaintiffs' Opposition to Defendant Fanduel, Inc.'s Motion for Leave [ECF No. 75]" filed Oct. 11, 2016 (4 pages).
Case 2:16-cv-00801-RCJ-VCF Document 81, "Defendant Fanduel Inc.'s Notice of Withdrawal of Motion Seeking Leave to File Supplemental Briefing" filed Oct. 20, 2016 (3 pages).
Case 2:16-cv-00801-RCJ-VCF Document 86, "Plaintiffs' Second Amended Complaint for Patent Infringement" filed Nov. 16, 2016 (70 pages).
Case 2:16-cv-00801-RCJ-VCF Document 87, "Defendant Fanduel's Answer to Plaintiffs' Second Amended Complaint and Affirmative Defenses" filed Nov. 30, 2016 (19 pages).
Case 2:16-cv-00801-RCJ-VCF Document 88, "Defendant's Partial Motion to Dismiss CGT's Second Amended Complaint for Failure to State a Claim Upon Which Relief Can Be Granted" filed Nov. 30, 2016 (14 pages).
Case 2:16-cv-00801-RCJ-VCF Document 94, "Plaintiffs' Opposition to Fanduel, Inc.'s Partial Motion to Dismiss" filed Dec. 19, 2016 (11 pages).
Case 2:16-cv-00801-RCJ-VCF Document 103, "Fanduel, Inc.'s Reply in Support of Partial Motion to Dismiss" filed Dec. 27, 2016 (7 pages).
Case 2:16-cv-00801-RCJ-VCF Document 113, "Order" filed Jan. 4, 2017 (11 pages).
Case 2: 16-cv-801-RCJ-VCF Document 114, "Transcript of Pretrial Conference" filed Dec. 2, 2016 (54 pages).
AU Examination Report for AU Application No. 2007319235; dated Jul. 6, 2010; 2 pages.
AU Notice of Acceptance for Application No. 2012201974; dated Apr. 2, 2015; 2 pages.
AU 1st examination report for AU Application No. 2015203832; dated May 5, 2016; 5 pages.
AU Examination Report for Application No. 2015203832; dated Apr. 27, 2017; 4 pages.
AU First Exam Report for Application No. 2017202909 dated Feb. 20, 2018; 3 pages.
CA Examiners Report for App. No. 2,669,836; dated Nov. 22, 2011; 6 pages.
CA Notice of Allowance for App. No. 2,669,836; dated Apr. 6, 2016; 1 page.
CA Exam Report for Application No. 2928614 dated Aug. 30, 2017.
CA Exam Report for Application No. 2,928,614 dated Jul. 17, 2018; 8 pages.

(56) References Cited

OTHER PUBLICATIONS

NZ Examination Report for NZ Application No. 577177; dated Dec. 17, 2010; 2 pages.
UK Office Action for Application No. 0910202.1 dated Dec. 21, 2010; 7 pages.
NZ Examination Report for NZ Application No. 600525; dated Jun. 14, 2012; 2 pages.
JP Office Action for App. No. 2014-100471; dated Apr. 12, 2016; 4 pages (w/English translation).
JP Office Action for Application No. 2017-075936; dated May 1, 2018; 6 pages (w/English Translations).
NZ Examination Report for App. No. 618654; dated Apr. 9, 2015; 2 pages.
NZ Notice of Acceptance for App. No. 706217; dated Jan. 21, 2016; 1 page.
AU Exam Report for Application No. 2006269416 dated Jun. 10, 2009; 4 pages.
AU Notice of Acceptance for Application No. 2006269416 dated Mar. 9, 2011; 3 pages.
AU Notice of Acceptance for Application No. 2011203051 dated Aug. 28, 2012; 3 pages.
AU Exam Report for Application No. 2015258347 dated Nov. 11, 2016; 3 pages.
CA Examiners Report for App. No. 2,613,335 dated May 29, 2010; 3 pages.
CA Notice of Allowance for App. No. 2,613,335 dated Apr. 4, 2011; 1 page.
CA Examiners Report for App. No. 2,754,756 dated Apr. 26, 2017; 10 pages.
CA Examiners Report for App. No. 2,754,756 dated May 24, 2018; 11 pages.
"An experimental comparison of secret-based user authentication technologies", Irakdeous et al.—Information Management & Computer Security, 2002, 1, 2/3 ABI/Inform Global, pp. 100-108.
EP Summons to Attend Oral Hearings for Application No. 06786486.8 dated Jun. 7, 2017; 5 pages.
JP Office Action for App. No. 2008-520391 dated Feb. 1, 2011; 7 pages (w/English translation).
JP Office Action for App. No. 2012-225097 dated Mar. 25, 2014; 12 pages (w/English translation).
JP Notice of Allowance for App. No. 2012-225097 dated Jul. 7, 2015; 4 pages (w/English translation).
Front Mission Online playing manual 2005, Square Enix, accepted by the Japanese Patent Office dated May 13, 2005, p. 017.
Final Fantasy XI phantom of Jirart for Windows playing manual 2005, Square Enix, accepted by the Japan Patent Office dated Mar. 31, 2005, p. 029.
JP Office Action for App. No. 2015-218973 dated Dec. 6, 2016; 13 pages (w/English translation).
JP Office Action for App. No. 2015-218973 dated Nov. 28, 2017; 10 pages (w/English translation).
JP Decsion of Refusal for App. No. 2015-218973 dated Jun. 19, 2018; 4 pages (w/English translation).
JP Reconsideration Report for App. No. 2015-218973 dated Nov. 5, 2018; 6 pages (w/English translation).
AU Examination Report for AU Application no. 2006269413; 2 pages; dated Apr. 29, 2009.
Notice of Acceptance for AU Application No. 2006269413 dated Feb. 7, 2011; 3 pages.
CA Examination Report for CA Application No. 2613333; dated Aug. 30, 2010; 4 pages.
JP Office Action for Application No. 2008-520389; dated Jan. 18, 2011; 6 pages total with English Translation.
JP Office Action for Application No. 2013-165976; dated Sep. 9, 2014; 5 pages.
JP Office Action for Application No. 2013-165976; dated May 16, 2017; 14 pages.
JP Office Action for App. No. 2015-214615; dated Dec. 13, 2016; 13 pages (w/English translation).
JP Final Decision for Application No. 2015-214615; dated Aug. 29, 2017; 11 pages (w/English Translations).
JP Office Action for App. No. 2017-207806; dated Sep. 25, 2018; 4 pages w/English Translations.
AU Examination Report for AU Application No. 2006269418; 2 pages; dated Oct. 27, 2009.
Notice of Acceptance for AU Application No. 2006269418 dated Apr. 8, 2010; 3 pages.
AU First Examination Report for Application No. 2016253623; dated Dec. 4, 2017; 5 pages.
Canadian Examination Report for CA Application No. 2613338; 4 pages; dated Oct. 5, 2009.
Canadian Notice of Allowance for CA Application No. 2613338; 1 page; dated Sep. 18, 2013.
JP Office Action for Application No. 2008-520393; dated Jan. 24, 2011; 8 pages total with English Translation.
Examination Report for AU Application No. 2006269420; 2 pages; dated May 27, 2009.
Notice of Acceptance for AU Application No. 2006269420; 3 pages; dated May 3, 2010.
AU examination report for Application No. 2015213331; dated Aug. 18, 2016; 5 pages.
AU Notice of Acceptance for Application No. 2015213331; dated Jun. 22, 2017; 3 pages.
AU First Exam Report for Application No. 2017203279 dated May 22, 2018; 6 pages.
Canadian Examination Report for CA Application No. 2613362; 4 pages; dated Oct. 13, 2009.
CA Examiner's Report for App. No. 2613362; dated May 3, 2016; 6 pages.
CA Examiners Report for Application No. 2613362; dated Jun. 15, 2017; 4 pages.
CA Exam Report for Application No. 2613362 dated May 18, 2018, dated May 18, 2018; 4 pages.
CA Exam Report for Application No. 2,988,194 dated Sep. 27, 2018; 4 pages.
CA Exam Report for Application No. 2,988,189 dated Sep. 27, 2018; 4 pages.
CA Exam Report for Application No. 2,988,180 dated Sep. 27, 2018; 4 pages.
JP Office Action for Application No. 2008-520395; dated Feb. 1, 2011; 4 pages total with English Translation.
Personal authentication through biometric technologies, Podio et al, IEEE 2002.
Digital chips for an on-line casino, Castell'a-Roca et al, IEEE 2005.
Australian Examination Report for Application No. 2011289295 dated Jan. 6, 2016, 3 pages.
Australian Notice of Acceptance for Application No. 2011289295 dated Jan. 30, 2016, 3 pages.
AU Exam Report for Application No. 2016202914 dated Apr. 10, 2017, 3 pages.
AU Notice of Acceptance for Application No. 2016202914 dated Aug. 1, 2017, 3 pages.
AU First Examiners Report for Application No. 2017258830 dated Nov. 20, 2018; 3 pages.
Canadian Examination Report for Application No. 2,808,315 dated Mar. 1, 2017, 4 pages.
Canadian Notice of Allowance for Application No. 2,808,315 dated Jan. 10, 2018, 1 page.
European Extended Search Report for Application No. 11817104.0 dated Sep. 25, 2015, 9 pages.
European Office Action for Application No. 11817104.0 dated Oct. 20, 2016, 8 pages.
European Summons to Attend Oral Hearings for Application No. 11817104.0 mailed Feb. 23, 2018, 14 pages.

\* cited by examiner

SYSTEM AND METHOD FOR PEER-TO-PEER WIRELESS GAMING

TECHNICAL FIELD

The present invention relates generally to the field of gaming and, more particularly to a gaming system and method incorporating a wireless network.

BACKGROUND

The gaming industry allows people to participate in a variety of gaming activities within the limits of state and federal law. Possible gaming activities include gambling, such as that provided by casinos. Casino-type gambling activities include, but are not limited to, slot machines, table games, keno, and other gaming activities that allow for the placement of bets. In many of these gaming activities, multiple players participate in a single game in competition against the "house." In other gaming activities, participants may compete against each other. Such gaming activities may include poker and wagering on events that may include, for example, sporting events, such as horse or auto racing, and athletic competitions such as football, basketball, baseball, boxing, and golf. In a casino environment, participants in non-wagering games and events, such as prize drawings, similarly compete against each other. The participation in such gaming activities is generally limited by the participants' physical locations. For example, participants in casino-type gambling activities must be present at a gaming table within the casino in order to place bets and receive dealt cards.

SUMMARY

Various embodiments of the invention are directed to gaming systems, which may be wireless gaming systems. According to certain embodiments, the gaming system is operable to make various gaming activities available to one or more users over a communications network and to display information associated with the activities to the users on gaming devices. The gaming devices may be mobile communication devices. Gaming activities may include any activities referred to or contemplated herein and are not limited to games. Gaming activities can include, for example, games, gambling activities, sporting events, purchase of goods or services, and accessing concierge services.

In accordance with an example embodiment, a gaming system includes a controlled-access data network in electronic communication with a plurality of gaming devices. The system also includes a processor in communication with the data network. The processor provides a gaming service to the plurality of gaming devices to enable at least two of the plurality of gaming devices to interactively participate in a gaming activity.

In accordance with another example embodiment, a method for providing peer-to-peer gaming is included. The method includes steps. One step may include providing a controlled-access data network in electronic communication with a plurality of gaming devices. The data network is used to provide a gaming service to the plurality of gaming devices. A second step may include enabling at least two of the plurality of gaming devices to interactively participate in a single gaming activity.

In accordance with another example embodiment, software provides peer-to-peer wireless gaming. The software operates to use a controlled-access data network in electronic communication with a plurality of gaming devices to provide a gaming service to the plurality of gaming devices. The software also operates to enable at least two of the plurality of gaming devices to interactively participate in a single gaming activity.

Various embodiments of the present invention may benefit from numerous advantages. It should be noted that one or more embodiments may benefit from some, none, or all of the advantages discussed below.

One advantage is that the system enables peer-to-peer gaming between multiple users at disparate locations. Such users may interactively participate in a common gaming activity using remote gaming devices. Accordingly, a telecommunications service provider may offer enhanced gaming services to pre-existing customers. Thus, another advantage may be that gaming participants may use devices, such as cell phones and/or PDAs, to place bets or other wagers and to perform other gaming activities. Still another advantage may be that the system allows a user of a gaming device to play multiple player positions in a single gaming activity. For example, a user of a gaming device may simultaneously play multiple hands of blackjack in a single blackjack game. Still another advantage may be that the system allows a user of a gaming device to play multiple player positions during a gaming activity. For example, a user of a gaming device may simultaneously play multiple hands of blackjack.

Another advantage may be that the system allows for the maintenance of a buddy network between users of gaming devices. In particular embodiments, members within a buddy network may use gaming devices to communicate with one another and/or seek group participation in a common gaming activity. Another advantage may be that the system uses location verification techniques to provide location information associated with members of the group to other members of the group. For example, a first member of a buddy network may receive location information on his PDA, and the location information may identify that another member of the group is nearby.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION

Figure 1:
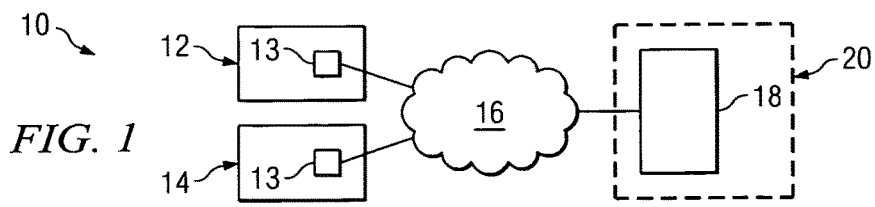
FIG. 1 illustrates a gaming system according to an embodiment of the present invention.

A gaming system enables participants to engage in gaming activities from remote and/or mobile locations. The possible gaming activities include gambling, such as that provided by casinos. Gambling activities may include any casino-type gambling activities including, but not limited to, slot machines, video poker, table games (e.g., craps, roulette, blackjack, pai gow poker, Caribbean stud poker, baccarat, etc), the wheel of fortune game, keno, sports betting, horse racing, dog racing, jai alai, and other gambling activities. The gaming activities can also include wagering on any type of event. Events can include, for example, sporting events, such as horse or auto racing, and athletic competitions such as football, basketball, baseball, boxing, golf, etc. Events can also include such things that do not normally involve wagering. Such events may include, without limitation, political elections, entertainment industry awards, and box office performance of movies. Gaming can also include non-wagering games and events. For example, gaming can include prize contests or lotteries or lottery-type activities such as state and interstate lotteries. These can include all forms of number-selection lotteries, "scratch-off" lotteries, and other lottery contests.

The gaming system may be implemented over a communications network such as a cellular network or a private wireless and/or wireline network. The communications network may include licensed or license-exempt technologies or a combination thereof. Examples of private wireless networks include WiFi and WiMax networks. In one embodiment, the gaming system communications network is entirely independent of the Internet. In another embodiment, the gaming system operation makes minimal use of the Internet, such that only information for which there are no security issues is transmitted via the Internet and/or information may be encrypted. Preferably, the communications network enables players to participate in gaming from remote locations (e.g., outside of the gaming area of a casino). Also, the system may enable players to be mobile during participation in the gaming activities. Preferably, the system has a location verification or determination feature, which is operable to permit or disallow gaming from the remote location depending upon whether or not the location meets one or more criteria. The criterion may be, for example, whether the location is within a pre-defined area in which gaming is permitted by law. Local and federal laws and/or regulations may also influence the type of network topology used by the gaming system.

According to certain embodiments, gaming services enable peer-to-peer wireless gaming. Specifically, the system may enable multiple players to participate in the same gaming activity at the same time from dispersed locations. This may be particularly desirable in the case of certain games such as, but without limitation, horse racing, poker, and blackjack. The system may also enable a single player to participate in multiple positions with respect to a particular game. For example, a user may be permitted to play multiple hands of blackjack. Particular aspects include such features as providing assistance to a user in finding a particular activity. For example, a first player may want to play poker at a six-person table. The gaming system may be used to identify such a poker table that has a position available for the first user's participation. Additionally or alternatively, a first player might want to play poker at the same table as a second player, and the system may be configured to assist the first player in finding a game in which the second player is already participating.

Location determination techniques may be incorporated to enable peer-to-peer gaming or related services. For example, a "buddy network" may be established to track members of a selected group. For example, a group of friends might all be in a gambling jurisdiction but be located at various dispersed places within that jurisdiction. The gaming system allows the establishment of a private buddy network of peers for this group of friends. The system enables one or more members of the group to track one or more other members of the group. In particular embodiments, the system may also allow messages from and to one or more group members. For example, the system also allows members to invite other members to participate in certain wireless gaming activities. Additionally or alternatively, the system may allow members of the group to bet on the performance of another member of the group who is participating in a virtual or actual game.

Location determination techniques may also be incorporate to establish an "alert system." The alert system may be used to invite certain types of players to participate in a gaming activity. Criteria may then be used to identify users of gaming devices that meet the criteria. For example, a gaming participant may wish to initiate a gaming activity with other users of gaming devices that qualify as "high rollers" or "high stakes gamers." As other examples, a celebrity user may wish to initiate a gaming activity with other celebrities, or a senior citizen may wish to initiate a gaming activity with other senior citizens. In each instance, the user may identify criteria that may then be used to identify other gaming participants that meet this criteria for the initiation of a peer-to-peer gaming event.

As shown in FIG. 1, for example, gaming system 10 includes at least one user 12. The system may include additional users such that there is at least a first user 12 and a second user 14. Multiple users may access a first gaming system 10, while other multiple users access a second gaming system (not shown) in communication with first gaming system 10. Users 12 and 14 preferably access system 10 by way of a gaming communication device 13. Gaming communication device 13 may comprise any suitable device for transmitting and receiving electronic communications. Examples of such devices include, without limitation, mobile phones, personal data assistants (PDAs), computers, mini-computers, etc. Gaming communication devices 13 transmit and receive gaming information to and from communications network 16. Gaming information is also transmitted between network 16 and a computer 18, such as a server, which may reside within the domain of a gaming service provider 20. The location of computer 18 is not critical, however, and computer 18 may reside adjacent to or remote from the domain of gaming service provider 20. Moreover, in certain embodiments, a gaming service provider is not required. The computer 18 and/or gaming service provider 20 may reside within, adjacent to, or remote from a gaming provider (not shown in FIG. 1). The gaming provider may be an actual controller of games, such as a casino. As an example, a gaming service provider may be located on the grounds of a casino and the computer 18 may be physically within the geographic boundaries of the gaming service provider. As discussed, however, other possibilities exist for remote location of the computer 18 and the gaming service provider 20. Computer 18 may function as a gaming server. Additional computers (not expressly shown) may function as database management computers and redundant servers, for example.

Preferably, software resides on both the gaming communication device 13 and the computer 18. Software resident on gaming communication device 13 is preferably operable to present information corresponding to gaming activities (including gambling and non-gambling activities discussed herein) to the user. The information includes, without limitation, graphical representations of objects associated with the activities, and presentation of options related to the activities and selectable by the user. The gaming communication device software is also preferably operable to receive data from the computer and data input by the user. Software resident on the computer is preferably able to exchange data with the gaming communication device, access additional computers and data storage devices, and perform all of the functions described herein as well as functions common to known electronic gaming systems.

Gaming information transmitted across network 16 may include any information, in any format, which is necessary or desirable in the operation of the gaming experience in which the user participates. The information may be transmitted in whole, or in combination, in any format including digital or analog, text or voice, and according to any known or future transport technologies, which may include, for example, wireline or wireless technologies. Wireless technologies may include, for example, licensed or license-exempt technologies Some specific technologies which may be used include, without limitation, Code Division Multiple Access (CDMA), Time Division Multiple Access (TDMA), Global System for Mobile Communication (GSM), General Packet Radio Service (GPRS), WiFi (802.11x), WiMax (802.16x), Public Switched Telephone Network (PSTN), Digital Subscriber Line (DSL), Integrated Services Digital Network (ISDN), Blue Tooth, or cable modem technologies. These are examples only and one of ordinary skill will understand that other types of communication techniques are within the scope of the present invention. Further, it will be understood that additional components may be used in the communication of information between the users and the gaming server. Such additional components may include, without limitation, lines, trunks, antennas, switches, cables, transmitters, receivers, computers, routers, servers, fiber optical transmission equipment, repeaters, amplifiers, etc.

In at least one embodiment, the communication of gaming information takes place without involvement of the Internet. However, in certain embodiments, a portion of the gaming information may be transmitted over the Internet. Also, some or all of the gaming information may be transmitted partially over an Internet communications path. In certain embodiments, some information is transmitted entirely or partially over the Internet, but the information is either not gaming information or is gaming information that does not need to be maintained secretly. For instance, data that causes a graphical representation of a table game on the user's gaming communication device might be transmitted at least partially over the Internet, while wagering information transmitted by the user might be transmitted entirely over a non-Internet communications network.

Figure 9:
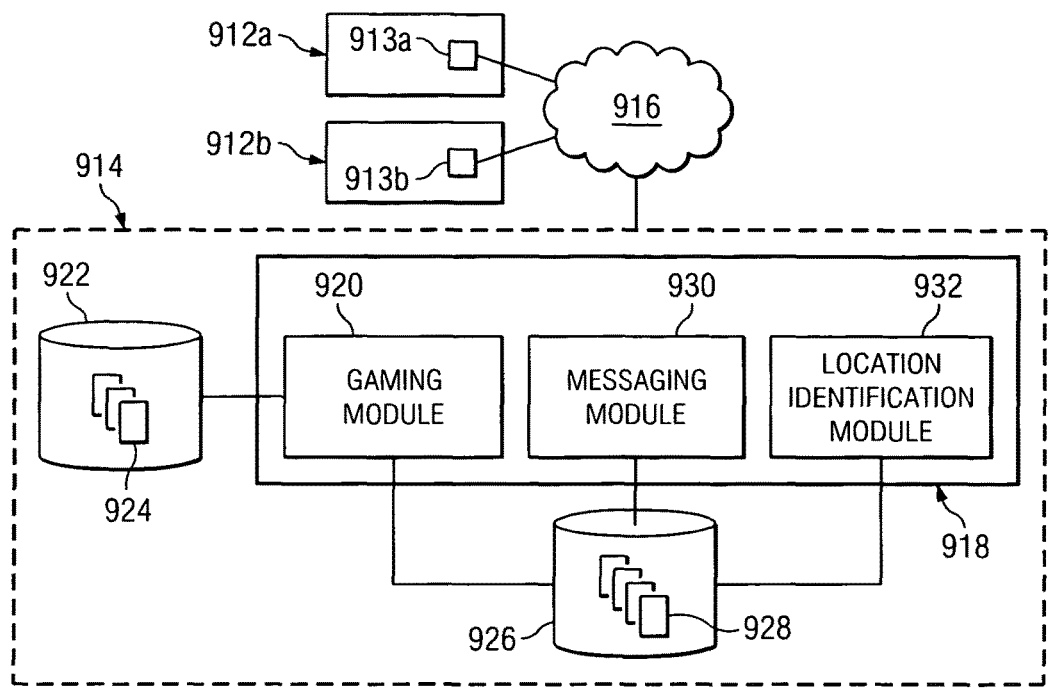
FIG. 9 illustrates a peer-to-peer wireless gaming system in accordance with an embodiment of the present invention.
Figure 10:
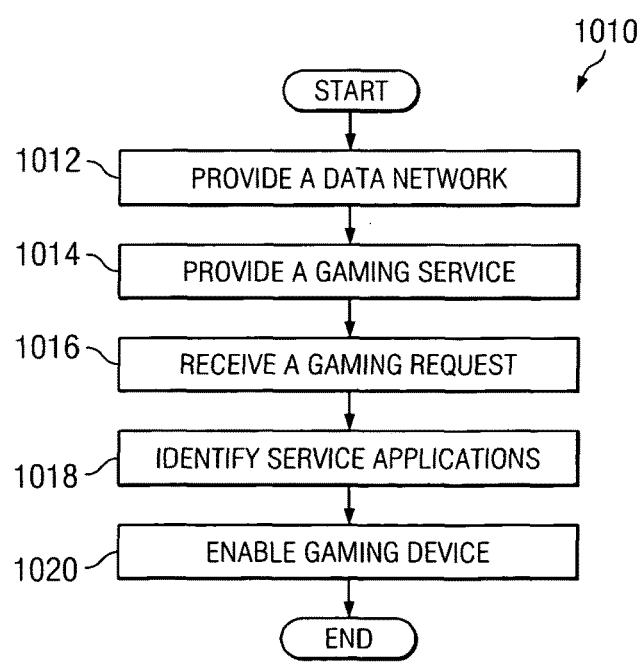
FIG. 10 illustrates a method for providing peer-to-peer wireless gaming in accordance with an embodiment of the present invention.

As described above, certain particular gaming systems provide peer-to-peer gaming services. Example systems and methods for providing peer-to-peer gaming services are illustrated in FIGS. 9 and 10, respectively. As shown in FIG. 9, gaming system 910 includes at least two users 912. Users 912 preferably access gaming system 910 by way of gaming devices 913. In various embodiments, gaming devices 913 transmit and receive gaming information to and from a gaming service provider 914. The gaming information is communicated by way of a data network 916 that forms at least a portion of the communication path between gaming devices 913 and gaming service provider 914. In certain embodiments, gaming system 910 includes software and hardware to provide peer-to-peer gaming services to enable multiple users 912 of gaming devices 913 to interactively participate in a single gaming activity.

In particular embodiments, gaming devices 913 and data network 916 may be substantially similar to gaming devices 13 and network 16, respectively, which are described above with regard to FIG. 1. Accordingly, in certain embodiments, data network 916 comprises an at least partially private data network that includes, without limitation, Code Division Multiple Access (CDMA), Time Division Multiple Access (TDMA), Global System for Mobile Communication (GSM), General Packet Radio Service (GPRS), WiFi (802.11x), WiMax (802.16x), Public Switched Telephone Network (PSTN), Digital Subscriber Line (DSL), Integrated Services Digital Network (ISDN), Blue Tooth, cable modem technologies, or some combination of these or other networks. Thus, data network 916 may be wireless or wireline or a combination of wireless and wireline. Although data network 916 is described as a "data network," it is recognized that data network 916 may include any network for communicating voice and/or data communications to gaming devices 913. Gaming devices 913 may include any combination of mobile phones, personal data assistants (PDAs), computers, or mini-computers appropriate for communicating with data network 916.

In particular embodiments, data network 916 includes a controlled-access network. Access to data network 916 may be controlled in any of a variety of ways. As just one example, access to data network 916 may be restricted to a particular group of users. In particular embodiments, the particular group of users may include registered users. Thus, a user 912 may be required to register with the gaming service provider 914 before a gaming device 913 is assigned to user 912 and/or before a gaming device 913 is enabled for gaming activities. Additionally or alternatively, access to data network 916 or to portions of data network 916 and gaming services provided thereon may be restricted to users based on the users' locations. Accordingly, only gaming devices 913 located within a jurisdiction allowing casino-style gaming may be enabled for casino-style gaming activities. Similarly, only gaming devices 913 located within a jurisdiction allowing sports wagering or pari-mutuel betting may be enabled for these types of activities. These are just a few examples, however, for providing a controlled access data network 916. It is recognized that user access to data network 916 may be limited in any manner appropriate to maintain the security of the data network 916. As further examples and as will be describe in more detail below, biometrics, facial recognition software, iris scanning, and other security mechanisms may also be used to restrict access to the data network 916 through gaming devices 913. As a result of these and other controlled-access mechanisms, gaming service provider 914 may be able to positively identify users who are participating gaming activities.

For providing gaming services to users 912, gaming service provider 914 includes a processor 918, such as a computer or server. The various components of processor 918 include software and hardware that cooperate to offer gaming services (including gambling and non-gambling activities discussed herein) to gaming devices 913. For example, in particular embodiments, processor 918 includes a gaming module 920 that operates as a gaming server. Gaming module 920 may include or have access to a service application database 922 or other memory that stores a library of gaming applications 924. Gaming applications 924 may include an information, in any format, which is necessary or desirable to the operation of the gaming experience in which users 912 participate. For example, gaming applications 924 may include information for providing graphical representations of objects associated with gaming activities to devices 913.

In particular embodiments, one or more gaming applications 924 may allow users 912, in remote and/or mobile locations, to compete against one another in gaming activities. This may be particularly desirable in the case of certain games such as, but without limitation, poker, sporting event wagering, athletic competition wagering, lottery and prize contests, and keno. Assume for example that a first user 912a associated with a first gaming device 912a is located at the hotel pool and that a second user 912b associated with a second gaming device 913b is located in a hotel restaurant. Using their respective gaming devices 913a and 913b, users 912a and 912b may compete against each other and against any other participants in an electronically represented poker game. Thus, users 912a and 912b may each be dealt a poker hand from the same deck as if they were sitting at an actual poker table within a gaming area of a casino. While participating in such a game, users 912a and 912b may use their respective gaming devices 913a and 913b to place bets, request additional cards, and perform other poker related activities. Since the performance of these activities by users 912a and 912b affects each other and every other participant in the poker game, users 912a and 912b may be said to interactively participate in the gaming activity.

Additionally or alternatively, one or more gaming applications may allow users 912, in remote and/or mobile locations, to "form a table" in a casino-style game. Typically, casino-style games allow users to interactively compete against the house. This may be particularly desirable in the case of certain games such as, but without limitation, blackjack, pai gow, and Caribbean stud. Continuing the example began above, first user 912a at the pool and second user 912b in the hotel restaurant may be sequentially dealt cards from a common deck as if the users 912 and the dealer were sitting at a blackjack table within the gaming area of the casino. While participating in such a game, users 912a and 912b may use their respective gaming devices 913a and 913b to place bets, hit on dealt cards, stay their hand, buy insurance, double down, and perform other blackjack related activities. Although users are not competing directly against each other, the performance of gaming related activities by users 912a and 912b affects each other and every other participant "present" at the blackjack table. As such, where competing collectively against the house, users 912a and 912b may be said to interactively participate in a gaming activity.

Casino style gaming often allows players to play at more than one position at the table. A player of blackjack, for example, may be able to place two separate bets at the table as if the player is occupying two seats at the table. As a result, the player may be dealt two different hands from which the player plays individually. In particular embodiments, one or more gaming applications 924 may allow a user 912 to use a single gaming device 913 to play multiple player positions in a gaming activity. Such a gaming application 924 may be provided as an enhancement to gaming applications 924 that allow a user 912 to play with or compete against other users 912. Thus, first user 912a may be able to play two hands of blackjack while competing against the house with second user 912b.

In particular embodiments, such an enhancement may only be offered where "seats" are available at the gaming table. For example, if six player positions are present at a blackjack table and five of the positions are "virtually" occupied by users 912 of gaming devices 913, the presence of the available position may be made known to each participating user 912. In particular embodiments, gaming service provider 914 may send an inquiry to each participating user 912 to determine if any of the participating users 912 are interested in additionally playing the open position. Additionally or alternatively, a participating user 912 may use gaming device 913 to communicate a request to processor 918 that seeks to play the open position. Where a finite number of player positions are offered and all player positions are "virtually" occupied, however, the table may be considered closed until a participating user 912 leaves the game and a player position opens up.

A gaming application 924 may also allow users 912 of gaming devices 913 to participate in gaming activities that are dealt from a multi-deck shoe. In particular embodiments, the multi-deck shoe may include a virtual deck comprised of six 52-card decks. Hands dealt to users 912 on gaming devices 913 may be sequentially dealt from the multi-deck shoe until all of the "virtual cards" in the shoe have been dealt to participating players. For example, sequential blackjack hands may be dealt out of the multi-deck shoe until enough blackjack hands have been dealt to use all cards in the shoe. When no cards remain in the multi-deck shoe, the shoe may be "virtually" reshuffled and subsequent hands may be dealt from the reshuffled shoe. This is in contrast with gaming systems that result in each hand being dealt from a new 52-card deck. Like other gaming applications 924 described herein, a user 912 of a gaming device 913 may participate in the multi-deck gaming activity against the house in a single-player game or with other users 912.

In certain embodiments, one or more gaming applications 924 may allow users 912 of gaming devices 913 to wager on the performance of a participant of a gaming activity. Performance wagering may be used to a convert game such as blackjack, which is typically considered to create a competition between a player and the house into a game that fosters competition between players. Depending upon the parameters allowed by gaming applications 924 or by applicable state and federal law and/or regulations, performance wagers may be offered as an enhancement to other gaming activities. Thus, a first user 912a may be allowed to place a wager on the performance of a second user 912a while both users 912a and 912b are participating in the gaming activity. For example, if first and second users 912a and 912b are interactively competing against the house in a common game of blackjack, first user 912a may be allowed to place a bet (in addition to the first user's bet associated with his one or more dealt hands) on whether or not first user 912a believes that second user 912b will win against the house in a particular hand. Where the parameters of the gaming application 924 or applicable state and federal laws and/or regulations do not allow such double gaming, however, a first user 912a may be limited to wagering on the performance of second user 912b only when first user 912a is not already participating in the blackjack game. In such an instance, first user 912a is an indirect participant in the gaming activity.

In particular embodiments, one or more gaming applications 924 may allow users 912 to interactively view gaming and sporting activities on gaming devices 913. For example, a user 912 may use gaming device 913 to remotely and interactively view a particular event such as, but not limited to, a poker tournament or a golf tournament. The view provided to a user 912 may be user-selectable. For example, a gaming application 924 may allow a user 912 to opt to receive a table view of a poker game. The table view may be much like what is shown on television broadcasts of poker tournaments. Similarly, a user 912 may view an entire golf tournament much like the user 912 would be able to view on a television broadcast. The gaming application providing such a view to user 912 may be considered a peer-to-peer gaming application since it may be shown to any number of users 912 who request the activity. Where the user is allowed to place bets or other wagers during the gaming or sporting activity, the gaming application may further be considered to be user-interactive.

Other views of gaming or sporting activities offered by gaming applications 924 may allow a user 912 to select a specific player or participant in the gaming or sporting activity to follow. Accordingly, the user 912 may view the gaming tournament or sporting activity through a single participant. The user 912 may then place bets or other wagers as if the user 912 were playing in the place of the actual participant. For example, user 912 may view a poker tournament in which T. J. Cloutier is playing. If user 912 selects to view the tournament from the view of T. J. Cloutier, user 912 may be allowed to bet as if the cards dealt to T. J. Cloutier were his own. As another example, user 912 may view a golf tournament in which Tiger Woods and Jack Nicholas are playing. User 912 may be given a choice between following Tiger Woods or Jack Nicholas on the course. The user 912 may then place bets or other wagers on the performance of Tiger Woods at each hole. In each example, multiple users 912 may receive the same broadcast of the gaming or sporting activity. Thus, the activity may be considered peer-to-peer.

For any of the above-described gaming applications 924, it is generally recognized that the gaming activities supported by gaming applications 924 may comprise virtual gaming activities or actual gaming activities. A virtual gaming activity includes a gaming activity that is created by gaming service provider 914 solely for the participation of users 912 of gaming devices 913. If all participants of a gaming activity include users 912 of gaming devices 913, the gaming activity is a computerized gaming activity. Thus, the gaming activity may be said to exist only in a virtual sense. For example, a computerized blackjack game that includes six player positions filled with six different users of gaming devices 913 is a virtual game.

In contrast, a gaming activity that is real-time representation of a gaming activity that is occurring on the casino floor or in another gaming location is an actual gaming activity. The actual gaming activity may be open to both participants that are physically present at a gaming table or other gaming location and to participants that are remotely present by way of gaming devices 913. Accordingly, in particular embodiments, a user 912 of a gaming device 913 may be allowed to remotely participate in an actual gaming session as it is occurring on the casino floor. For example, if a blackjack game on the casino floor includes five filled player positions and one open player position, user 912 of gaming device 913 may be invited or otherwise allowed to remotely sit in the open position. Using gaming device 913, user 912 may be dealt cards and place bets just as if the user 912 were sitting at the table on the casino floor. Additionally, the player position at the actual gaming location, which is remotely occupied by user 912 of gaming device 913, may be identified as occupied even where the seat is physically empty.

In particular embodiments, gaming service provider 914 may operate to provide assistance to a user 912 in finding a particular activity in which the user 912 wishes to participate. For example, when a user 912 of gaming device 913 wishes to play blackjack, gaming device 913 may be used to send a gaming request to gaming service provider 914. Processor 918 may receive such a request, and, in particular embodiments, gaming module 920 or another component of processor 918 may process the request by identifying one or more gaming activities that are available for participation by user 912.

In particular embodiments, a user 912 may enter one or more user-parameters corresponding to gaming characteristics in which the user 912 is interested. For example, user 912 may enter user-parameters that indicate the user's desire to join into an existing game, initiate a new game, participate in a virtual game, participate in an actual game, play from a single deck, and/or play from a shoe. User-parameters may also specify particular betting minimums or limits that the user 912 would like to play. Still other user-parameters may identify a minimum or maximum number of players with whom the user 912 would like to play. Processor 918, and specifically gaming module 920, may use these and other user-specified parameters as search criteria when identifying potential gaming activities that may be displayed to the user 912 on a gaming device 913. Accordingly, gaming module 920 may, in particular embodiments, query offered gaming applications 924 based on the user-specified parameters to identify a menu of gaming activities that may then be offered to the requesting user 912.

Additionally or alternatively, gaming module 920 may use stored customer preference information to identify potential gaming applications 924 that may be displayed to user 912a in response to a request to play. Specifically, gaming module 920 may access a customer profile database 926 that stores one or more customer profiles 928 associated with user 912a. A customer profile 928 preferably consist of one or more data files. It is generally recognized, however, that a customer profile 928 may be maintained in any form that allows the establishment, maintenance, and updating of a customer profile 928 via the transfer of electronic information. It should also be understood that while customer profile information may be centralized, as shown, customer profile information may be additionally or alternatively distributed and/or maintained by other components of system 910.

The customer preference information stored in customer profile database 926 may include any information that is indicative of a user's preferences with respect to at least one aspect of the gaming services offered by gaming service provider 914. For example, customer preferences may identify the types of gaming activities in which the user 912a likes to participate. Other customer preferences may include gaming trends or habits that are typical to the user 912a. Similar to the user-specified parameters above, customer preferences may additionally or alternatively identify whether user 912a prefers to join existing games or initiate new games, whether user 912a prefers an actual or virtual gaming experience, whether user 912a prefers to play from a single deck or from a shoe, particular betting minimums or limits that the user 912*a* likes to play, and/or the maximum or minimum number of players with whom user 912*a* likes to play. Like user-specified parameters, gaming module 920 may use customer preference information as search criteria in identifying potential gaming applications 924 that may be displayed to user 912*a* on gaming device 913*a*. The customer preference information may be used in addition to or in lieu of any user-specified parameters, depending upon the specific embodiment. Accordingly, gaming module 920 may, in particular embodiments, query offered gaming applications 924 based on the customer preference information, the user-specified parameters, or both to identify a menu of gaming activities that may then be offered to user 912*a*.

As an additional feature, gaming module 920 may query customer profiles 928 to identify additional players that may be willing to play with a first user 912*a* who is initiating a gaming activity. For example, if a first user 912*a* of first gaming device 913*a* desires to initiate a blackjack game, the first user 912*a* may specify the parameters of the game and send a request to gaming module 920 to generate a gaming activity having the characteristics specified by the first user 912*a*. Additionally or alternatively, the first user 912*a* may specify one or more participant characteristics or other criteria that may be used to identify additional players. For example, first user 912*a* may specify that the user only wishes to play with other high rollers, other celebrities, or other senior citizens, where appropriate. Gaming module 920 may then query customer profiles 928 to identify additional users 912 that may wish to participate in the game initiated by user 912*a*. For example, if a customer profile 928 associated with second user 912*b* indicates that user 912*b* is interested in blackjack games of the type initiated by user first 912*a*, gaming module 920 may identify second user 912*b* as a potential participant in a gaming activity with first user 912*a*. Accordingly, gaming module 920 may send an invite to second user 912*b* that invites second user 912*b* to join in the gaming activity.

Customer profiles 928 may be additionally or alternatively used to alert users 912 of service provider-initiated gaming activities. Specifically, gaming module 920 may query customer profiles 928 prior to the initiation of a gaming event or activity to identify potential participants. As a result, a first user 912*a* in the pool area, for example, may receive an alert based on his player profile that a blackjack tournament is beginning in 30 minutes. Similarly, a second user 912*b* in a hotel restaurant may receive a similar alert based on his player profile. First and second users 912*a* and 912*b* may then be able to participate together, from disperse locations, in the blackjack tournament using their respective gaming devices 913*a* and 913*b*.

In particular embodiments, customer profiles 928 may also include "buddy lists" or other association information. The buddy lists or other association information may link users 912 to each other and/or define possible relationships there between. The buddy lists may be used to identify participants for a gaming activity. For example, first user 912*a* may initiate a blackjack game and may invite second user 912*b* and other users on first user 912*a*'s buddy list to join into the game. As another example, gaming service provider 914 may initiate a blackjack game and identify first user 912*a* as a potential participant based on the user's customer preference profile. Gaming service provider 914 may then send an invitation to first user 912*a* and other users associated with first user 912*a* to request their participation in the blackjack game. As will be described in more detail below, buddy lists may also be in the provisioning of other gaming services such as user tracking and messaging.

In certain embodiments, gaming service provider 914 includes a messaging module 930. Messaging module 930 may include software and hardware for performing address and format translations to allow users 912 of different types of gaming devices 913 to communicate with one another via data network 916. For example, a first user 912*a* who is participating in a blackjack game while at the pool may be able to communicate with a second user 912*b* who is participating in the same blackjack game from the hotel restaurant. In particular embodiments, the communications may include text messages or voice messages that are transmitted over data network 916. Thus, first and second users 912*a* and 912*b* may be able to "converse" with one another as if they were sitting at an actual blackjack table on the casino floor. As another example, first and second users 912*a* and 912*b* may be able to converse with a dealer if they are participating remotely in an actual blackjack game. Regarding the communications that may be managed by message module 930, it is generally recognized that federal and state gaming laws and/or regulations may prohibit the transmission of certain types of communications. Thus, message module 930 may include software and hardware that enables message module 930 to operate within the confines of applicable federal and state laws and/or regulations. In particular embodiments, message module 930 may include software for distinguishing between permissible and impermissible communications.

As an enhanced feature, message module 930 may enable users 912 within a buddy group to communicate with one another. For example, first user 912*a* may send a message to message module 930 for global delivery to all members on the first users' buddy list. Accordingly, a group member such as first user 912*a* may send a suggestion to other group members in dispersed locations requesting everyone to physically meet at a certain location (e.g., a sportsbook). In such an instance, message module 930 may access a buddy list associated with first user 912*a* stored in consumer profile database 926 to identify other users 912 that should receive the message. Message module 930 may then transmit the message requesting everyone to meet at the specified location to all members on the buddy list. This may be desirable, for example, when first user 912*a* would enjoy participating in an entertainment event that requires physical presence. Such entertainment events might include, for example, watching a game together or going to dinner, golf, or a show. This may also be desirable when first user 912*a* desires to participate in and be physically present at an actual casino game or gaming tournament and wishes other members of the group to also participate.

As still another feature that may be offered by gaming services provider 914, a first user 912*a* may be able to scan through his buddy list using first gaming device 913*a* and select specific members of the group to receive a particular message. Accordingly, when message module 930 receives a message from first user 912*a* with an identified distribution list, message module 930 may forward that message only to the users specifically identified by first user 912*a* to receive the message. In particular embodiments, message module 930 may access first user 912*a*'s buddy list in customer profile database 926 to obtain address information for the users 912 identified to receive the message. Alternatively, address information may be included in the message itself, and message module 930 may merely operate to forward the message to the gaming devices 913 identified by the address information.

In particular embodiments, processor 918 may include a location identification module 932. Location identification module 932 may use location information associated with gaming devices 913 to identify gaming services that may be made accessible to users 912 based on the location of their respective gaming devices 913. For example, where applicable state and federal law and/or regulations prohibit gaming activity at a user's location, location information associated with the user's gaming device 913 may be used to limit the gaming services available to the user 912.

The location information may be gathered by location identification module 932 using location verification technology, which is discussed in greater detail below with regard to FIGS. 4 and 5. Generally, location verification technology may include, without limitation, "network-based" and/or satellite-based" technology that allows for the disabling of certain gaming service applications where required by state or federal law. Thus, network-based technologies, such as Receiver Signal Strength Indicator (RSSI), Time Difference of Arrival (TDOA), multilateration, triangulation, and geo-fencing, and/or satellite-based technologies, such as global positioning satellite (GPS), may be used to identify the presence or absence of users 912 within a gaming jurisdiction. Additionally or alternatively, location verification technologies may allow for the detection of users 912 within a specific area controlled by a gaming service provider 914. As just one example, radio frequency identification (RFID) technology or another location verification technology may be used to find lost gaming devices that are equipped with RFID sensors.

In various embodiments, location information may be incorporated into peer-to-peer gaming related services. In particular, a gaming device 913 may receive location information relating to other gaming devices 913 and display that location information to a user 912. User 912 receiving location information associated with other users 912 of gaming devices 913 may then make decisions about gaming activities based on the location information. Specifically, users 912 may make decisions relating to whether to participate or continue to participate in a gaming activity based on the location of other users 912 participating in that gaming activity. For example, a first user 912a may prefer not to play with or against users located in bars. As another example, a first user 912a may prefer not to play with or against users that are located within a user-specified range of first user 912a. As still another example, a first user 912a may prefer not to play with or against a group of users that are located proximate to each other since those users may be predisposed to cheat. Accordingly, prior to joining a gaming activity, first user 912a may send a location information request to identify the location of other users 912 who are already participating in the gaming activity. After play is initiated by first user 912a, location information relating to other users 912 participating in the gaming activity may be periodically updated to identify movement of the other users 912 during play. If at any time the location information received by first user 912a identifies that another participant has physically moved to a location that first user 912a finds undesirable, first user 912a may remove himself from the gaming activity.

As another example, location identification information may be used to allow users 912 remotely participating in a common gaming activity to avoid each other. If, for example, federal or state gaming laws or other gaming regulations a establish minimum distance requirement that must be maintained between remote users 912, users 912 may monitor location information for other participating users 912 to avoid violating the distance requirement. Accordingly, in some embodiments, location information may be used by participating players to avoid the disablement of gaming devices 913 based on distance requirements.

Additionally or alternatively, location verification technology may be employed by a user of gaming devices 913 to track things or non-gaming people of interest. For example, a user 912 may use gaming device 913 to track a casino hostess, casino waitress, casino dealer, or other casino employee. Accordingly, a user 912 may be able to more easily locate a hostess to obtain comps, a casino waitress to obtain drinks or food, or a dealer that the user prefers. Such technology may also be used by casino staff to track persons or things. For example, casino staff may use a gaming device 912 to track a particular gaming participant that the casino considers a high stakes wager. As another example, casino staff may use a gaming device 912 to track a particular gaming participant that the casino is suspicious of for cheating. As still another example, casino staff may use a gaming device 912 to track gaming devices such as slot machine keys, which are considered very valuable.

In particular embodiments, location verification technology may be combined with buddy list technology to enable a user 912 to track members of a specified group. For example, assume that a first user 912a and a plurality of friends, including second user 912b, are in a gambling jurisdiction but are located at various dispersed places within that jurisdiction. Where the gaming system 910 allows the establishment of a private buddy network of peers, users 912 within that private buddy network of peers may be able to obtain location information associated with other users 912 within the private buddy network of peers. For example, a first user 912a may want to play poker at the same (virtual or actual) table as a second user 912b. To obtain location information associated with second user 912b, first user 912a may use gaming device 913a to request location information for second user 912b. Location identification module 932 may receive the request, obtain location information associated with second user 912b, and transmit the location information to first user 912a. After receiving the location information, first user 912a may physically join second user 912b at a gaming table on the casino floor where appropriate. Alternatively, where second user 912b is participating in a gaming activity using gaming device 913b, first user 912a may join second user 912b in a game on gaming device 913a.

Location verification technology may be combined with message technology to enable first user 912a to communicate with other users 912 at a specific location. For example, a first user 912a may believe that he has better luck playing against participants who are eating. Accordingly, first user 912a might request a gaming activity from gaming service provider 914 and request a fellow participant who is located in the hotel restaurant. Location identification module 932 might then obtain location information for other users 912 to identify a second user 912b located in the hotel restaurant. Gaming service provider 914 might then transmit a message to second user 912b via gaming device 913b to inquire as to whether second user 912b is interested in participating in the gaming activity with first user 912a. In particular embodiments, the location of first user 912a may be disclosed to or accessible to second user 912b.

Where allowed by law or gaming regulations, another application of the combined messaging and location identification technologies might enable first user 912a to initiate a gaming session with other users 912 who are located proximate to first user 912b. For example, a first user 912a located at the hotel pool may desire to initiate or join a game that includes other participants that are also hanging out by the pool. Accordingly, first user 912*a* might communicate a gaming request to gaming service provider 914 that requests a local gaming activity. Upon receiving such a request, location identification module 932 might obtain location information for other users 912 to determine that a second user 912*b* is also located at the hotel pool. If second user 912*b* is already participating in a gaming activity and that gaming activity includes an open player position, processor 918 may offer the gaming activity to first user 912*a* and allow first user 912*a* to also participate. On the other hand, if second user 912*b* is not participating in a gaming activity, gaming service provider 914 might transmit a message to second user 912*b* via gaming device 913*b* to inquire as to whether second user 912*b* is interested in participating in a local gaming activity with first user 912*a*. In particular embodiments, the location of first user 912*a* may be disclosed to or accessible to second user 912*b*.

As another example, location technology and message technology may be combined to operate much like an online dating service. Assume that a first user 912*a* is located at the hotel pool and desires company. In particular embodiments, first user 912*a* may use gaming device 913*a* to obtain location information associated with other users 912 that are also in the general vicinity of the hotel pool. After obtaining the location information, first user 912*a* may send messages to the located users 912 requesting their company by the pool.

To protect the privacy of users 912 and prevent the receipt of unsolicited and unwanted messages by users 912, users 912 might be required to pre-register to receive such communications. Continuing with the above-described example, example, second user 912*b* may be required to register with location identification module 932 or another module of processor 918 to make his or her location information available to other users 912. In particular embodiments, the registration may be stored as a customer preference in customer profile database 926. For example, when a request for location information is subsequently received from first user 912*a*, location identification module 932 may query customer profile database 926 to determine that second user 912*b* has given his permission to release his location information before sending any location information associated with second user 912*b* to first user 912*a*.

In still another embodiment, permission to release location information to other users 912 may be granted on a real-time basis. Continuing with the above described example, first user 912*a* may send a request to gaming service provider 914 that requests a "location match." Location identification module 932 may use the above described location verification technologies to identify other users 912 that are within a close proximity to first user 912*a*. Where location identification module 932 identifies that second user 912*b* is within a close proximity to first user 912*a*, location module 932 may send a communication to second user 912*b* that seeks permission to release location information associated with second user 912*b* to first user 912*a*. For example, second user 912*b* might receive a voice or text message that says, "A hotel guest is in your general area and would like to meet you. Do you wish to meet this person?" In certain embodiments, characterizing information about first user 912*a* might be additionally provided. If second user 912*b* replies negatively, location identification module 932 might look for other users 912 in the general vicinity of the hotel pool and repeat the process. If second user 912*b* replies affirmatively, the location of second user 912*b* might be provided to first user 912*a*, the location of first user 912*a* might be provided to second user 912*b*, or both.

As still another example, location technology, message technology, and buddy technology may be used to communicate messages between users 912 of a selected group who are located at a specific location or within proximity of each other. For example, assume that a first user 912*a* and a plurality of friends, including second user 912*b*, are in a gambling jurisdiction but are located at various dispersed places within that jurisdiction. Where the gaming system 910 allows the establishment of a private buddy network of peers, users 912 within that private buddy network of peers may be able to obtain location information associated with other users 912 within the private buddy network of peers and send messages to those that are located at a user-identified location or within a specified proximity of the user. For example, a first user 912*a* may want to play poker at the same table (virtual or actual) as any friend who is located nearby. First user 912*a* may then use gaming device 913*a* to request the identification of a user within his buddy network that is playing from a location proximate first user 912*a*. Location identification module 932 may receive the request, obtain location information associated with the various users 912 on the buddy list of first user 912*a*. If location identification module 932 identifies a second user 912*b* as meeting the criteria, a message may be communicated to second user 912*b* that identifies the location of first user 912*a* and/or requests a gaming session with first user 912*a*. Additionally or alternatively, a communication path may be established between first and second users 912*a* and 912*b* for text or voice messaging.

In particular embodiments, gaming devices 913 may perform multiple functions. For example, gaming device 913 may operate as a communication device even when gaming is disabled due to jurisdictional limitations. Thus, a casino may use a gaming device 913 to communicate with a particular customer even when that customer is outside of the jurisdiction. Where the gaming device 913 operates as a cell phone, the casino may use gaming device 913 to call the user 912 to offer promotions, discounts, or guest related services. For example, the casino may call user 912 on gaming device 913 to confirm hotel and/or travel reservations. Using the location verification technology described above, the gaming device 913 may then be enabled for the placement of sports wagers or pari-mutuel bets when the user 912 arrives in Nevada. As a further example, the gaming device 913 may be enabled for casino-style gaming activities, when the user 912 reaches the casino property.

As described above, the system described in connection with FIG. 9 is merely an example of a system for providing peer-to-peer gaming services. It will be readily understood that system 910 may be modified in any number of ways within the scope and spirit of the detailed description. For example, although two databases 922 and 926 are illustrated in FIG. 9, it is generally recognized that gaming system 910 may include fewer or more databases as appropriate. Accordingly, it is recognized that the information described above as being stored in databases 922 and 926 are not mutually exclusive. Some or all of the information described as being stored in database 922 may be stored in database 926 or any other database within or without of service provider 914 and gaming system 910. Similarly, some or all of the information described as being stored in database 926 may be stored in database 922 or any other database within or without service provider 914 and gaming system 910.

FIG. 10 illustrates an example method 1010 for providing peer-to-peer wireless gaming in accordance with an embodiment of the present invention. The method begins at step 1012 with the provision of a data network 916. The data network 916 includes at least one portion that is a private data network. As described above with regard to FIG. 1, the private data network 916 may include Code Division Multiple Access (CDMA), Time Division Multiple Access (TDMA), Global System for Mobile Communication (GSM), General Packet Radio Service (GPRS), WiFi (802.11x), WiMax (802.16x), Public Switched Telephone Network (PSTN), Digital Subscriber Line (DSL), Integrated Services Digital Network (ISDN), Blue Tooth, and/or cable modem.

Data network 916 is in communication with a plurality of gaming devices 913 which may include mobile phones, personal data assistants (PDAs), computers, mini-computers, or a combination of these or other suitable gaming devices. At step 1014, data network 916 is used to provide a gaming service to the plurality of gaming devices 913. In various embodiments, the gaming service may allow users 912 of gaming devices 913 to access a library of gaming service applications 924 related to gaming or sporting activities. For example, the provided gaming service may allow a user 912 to participate in a virtual or actual blackjack game using a gaming device 913. As another example, the provided gaming service may allow a user 912 to place bets or other wagers on the outcome of a sporting event such as but not limited to a golf tournament. As still another example, the provided gaming service may allow a user 912 to place bets or other wagers on the performance of a gaming or sporting participant.

At step 1016, a gaming request is received from a first user 912*a* of a first gaming device 913*a*. In particular embodiments, the gaming request may identify a gaming activity in which first user 912*a* is interested in participating. Additionally or alternatively, the request may include user-specified parameters that may be used at step 1018 as search criteria to identify service applications 925 corresponding with virtual or actual gaming activities that are in progress. In particular embodiments, the virtual or actual gaming sessions that are in progress may include additional participants that are also users 912 of gaming devices 913.

At step 1020, the gaming device 913*a* associated with first user 912*a* is enabled to allow first user 912*a* to interactively participate in the gaming activity. Where the gaming activity includes other virtual participants, such as second user 912*b* of second gaming device 913*b*, first and second users 912*a* and 912*b* may be allowed to interactively and remotely participate in a single gaming session. In particular embodiments, first and second users 912*a* and 912*b* may play in competition against the house. This may be applicable where the gaming activity includes blackjack, pai gow, Caribbean stud, or other casino-style table games. In other embodiments, first and second users 912*a* and 912*b* may play in competition against each other. This may be applicable where the gaming activity includes poker, sporting event wagering, athletic competition wagering, lottery and prize contests, or keno. In still other embodiments, first user 912*a* of first gaming device 913*a* may be allowed to wager on the performance of second user 912*b* of second gaming device 913*b* or another participant of the gaming activity.

It is recognized that the method described in connection with FIG. 10 is merely an example of a method for providing peer-to-peer gaming services. It will be readily understood that method 1010 may be modified in any number of ways within the scope and spirit of the detailed description. For example, although the described method 1010 enables a remote user 912 to join an existing game that includes one or more other remote users 912, it is generally recognized that method 1010 may also enable a remote user 912 to initiate a new game and request additional participants. Furthermore, in some embodiments, method 1010 may enable a remote user 912 to participate in a game that is representative of an actual game in a gaming location, such as the casino floor.

Figure 2:
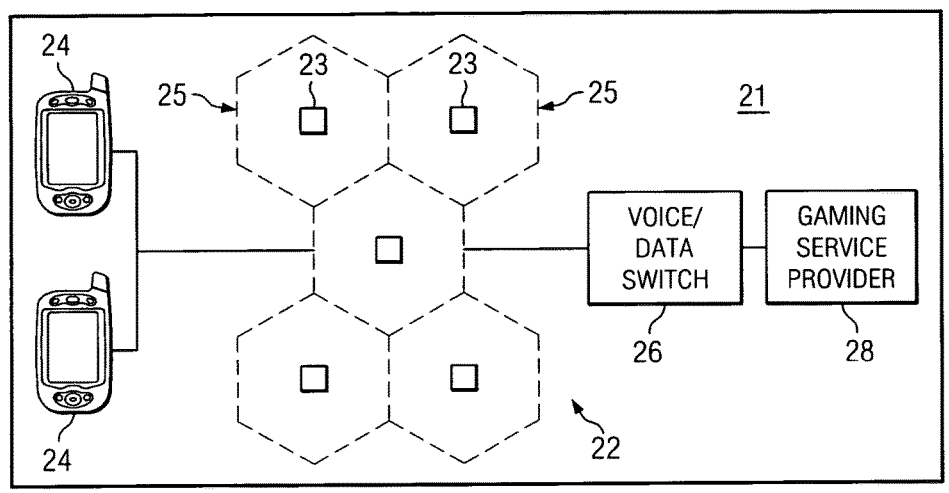
FIG. 2 illustrates a gaming system with a wireless network according to an embodiment of the present invention.

Other aspects of the various embodiments of the wireless gaming system are shown in FIGS. 2-8. According to one embodiment, as shown in FIG. 2 for example, the communications network comprises a cellular network 22. Cellular network 22 comprises a plurality of base stations 23, each of which has a corresponding coverage area 25. Base station technology is generally known and the base stations may be of any type found in a typical cellular network. The base stations may have coverage areas that overlap. Further, the coverage areas may be sectorized or non-sectorized. The network also includes mobile stations 24, which function as the gaming communication devices used by users to access the gaming system and participate in the activities available on the gaming system. Users are connected to the network of base stations via transmission and reception of radio signals. The communications network also includes at least one voice/data switch, which is preferably connected to the wireless portion of the network via a dedicated, secure landline. The communications network also includes a gaming service provider, which is likewise connected to the voice/data switch via a dedicated, secure landline. The voice/data switch may be connected to the wireless network of base stations via a mobile switching center (MSC), for example and the landline may be provided between the voice/data switch and the MSC.

Users access the gaming system by way of mobile stations which are in communication with, and thus part of, the communications network. The mobile station may be any electronic communication device that is operable in connection with the network as described. For example, in this particular embodiment, the mobile station may comprise a cellular telephone.

Preferably, in the case of a cellular network for example, the gaming system is enabled through the use of a private label carrier network. Each base station is programmed by the cellular carrier to send and receive private secure voice and/or data transmissions to and from mobile station handsets. The handsets are preferably pre-programmed with both gaming software and the carrier's authentication software. The base stations communicate via Private T-1 lines to a switch. A gaming service provider leases a private T-1 or T-3 line, which routes the calls back to gaming servers controlled by the gaming service provider. Encryption can be installed on the telephones if required by a gaming regulation authority, such as a gaming commission.

The cellular network is preferably a private, closed system. Mobile stations communicate with base stations and base stations are connected to a centralized switch located within a gaming jurisdiction. At the switch, voice calls are transported either locally or via long distance. Specific service provider gaming traffic is transported from the central switch to a gaming server at a host location, which can be a casino or other location.

As subscribers launch their specific gaming application, the handset will only talk to certain base stations with cells or sectors that have been engineered to be wholly within the gaming jurisdiction. For example, if a base station is close enough to pick up or send a signal across state lines, it will not be able to communicate with the device. When a customer uses the device for gaming, the system may prohibit, if desired, the making or receiving voice calls. Moreover, voice can be eliminated entirely if required. Further, the devices are preferably not allowed to "connect" to the Internet. This ensures a high level of certainty that bets/wagers originate and terminate within the boundaries of the gaming jurisdiction and the "private" wireless system cannot be circumvented or bypassed. Although in certain embodiments some data and/or voice traffic may be communicated at least partially over the Internet, it is preferred that the communication path does not include the Internet. Alternatively, in some embodiments, certain non-gaming information may be transported over a path which includes the Internet, while other information relating to the gaming activities of the system is transported on a path that does not include the Internet.

Figure 3:
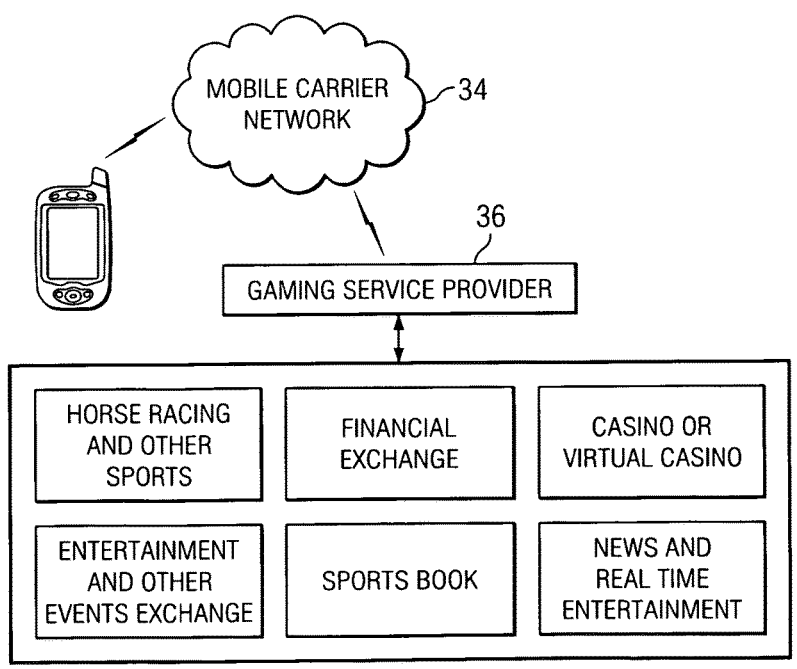
FIG. 3 is a block diagram of a gaming system illustrating various gaming activities in accordance with an embodiment of the present invention.

As shown in FIG. 3, a gaming communication device 32 is in communication with a gaming service provider over a network 34. The gaming service provider preferably has one or more servers, on which are resident various gaming and other applications. As shown in FIG. 3, some example gaming applications include horse racing and other sports, financial exchange, casino and/or virtual casino, entertainment and other events exchange, and news and real time entertainment. Each of these applications may be embodied in one or more software modules. The applications may be combined in any possible combination. Additionally, it should be understood that these applications are not exhaustive and that other applications may exist to provide an environment to the user that is associated with any of the described or potential gaming or related activities.

Figure 4:
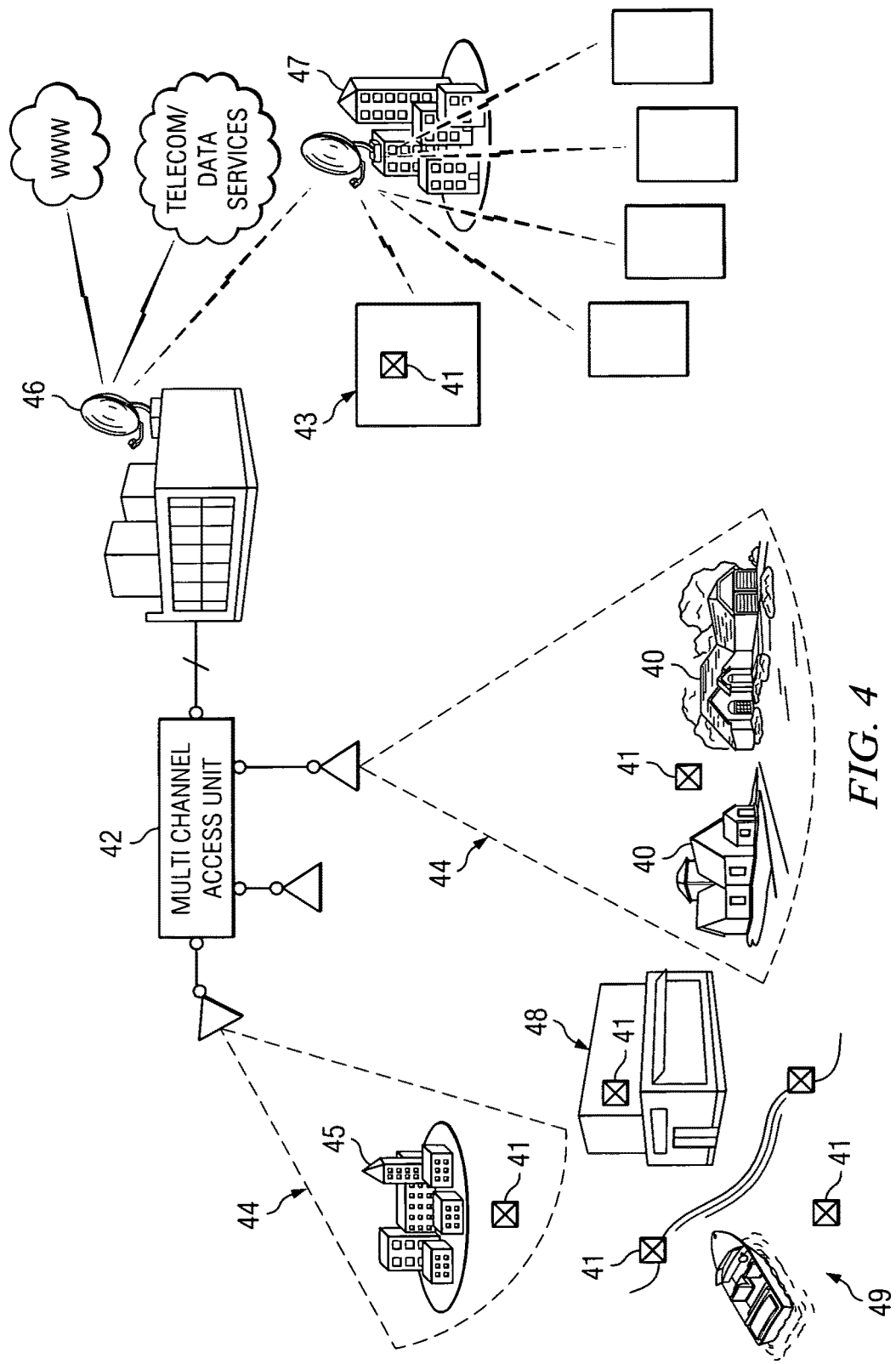
FIG. 4 illustrates a gaming system showing coverage areas in accordance with an embodiment of the present invention.

In another embodiment, as shown in FIG. 4, for example, the communications network comprises a private wireless network. The private wireless network may include, for example, an 802.11x (WiFi) network technology to cover "Game Spots" or "Entertainment Spots." In FIG. 4, various WiFi networks are indicated as networks 41. Networks 41 may use other communications protocols to provide a private wireless network including, but not limited to, 802.16x (WiMax) technology. Further, networks 41 may be interconnected. Also, a gaming system may comprise a combination of networks as depicted in FIG. 4. For example, there is shown a combination of private wireless networks 16, a cellular network comprising a multi-channel access unit or sectorized base station 42, and a satellite network comprising one or more satellites 46.

With respect to the private wireless network, because certain embodiments of the technology cover smaller areas and provide very high-speed throughput, the private wireless network is particularly well-suited for gaming commission needs of location and identity verification for the gaming service provider products. The gaming spots enabled by networks 41 may include a current casino area 48, new areas such as swimming pools, lakes or other recreational areas 49, guest rooms and restaurants such as might be found in casino 48 or hotels 45 and 47, residential areas 40, and other remote gaming areas 43. The configuration of the overall gaming system depicted in FIG. 4 is intended only as an example and may be modified within the scope of the present invention.

In one embodiment, the system architecture for the gaming system includes:

(1) a wireless LAN (Local Access Network) component, which consists of mostly 802.11x (WiFi) and/or 802.16x WiMax technologies; robust security and authentication software such as biometrics, facial recognition software, or iris scanning; gaming software; mobile carrier approved handsets with Windows® or Symbian® operating systems integrated within; and (a) CDMA-technology that is secure for over-the-air data protection;

(b) at least two layers of user authentication, (that provided by the mobile carrier and that provided by the gaming service provider);

(c) compulsory tunneling (static routing) to gaming servers;

(d) end-to-end encryption at the application layer; and (e) state-of-the-art firewall and DMZ technologies;

(2) an MWAN (Metropolitan Wireless Access Network), which consists of licensed and license-exempt, point-to-point links, as well as licensed and license-exempt, point-to-multi-point technologies;

(3) private MAN (Metropolitan Access Network) T-1 and T-3 lines to provide connectivity where wireless services cannot reach; and (4) redundant private-line communications from the mobile switch back to the gaming server.

Each of the "Game Spots" or "Entertainment Spots" is preferably connected via the MWAN/MAN back to central and redundant game servers. For accessing the private wireless networks 41, the gaming communication devices are preferably WiFi- or WiMax-enabled PDAs or mini-laptops, and do not have to be managed by a third-party partner.

Preferably, the gaming system includes a location verification feature, which is operable to permit or disable gaming from a remote location depending upon whether or not the location meets one or more criteria. The criterion may be, for example, whether the location is within a pre-defined area in which gaming is permitted by law. As another example, the criterion may be whether the location is in a no-gaming zone, such as a school. The location verification technology used in the system may include, without limitation, "network-based" and/or "satellite-based" technology. Network-based technology may included such technologies as multilateration, triangulation and geo-fencing, for example. Satellite-based technologies may include global positioning satellite (GPS) technology, for example.

As previously discussed, the cellular approach preferably includes the use of at least one cellular, mobile, voice and data network. For gaming in certain jurisdictions, such as Nevada for example, the technology may involve triangulation, global positioning satellite (GPS) technology, and/or geo-fencing to avoid the potential for bets or wagers to be made outside Nevada state lines. In one embodiment, the network would not cover all of a particular jurisdiction, such as Nevada. For instance, the network would not cover areas in which cellular coverage for a particular base station straddled the state line or other boundary of the jurisdiction. This is done in order to permit the use of location verification to insure against the chance of bets originating or terminating outside of the state. Triangulation may be used as a method for preventing gaming from unapproved locations. Triangulation may be accomplished, for example, by comparing the signal strength from a single mobile station received at multiple base stations, each having GPS coordinates. This technology may be used to pinpoint the location of a mobile station. The location can then be compared to a map or other resource to determine whether the user of the mobile station is in an unapproved area, such as a school. Alternatively, GPS technology may be used for these purposes.

Figure 5:
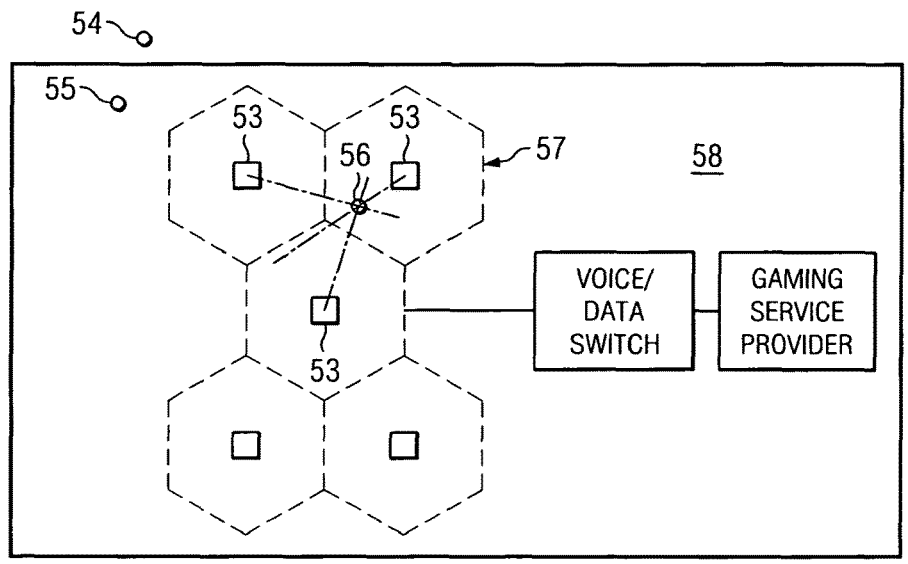
FIG. 5 illustrates a gaming system with a wireless network showing triangulation location determination in accordance with an embodiment of the present invention.

As shown in FIG. 5, the gaming system includes a plurality of gaming communication devices 54, 55, and 56. Device 54 is located outside the gaming jurisdiction 58. Devices 55 and 56 are both located inside gaming jurisdiction 58. However only device 56 is located within geo-fence 57, which is established by the coverage areas of a plurality of base station 53. Thus, geo-fencing may be used to enable gaming via device 56 but disable gaming via devices 54 and 55. Even though some gaming communication devices that are within the gaming jurisdiction 58, such as device 55, are not permitted access to the gaming system, the geo-fence 57 ensures that no gaming communication devices outside jurisdiction 58, such as device 54, are permitted access.

Geo-fencing does not specify location. Rather, it ensures that a mobile station is within certain boundaries. For instance, geo-fencing may be used to ensure that a mobile station beyond state lines does not access the gaming system. Triangulation on the other hand specifies a pinpoint, or near-pinpoint, location. For example, as shown in FIG. 5, device 56 is triangulated between three of the base stations 53 to determine the location of device 56. Triangulation may be used to identify whether a device, such as a mobile station, is located in a specific spot where gambling is unauthorized (such as, for example, a school). Preferably, the location determination technology utilized in conjunction with the present invention meets the Federal Communication Commission's (FCC's) Phase 2 E911 requirements. Geological Institute Survey (GIS) mapping may also be utilized to compare identified coordinates of a gaming communication device with GIS map features or elements to determine whether a device is in an area not authorized for gaming. It should be noted that any type of location verification may be used such as triangulation, geo-fencing, global positioning satellite (GPS) technology, or any other type of location determining technology, which can be used to ensure, or provide an acceptable level of confidence, that the user is within an approved gaming area.

In another embodiment, location verification is accomplished using channel address checking or location verification using some other identifying number or piece of information indicative of which network or portion of a network is being accessed by the gaming communication device. Assuming the using of an identifying number for this purpose, then according to one method of location checking, as an example, a participant accesses the gaming system via a mobile telephone. The identifying number of the mobile telephone, or of the network component being accessed by the mobile telephone, identifies the caller's connection to the mobile network. The number is indicative of the fact that the caller is in a defined area and is on a certain mobile network. A server application may be resident on the mobile telephone to communicate this information via the network to the gaming service provider. In a related embodiment, the identifying number or information is passed from a first network provider to a second network provider. For example, a caller's home network may be that provided by the second provider, but the caller is roaming on a network (and in a jurisdiction) provided by the first provider. The first provider passes the identifying information through to the second provider to enable the second provider to determine whether the caller is in a defined area that does or does not allow the relevant gaming activity. Preferably the gaming service provider either maintains, or has access to, a database that maps the various possible worldwide mobile network identifying numbers to geographic areas. The invention contemplates using any number or proxy that indicates a network, portion of a network, or network component, which is being connected with a mobile telephone. The identifying number may indicate one or more of a base station or group of base stations, a line, a channel, a trunk, a switch, a router, a repeater, etc.

In another embodiment, when the user connects his mobile telephone to the gaming server, the gaming server draws the network identifying information and communicates that information to the gaming service provider. The software resident on the gaming communication device may incorporate functionality that will, upon login or access by the user, determine the user's location (based at least in part on the identifying information) and send a message to the gaming service provider. The identifying number or information used to determine location may be country-specific, state-specific, town-specific, or specific to some other definable boundaries.

In connection with any of the location determination methods, the gaming system may periodically update the location determination information. This may be done, for example, during a gaming session, at pre-defined time intervals to ensure that movement of the gaming communication device to an unauthorized area is detected during play, and not just upon login or initial access.

Thus, depending on the location determination technology being used, the decision whether to permit or prohibit a gaming activity may be made at the gaming communication device, at the gaming server, or at any of the components of the telecommunication network being used to transmit information between the gaming communication device and the gaming server (such as at a base station, for example).

An aspect of the private wireless network related to preventing gaming in unauthorized areas is the placement of sensors, such as Radio Frequency Identification (RFID) sensors on the gaming communication devices. The sensors trigger alarms if users take the devices outside the approved gaming areas. Further, the devices may be "tethered" to immovable objects. Users might simply log in to such devices using their ID and password.

In connection with FIG. 6, an example embodiment of a method according to the present invention can be described as follows. As discussed, software is preferably loaded on a gaming communication device and is operable to receive input data for gaming. The input data may originate at associated gaming software resident on the gaming server, or it may be input by the user of the gaming communication device. The software on the device is operable to present a representation of a gaming environment. This can include, among other things, a representation of a table game such as a blackjack table or a slot machine. Other examples of the representation of a gaming environment include graphical representations of any of the other applications described herein.

Figure 6:
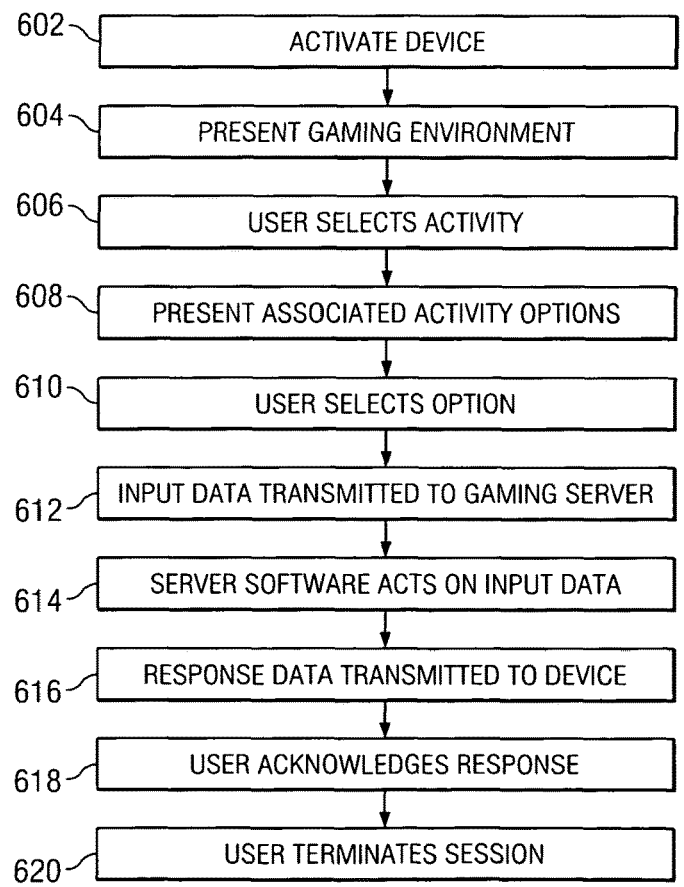
FIG. 6 is a flow chart depicting steps in a gaming method according to an embodiment of the present invention.

In the example method shown in FIG. 6, in a first step 602, the gaming communication device is activated. This may take place as a function of turning on a phone, PDA, or other communication device as described elsewhere herein. Preferably, activation comprises connecting the gaming communication device to a private data network. Part of the activation includes logging in at a prompt. This may be considered as a first level of authentication of a user of the gaming communication device. A second level of user authentication comprises authentication of the gaming communication device itself. This may occur, for example, by authentication of a mobile station by a mobile carrier. A third level of user identification may comprise biometrics. Various examples of biometrics may include, but are not limited to, fingerprint identification, photo identification, retina scanning, voice print matching, etc.

In a next step 604, the user is presented with the gaming environment. The gaming environment may be presented in various stages. For instance, in a first stage, the gaming environment may comprise a casino lobby where the user is presented with certain gaming options including, for example, table games, slots, sports book, video poker, and a casino cashier. In a subsequent stage, the user may be presented with optional instances of the type of activity selected from the casino lobby.

In a next step 606, the user selects an activity, such as a particular casino table game. In step 608, the user is presented with one or more options related to the selected activity. In step 610, the user selects an option. For instance, at this point, the user might place a wager, draw a card, select a restaurant or restaurant menu item, select a news source or a news story, place a buy or sell order on a financial exchange, place a bet on a certain box office performance over/under amount for a given movie, etc. The options for user input are myriad. In step 612, the software resident on the gaming communication device accepts the option input by the user and transmits the input data to the software resident at the gaming server. In step 614, the gaming server software acts on the input data.

Actions at this point, may include, without limitation, determining an outcome and/or amount, accessing another server and/or software application, retrieving information, preparing a response to the user, etc. The action of determining an outcome and/or amount might take place, for example, if the user is using the device to place wagers in connection with a gambling activity. For certain gambling activities, such as a table game or slot machine, a random number generator may be incorporated to determine the outcome (i.e., whether the user won or lost) and the gaming server software would also determine an amount won or lost based on the amount wagered and any applicable odds. The action of accessing another server and/or software application might occur, for example, in the event the user is engaging in a services activity such as accessing news services, making reservations and placing food and beverage orders at a restaurant, or making a retail purchase. The action of retrieving information might occur when the gaming server software is prompted to access another server for the purpose of retrieving a certain type of information requested by the user.

Preferably, the gaming server software prepares a response to the user's input data and in step 616. In step 618, the user acknowledges the response. For example, in the case of gambling, the user might acknowledge that he won a hand of blackjack because the dealer busted and that his payout was $100 based on a $50 bet at even odds. In step 620, the user logs out.

In the situation where the user is gambling, after the series of steps described in connection with FIG. 6, (or a subset or modified series of steps), the user physically enters a casino and goes to a casino cashier for payout and/or settlement (which can include, for example, extensions of credit or advance deposits). In one embodiment, there is a waiting period (e.g., twenty-four hours) before the user can collect winnings. The purpose of the waiting period is to allow time for fraud monitoring. The waiting period may depend on the amount of the balance. For example, if the user is owed less than $5,000 the waiting period may be twelve hours. If the user is owed between $5,000 and $10,000 the waiting period may be twenty-four hours. If the user is owed more than $10,000 the waiting period may be forty-eight hours.

The duration of activation of the gaming communication device, the duration of a particular session, and/or the duration of a particular activity may be controlled according to any number of different parameters. For example, the duration may be based on a predetermined amount of time or period of time. Activation of the gaming communication device may terminate upon the expiration of a predetermined time period. As another example, an activity may only be permitted until the occurrence of a particular time of day. According to an alternative, an administrator, or another party to a transaction within any of the various activities, may determine the time period or amount of time. According to yet another alternative, the duration may end upon the occurrence of an event such as the user entering or leaving a particular location. The duration of activation may be dynamically determined based on a period of non-use. In other words, after a predetermined time without being used, the device may "time out" and be deactivated. The period of time, or amount of time, may be cumulatively determined. For example, an activity may only be permitted for a period of five hours, collectively. Time counting toward the five hours might stop and start depending upon the location of the user. As another example, an activity might only be permitted so long as the user does not enter or leave a particular location for longer than a predetermined period of time.

Similarly, activation of the gaming communication device and/or the ability for a user to engage in a particular activity may only be permitted during a specified time of day, or for a particular period of time prior to an event, or for a particular period of time after notification to the user. Also, activation and/or access may be controlled based upon the location of the user. For example, if a user is in a particular casino in which a particular show will take place that evening, the user might be notified that tickets to the show are available for a specified period of time prior to the show. The user might only be permitted to engage in the activity of purchasing tickets for the show if the user is in the casino and during the specified period of time prior to the show. For example, the user might only be able to purchase tickets while in the casino and up to five minutes before the start time of the show. Similarly, the activation of the device may be restricted based on the location of the user and a corresponding period of time. For example, if a user is in a location where a show is occurring, or is going to occur, the device may be deactivated (either automatically, or by a party other than the user) during a period beginning five minutes prior to the show and ending five minutes after the end of the show.

According to another alternative, the duration or enablement of one activity might be determined by the participation of the user in another activity. For example, a user might be allowed to make dinner reservations at a popular restaurant if the user has been gambling enough at a given casino. In this way, bonuses or comps may be determined or managed based on the activity of the user via the gaming communication device.

Figure 7:
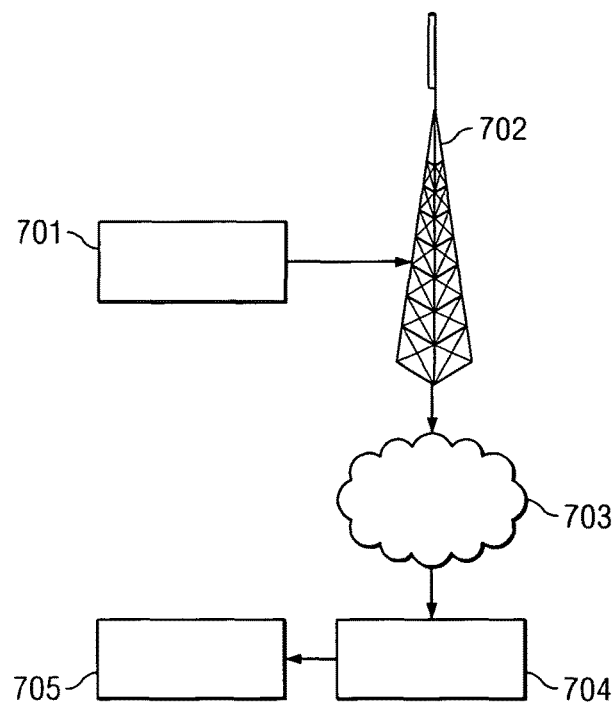
FIG. 7 depicts a gaming system showing a communication path in accordance with an embodiment of the present invention.

Preferably, data is transmitted back and forth during the gaming activities between the gaming communication device and a server controlled by the gaming service provider. An example of the path of communication is shown in FIG. 7. Gaming data, such as a wager placed by the user, is transmitted from gaming communication device 701 to a base station 702 (or a transmitter in the case of a private wireless network such as a WiFi or WiMax network). Base station 702 routes the data through network 703 to a hub or gateway 704, which in turn routes the data to a gaming server 705 operated by a gaming service provider. Preferably, the communication from gaming communication device 701 to the network 703 comprises wireless communication. This may be any type of known wireless communication or any-type of wireless communication available in the future. Examples of acceptable wireless communication protocols include CDMA, GSM, and GPRS.

Preferably, the communication from the network 703 to the gateway 704 and to the server 705 is conducted over secure land lines. FIG. 7 is an example communication network only and the present invention should be understood to cover other networks in which data may be transmitted from gaming communication device 701 to server 705. Preferably, data in response to data being transmitted from gaming communication device 701 to server 705 is transmitted back to gaming communication device 701 along a path essentially opposite to the path of the first transmission. It should be noted that in at least certain embodiments of the methods and systems described herein, a user is not actually playing a game on the gaming communication device. Rather, the user is actually playing the game on the server controlled by the gaming service provider, which may be located within a casino.

With respect to payment and/or receipt of winnings and losses, one possible approach is as follows. Upon check-in at a casino hotel, a hotel representative may query a guest as to whether the guest wants access to a gaming communication device. If the guest does want such access, the hotel representative may provide the guest with a gaming communication device in exchange for a credit-card type deposit or other deposit. The guest then deposits money into an account for wireless gaming. The guest's account balance information is loaded onto the guest's account file, which is preferably maintained on the gaming server. The user may load money into his gaming account by establishing a credit account, for example, at a casino cashier and/or by paying cash to the casino cashier. Many other alternatives exist and this process is an example only. Guest accounts or gaming communication devices may be preloaded with funds. Funds may be deposited during a gaming session. This may occur, for example, if a user selected a casino cashier activity from the gaming environment and instructed the cashier to add funds to the account. The finance subsystem may also utilize account card technology (such as ATM cards, credit cards, stored value cards, gift cards, etc) in order to conduct financial transactions associated with a user's account. Moreover, the user may receive or make payments remotely, by way of inputting instructions via the gaming communication device or by another remote device such as an automatic teller machine (ATM), which is in electronic communication with the gaming server or other server operated by the casino, hotel, gaming service provider or other entity involved in the gaming activities. For example, a user might remotely (via the gaming communication device) place an order at a restaurant. Then, the user might make advance payment for the meal at an ATM-type machine which is operable to receive instructions corresponding to the financial transaction requirements of the gaming activity of ordering food.

A unique aspect of the present invention includes establishing an electronic record of the gaming transactions undertaken by a user. Preferably, this is accomplished by utilization of a keystroke log, which is an electronic record of all keystrokes made by the user. Utilization of a keystroke log in this context allows for unprecedented monitoring of a user's gaming activity. In the event of a dispute, one may refer to the keystroke log and readily determine whether, in fact, a user placed a particular wager, for example.

An additional possible aspect of the electronic record is to allow a gaming control board or other regulatory authority, access to the electronic record in a direct manner in order to conduct periodic independent monitoring of the gaming activities conducted over the system. Another possible aspect is to allow policing against rigged machines. For instance, it is possible that the gaming control board (or other regulatory authority) could obtain a gaming communication device and compare their test results over time against records in the electronic record database (e.g., by comparing the results shown in the keystroke log). This essentially comprises electronic access for testing.

Figure 8:
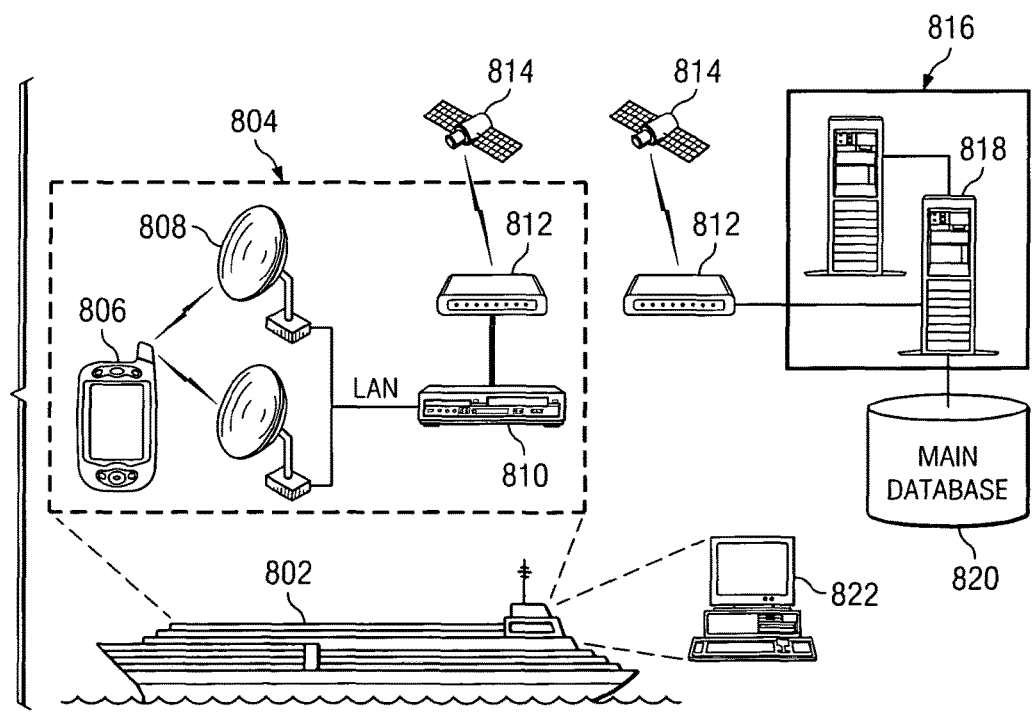
FIG. 8 illustrates a ship-based gaming system in accordance with an embodiment of the present invention.

In another embodiment of the invention, as shown in FIG. 8, a ship-based gaming system is provided. The system preferably comprises passenger vessel 802, such as a cruise liner for example. The system includes one or more gaming communication devices 806 connected to a communication network. The network shown in FIG. 8 comprises a mobile network with base stations 808 connected via a LAN to a base station controller (BSC) 810. BSC 810 is connected via a T1 interface to a first Very Small Aperture Terminal (VSAT) modem 812, which is in communication with a first satellite 814. First satellite 814 is operable to transmit and receive signals from second satellite 814, which is in communication with second VSAT modem 812. Second VSAT modem 812 is in communication with a gaming server 818 located at gaming service provider 816. Gaming server is coupled to gaming database 820. Again, the network configuration depicted in FIG. 8 is for example purposes only, and other configurations are within the scope of the present invention. An on-board back office 822 is preferably provided. Data is communicated by the on-board VSAT modem and transmitter to the first satellite for relay to the second (preferably land-based) VSAT receiver and modem. The data is then communicated to a server and/or centralized database via a mobile station controller (not shown).

A corresponding business model involves the gaming service provider contracting with a cruise line, which agrees to allow the gaming service provider to provide coverage throughout the cruise line's ship(s), by using repeaters for example. The gaming service provider may provide a private wireless network, in which case any revenue generated from use of or access to the private wireless network, and revenue from gaming activities, may be allocated among all or any subset of the cruise line and the gaming service provider. Alternatively, the gaming service provider may contract with a mobile carrier and a satellite provider, in which case revenue from the mobile calls, and revenue from gaming activities, may be allocated among all or any subset of the cruise line, the mobile carrier and the gaming service provider.

There are several scenarios for a user's activity relative to transactions conducted over the gaming system. In one example scenario the user is in a fixed, but remote, location from the gaming server, which may be located on the premises of a casino. This may be include, for instance, a situation in which the gaming communication device is a kiosk or some other communication device which is in a fixed position or which is tethered to a fixed position so that the gaming communication device cannot be moved beyond a certain area. In another example scenario, the user starts a gaming transaction at a first location and ends the transaction at a second location different from the first location. In another example scenario, the user is mobile during a single gaming transaction. In another example scenario, the user is mobile within a first approved area then (during the gaming transaction) the user moves outside the first approved area, through an unapproved area, to a remote second approved area.

In an alternative embodiment, the gaming system may be configured to operate as a "curb-to-curb" gaming system. In such a system, a communication path may be established between the device and a particular server, based upon whether the user is in a location corresponding to that particular server. For example, the user might enter a first casino, or an authorized area associated with the first casino, and thereby activate the establishment of a communication path between the device and a server located at and/or controlled by the first casino. While the user is on the premises of the first casino, the user might be able to participate in activities, such as playing blackjack, at the first casino. Then, if the user leaves the first casino, the gaming system might be configured to terminate the first communication path (i.e., between the device and the first casino's server), or otherwise deactivate the device and/or terminate the user's ability to use the device to participate in activities associated with the first casino. When the user enters a second casino, or an authorized area associated with the second casino, a second communication path (e.g., between the device and a second server located at or controlled by the second casino) may be established. Thus, the user would now be able to play blackjack (or engage in other activities) at the second casino, rather than the first casino.

As another example, a particular casino is often related to other casinos within a jurisdiction or specified area. Under such a scenario, if a user entered any of the related casinos, then the appropriate communication path or paths could be established between the gaming communication device and one or more of the casinos in the group of related casinos, thereby enabling the user to play casino games (or engage in other activities) at the one or more casinos in the group of related casinos. Depending on regulatory requirements, the preferred configuration might be to establish a communication path with a server at a particular casino within the group at which the user wants to play. Then, a different communication path could be established at a subsequent casino if the user wants to play at another casino. Under certain circumstances, and again depending on regulatory requirements, some information associated with user activity might be maintained at a centralized server accessible by more than one casino within the group.

In another example embodiment, the gaming system may be used to enable gaming activities involving multiple wireless users who interact with one another. For instance, the system may enable a table game (such as blackjack) in which a first user and a second user are conducting gaming transactions on the same table and in which options selected by the first user directly impact outcomes and options relative to the second user. Preferably, the gaming environment presented on the gaming communication devices of both the first and second users will indicate the existence and activity of the other respective user. Another example of multiple users interacting on the gaming system is the provision of a poker game in which users place bets against one another instead of, or in addition to, placing bets against the house. Another example of interaction between users is when a first user makes restaurant reservations or purchases event tickets, thereby reducing the options available to the second user.

Preferably, the gaming service provider provides at least the following functions. First the gaming service provider provides and controls the one or more gaming servers. These servers may be physically located within the confines of the gaming service provider or may exist at a remote location. As mentioned, the gaming servers may also be located at or near a games provider such as a casino, casino hotel, racino, cruise ship, race track, etc. The gaming service provider may also provide monitoring services such as transaction monitoring and key stroke logging services. The gaming service provider may also provide data management and security services. These services are not intended to be exhaustive and the gaming service provider may provide other services which facilitate the gaming process.

It should be noted that the invention can be implemented in connection with any gaming environment or an environment for any other activity, which may be conducted electronically. The invention is not limited to Nevada or any other particular gaming jurisdiction. For instance, the invention can be employed in connection with casinos in Atlantic City, N.J., international jurisdictions, Native American gaming facilities, and "racinos" which are race tracks that also have slot machines, video lottery terminals, or other gambling devices. For example, in connection with "racinos," the invention might be used by participants who wish to play slot machine games while they are viewing race horses in the paddock area. This might be desirable in the event that the slot machine area does not allow smoking and a participant wishes to gamble from an outdoor smoking area. Alternatively, the slot machine area might permit smoking and the gambler wishes to play the slot machines from an area where he or she can avoid breathing second-hand smoke. Numerous other scenarios can be envisioned in which the gaming participant can use the invention to participate in remote gaming, while enjoying some other primary activity in a location remote from the gaming facility. Further, the invention is not limited to gaming, but can include other applications, such as trading financial instruments, and wagering on other types of events, such as elections, award events, or any other activity.

Another example embodiment involves the application of one or more of the methods and systems described herein to the activity of conducting financial transactions. Thus, the gaming communication device may be configured to enable a user to conduct such financial transactions, which may include, without limitation, any transaction involving a financial institution, such as banking, trading securities, or managing 401K or other investment fund assets. Preferably, a communication path would be established between the user and any of the servers or other computers necessary to conduct the financial transaction. As with certain other embodiments the ability to engage in this activity may be controlled by one or more parameters including location and/or identity verification and time or duration limits.

Conducting financial transactions may be one of the activities presented to the user of the gaming communication device. Any of the possible financial transactions might be presented as sub-activities. As an example, a user might want to trade securities listed on a particular exchange. Regulations might require the trader to be located within a certain jurisdiction to execute trades on the exchange. The exchange might have its own rules and could require that the trader be located on the premises. With the location verification techniques described elsewhere herein, the particular financial transaction activity might only be enabled if the user is located in a particular geographic area, for example.

As a related feature, the system may be configured to provide a credit verification feature, according to which a user's creditworthiness may be checked by a party to a transaction, or by which the user might apply for credit. For example, if a user wants to purchase $10,000 worth of a particular stock, then a communication path might be established between the user and a server located at and/or controlled by an exchange upon which the stock is being traded. An additional communication path might be established between the exchange server and a server of an account manager that manages the user's account. These communication paths would enable the basic transaction—that of the user purchasing the stock. Yet another communication path, however, might be established between a seller's server, the exchange server, and/or the account manager server and a server located at and/or controlled by a credit agency. This path would enable an interested party to the transaction to check and/or approve the user's credit to prior enabling the transaction.

According to one aspect of certain embodiments, a user of the gaming communication device can connect from the device to a financial service provider's server to provide a "Push to Trade" feature. Additionally or alternatively, a user of the gaming communication device can connect from the device to a gaming service provider's server to provide a "Push to Bet" feature. In order to enable these or other similar features, the device is configured to be capable of facilitating a "Push to Talk" protocol, whereby the device behaves like a walkie-talkie. Thus, the device may include any suitable program or application that enables the Push to Talk feature. As used herein, the phrase "Push to Talk" includes any protocol that allows for a direct connection feature for an end user. Included are all such protocols (e.g. Instant Talk, Fastchat, etc.) within the broad rubric of "Push to Talk" including those that provide wide-area, instantaneous contact.

The Push to Talk protocol allows a given device to instantly connect to any number of other devices, such as any other telephone (mobile or landline-based), personal computer, laptop, etc. The connection for the end user does not have to be spawned by any conventional dialing or by triggering some form of automatic dialing. A simple button can be depressed to provide the requisite connection. In the context of timing, Nextel (who developed the original Push to Talk technology) suggests that their Push to Talk protocol should connect within 2 seconds.

A related technology is Push to Talk Over Cellular (PoC). PoC service is a form of interactive voice messaging that combines walkie-talkie and cellular phone connectivity, allowing users to quickly connect with another person or an entire group of friends and contacts at the push of a button on a PoC-enabled handset.

The Push to Talk protocol allows users to use the walkie-talkie paradigm over an IP or a cellular network, which diminishes the boundary limitations of a conventional two-way radio. The Push to Talk service is based on a disruptive technology. Latency is an issue during some traditional mobile telephone conversations. One appeal of the Push to Talk platform, as compared to executing a traditional telephone call, is being able to talk to an individual or to a group of individuals instantly, without waiting for someone to answer due to latency issues. Another benefit of the Push to Talk feature is a shorter than normal phone call, which cuts down on dialing costs for corresponding end users. Nextel estimates that the average Push to Talk call lasts forty seconds. Push to Talk technology is compatible with virtually any network communications; for example, the Push to Talk protocol may readily be used in conjunction with cellular telephone networks, including GSM and CDMA. The network equipment used for the Push to Talk feature is currently being offered by companies such as Ericsson, Motorola, Siemens, Sony Ericsson, and Nextel.

Because Push to Talk effectively turns the handheld device into a walkie-talkie, it not only successfully enables end users to send voice messages, it also enables immediate data texts (commonly referred to as "direct messaging"). Push to Talk messaging represents a significant improvement over short messaging systems in bypassing the slow and clumsy process of entering text via a phone keypad. This makes text messaging quicker and more effective.

According to the "Push to Trade" feature, once the end user initiates the call, the financial service provider is instantly connected to the end user. In one embodiment, the financial service provider has one or more electronic trade desks that are dedicated to this feature for their clients. Thus, all "Push to Trade" requests may be received at this location. In other embodiments, any suitable entity, broker, standard trading desk, or electronic device may receive such Push to Trade communications.

Once the connection has been established, the financial service provider may then simply conduct the trade as prescribed by the end user. For example, upon connection, the end user may be presented with the financial or market environment in which he seeks to participate. The trade desk representative or device can query the end user to execute an electronic or a broker-assisted trade. In addition, the financial environment may be presented in various stages. For instance, in a first stage, the financial environment may comprise a financial summary of all markets where the user is presented with certain financial options including, for example, specific market summaries, specific prices for selected assets (e.g. commodities, stocks, bonds, etc.), current positions, buying power, etc. In a subsequent stage, the user may be presented with optional instances of the type of activity selected from the market platform.

From this platform, the end user can select an activity, such as a particular type of trade. Thus, the user is presented with one or more options related to the selected activity. For instance, at this point, the user might place a buy or a sell order on a financial exchange. The software, which may be resident on the device, on the server, or on a combination of both, accepts the option input by the user and transmits the input data to the financial service provider. Subsequently, the financial service provider acts on the input data. The Push to Talk technology readily accommodates a voice log of the transaction for audit or confirmation purposes. Hence, a digital voice storage may be provided, whereby the transaction (e.g., inclusive of bid and ask prices) is recorded. In addition, the automatic voice log can then relay this information back to the end user (e.g., via his e-mail or via a conventional postal mail service). This could occur as a matter of course such that the end user is routinely provided with a suitable confirmation receipt for all of his trading activity.

Actions at this point may include, without limitation, determining an outcome and/or amount for the trade, accessing another server and/or software application, retrieving additional information, preparing a suitable response to the user, etc. The action of determining an outcome and/or amount might take place, for example, if the user is using the device to place trades in conjunction with his account and a given exchange. Hence, this could include a formal tallying of the executed trade, inclusive of the charged commission, the amount debited from the account to cover the trade, etc. The action of accessing another server and/or software application might occur, for example, in the event the user is engaging in a services activity such as accessing news services. The action of retrieving information might occur when the financial software is prompted to access another server for the purpose of retrieving a certain type of information requested by the user. The financial service provider can then prepare a response to the user's input data. Once this activity has concluded, the user can acknowledge the response and then log out and terminate his session.

It should be noted that the "Push to Trade" feature can be used in other applications of the gaming technology described herein. For example, in an application where the user of the gaming communication device is playing blackjack from an authorized area outside the casino gaming area, the Push to Trade feature would enable the user to participate audibly in the blackjack game actually taking place within the casino gaming area. The Push to Talk technology would allow the user to immediately and virtually "sit down" at an actual blackjack table without the delay caused by the conventional setup and tear down process of certain traditional telecommunication protocols. Also, once the user is participating in the game, the user can communicate orally with the dealer, or other players that are physically at the table, without the latency issues of certain mobile telecommunication systems.

In at least one embodiment, the invention provides jurisdictional controls, which limit gaming to approved geographical areas. The invention may also include an age/identity verification feature. This can be accomplished through any applicable technique including retina scanning, finger print identification, voice print matching, or other biometrics. Identity verification can also be accomplished by having a customer take a picture of himself (e.g., by use of a digital picture phone) and transmitting the picture to the gaming service provider for comparison to a stored picture of the pre-approved user. Identity verification can also be accomplished by way of comparison of participant provided data to stored data, and execution of electronic agreements or contracts by the participant. Identity verification can also be accomplished by monitoring a keystroke characteristic (e.g., rhythm, patterns, or cadence) of the user, or any other method in which a parameter uniquely associated with the user can be observed. The invention may also provide for the logging of keystrokes. In at least one embodiment, all communications are accomplished without accessing the Internet.

Mobile, remote gaming may be desirable for many reasons, some of which have already been described. The invention may allow supplementation of existing in-house gaming revenue by allowing bettors to place bets while enjoying other leisure activities such as golf, swimming, dining and shows. The invention may complement the new coinless wagering environment as bettors can play their favorite games outside the casino. The invention provides a high-speed, reliable, accurate, and secure mobile gaming environment that complies with regulatory requirements for identification and location verification of the bettor with the ability to generate key stroke logs. The invention may restrict unauthorized usage from a geographic perspective and is capable of implementation using location verification technology (e.g., geo-fencing) to conform the gaming activities to legal parameters.

Consumers may benefit from an increased choice of gaming environments. Consumers will be able to bet in whatever surroundings they prefer, benefiting from the knowledge that the product is regulated, fair and secure while enjoying the gaming experience at the speed they choose without external influences, such as that which might occur within the in-house casino environment. The gaming businesses can use the invention to increase their revenue base through a new, regulated, mobile, remote channel. Customers wanting to be entertained during downtime or outside a casino will be able to play games on their gaming communication device and customers intimidated by a traditional casino environment will be able to play in private. The gaming jurisdictions may benefit from an increase in gaming an ancillary revenue growth because customers will have a more enjoyable experience.

The invention may also be used to deliver content at an increased speed compared to traditional telecommunications systems. The content may include, for example, live reports, entertainment, news, promotions and advertising.

As mentioned, the invention provides a mobile gaming environment that complies with regulatory requirements for identification and location verification of the bettor. Moreover, the system is designed to be one hundred percent "clean" from a regulatory perspective. The software is clean in that it has not been and will not be licensed to anyone who does business illegally or otherwise operates in a "gray" area. For example, in a preferred embodiment, the software is not licensed to an entity that will illegally operate the software, or otherwise illegally do business, on the Internet. This may be desirable in that certain gaming jurisdictions will not grant gaming permits or licenses to companies that do business with, or license technology to or from, other entities known to be engaging in illegal operations.

Preferably, the system is designed such that the gaming software (or other application software operating on the system) is also one hundred percent clean from a regulatory perspective. For instance, before granting a license, a gaming jurisdiction may require that the software being used is not tainted in that it has not been used by the license applicant in violation of any laws and has not been licensed or otherwise distributed or disseminated to others who have used the software for illegal purposes, or who have been engaging in illegal activity. Therefore, it is preferred that the gaming software be clean and untainted from this perspective.

The systems and methods described herein may also be used to deliver and/or access "Rich Media" content such as, for example, sports video (live or nearly live) and audio commentary. Such may often only be distributed within specific jurisdictions. Therefore, the distribution may benefit from the inventive aspects discussed herein, particularly the location verification aspect, such as geofencing.

The gaming system and methods described herein may permit, among other things, pari-mutuel wagering, sports betting, and dissemination of news and other content. The invention also enables a casino or other gaming provider to advertise ancillary services such as shows, bars, and restaurants. The invention also enables remote reservations and purchases in connection with such services.

According to an embodiment of the invention, the gaming system provides for the dissemination of real-time odds to users accessing the system.

In another embodiment, an outcome in one transaction can trigger the presentation to the user of options for a second transaction. For example, if a user wins a predetermined amount of money playing blackjack, the user might be presented with an option to purchase retail items at a casino store or to make reservations for certain services at a club. As another example, if a user uses the system to purchase show tickets, the user might be offered to make reservations at one of several restaurants within a certain proximity to the show.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

The invention claimed is:

1. An apparatus comprising:
at least one processor; and
at least one memory device electronically coupled to the at least one processor, in which the at least one memory device stores software that when executed by the at least one processor, directs the at least one processor to:
receive a request from a first mobile device and a second mobile device to access a private gaming group;
in response to determining that the first mobile device and the second mobile device have permission to access the private gaming group, enable the first mobile device and the second mobile device to jointly participate in a common gaming activity;
determine first location information associated with the first mobile device based on at least one of a receiver strength indicator, time difference of arrival, multilateration, triangulation, geo-fencing, and global satellite positioning;
determine second location information associated with the second mobile device based on at least one of a receiver strength indicator, time difference of arrival, multilateration, triangulation, geo-fencing, and global satellite positioning;
based at least in part on determining the first and the second location information, determine a distance between the first mobile device and the second mobile device;
based at least in part on determining the distance between the first mobile device and the second mobile device, determine that a distance requirement has been violated, in which the distance requirement comprises a minimum distance that must be maintained between the first mobile device and the second mobile device when providing the common gaming activity;
based at least in part on determining that the distance requirement has been violated, disable the common gaming activity at the first mobile device and the second mobile device; and
based at least in part on determining that the distance requirement has not been violated, enable the common gaming activity at the first mobile device and the second mobile device, wherein the first mobile device and the second mobile device exchange location information and display the location information on respective screens.

2. The apparatus of claim 1, in which the software, that when executed, further directs the at least one processor to:
determine that a plurality of users comprise registered users; and based at least in part on determining that the plurality of users comprise registered users, enable a plurality of mobile devices to provide the common gaming activity to the plurality of users.

3. The apparatus of claim 1,
in which the plurality of users are permitted to participate in the common gaming activity from within at least a first predetermined location and are not permitted to participate in the common gaming activity from within at least a second predetermined location; and in which the software, that when executed, further directs the at least one processor to:
determine that the plurality of mobile devices are within the at least first predetermined location; and
based at least in part on determining that the plurality of mobile devices are within the at least first predetermined location, enable the plurality of mobile devices to provide the common gaming activity to the plurality of users.

4. The apparatus of claim 1, in which the common gaming activity comprises a gaming activity that allows at least the first mobile device and the second mobile device to compete against a common house at a same time.

5. The apparatus of claim 4, in which the common gaming activity comprises at least one of:
blackjack,
pai gow, and
caribbean stud.

6. The apparatus of claim 1, in which the common gaming activity comprises a gaming activity that allows at least the first mobile device and the second mobile device to compete against one another.

7. The apparatus of claim 6, in which the common gaming activity comprises at least one of:
poker,
sporting event wagering,
athletic competition wagering,
a lottery contest,
a prize contest, and
keno.

8. The apparatus of claim 1, in which the software, that when executed, further directs the at least one processor to:
receive a request from the first mobile device, in which the request identifies the common gaming activity as an activity in which the first mobile device attempts to participate;
based at least in part on receiving the request, identify the second mobile device as a potential participant in the common gaming activity; and
communicate an invite to the second mobile device to request participation of the second mobile device in the common gaming activity.

9. The apparatus of claim 8,
in which the software, that when executed, further directs the at least one processor to access from a profile associated with a first user an indication of a relationship between the first user of the first mobile device and a second user of the second mobile device; and
in which to identify the second user comprises to identify the second user based at least in part on the relationship between the first user and the second user.

10. The apparatus of claim 8,
in which the software, that when executed, further directs the at least one processor to receive from the first mobile device at least one criteria, in which at least one criteria indicates a type of potential participant the first mobile device attempts to play with; and
in which to identify the second mobile device comprises to identify the second mobile device based at least in part on the at least one criteria.

11. The apparatus of claim 1,
in which the common gaming activity comprises a number of player positions;
in which the first mobile device and the second mobile device occupy at least two of the player positions; and in which the software, that when executed, further directs the at least one processor to:
determine that at least one of the player positions is not occupied; and
based at least in part on determining that at least one of the player positions is not occupied, communicate an inquiry to at least the first mobile device to determine whether the first mobile device attempts to occupy an additional player position in the common gaming activity.

12. The apparatus of claim 1, in which the software, that when executed, further directs the at least one processor to:
receive a communication from the first mobile device; and
transmit the communication to the second mobile device, in which the communication comprises a text message.

13. The apparatus of claim 1, in which the software, that when executed, further directs the at least one processor to:
receive a communication from the first mobile device; and
transmit the communication to the second mobile device, in which the communication comprises a voice message.

14. The apparatus of claim 1, in which the common gaming activity comprises a virtual blackjack game in which at least a first card dealt to a first user and a second card dealt to a second user are dealt from a common multi-deck shoe.

15. The apparatus of claim 1, in which the common gaming activity comprises a real-time representation of a gaming activity that is occurring at a physical location.

16. The apparatus of claim 1, in which the software, that when executed, further directs the at least one processor to:
based at least in part on a predefined profile, identify the first mobile device as a first potential participant in the common gaming activity;
based at least in part on a predefined relationship between the first mobile device and the second mobile device, identify the second mobile device as a second potential participant in the common gaming activity;
based at least in part on identifying the first mobile device, communicate a first invite to the first mobile device to determine whether the first mobile device will attempt to participate in the common gaming activity; and
based at least in part on identifying the second mobile device, communicate a second invite to the second mobile device to determine whether the second mobile device attempts to participate in the common gaming activity.

17. The apparatus of claim 1, in which the software, that when executed, further directs the at least one processor to:
receive from the first mobile device a request to participate in a gaming activity;
based at least in part on receiving the request, cause to be presented to the first mobile device at least one gaming activity in which the first mobile device may participate, in which the gaming activity comprises the common gaming activity; and
receive from the first mobile device a selection of the common gaming activity.

18. The apparatus of claim 17,
in which the request comprises at least one parameter specified by the first mobile device;
in which the at least one parameter corresponds to at least one gaming characteristic in which the first mobile device is interested; and
in which the software, that when executed, further directs the at least one processor to determine the gaming activity based at least in part on the at least one parameter.

19. The apparatus of claim 17, in which the software, that when executed, further directs the at least one processor to:
based at least in part on receiving the request, access from a profile associated with the first mobile device at least one predefined preference of the first mobile device, in which the at least one predefined preference corresponds to at least one gaming characteristic in which the first mobile device is interested; and
determine the gaming activity based at least in part on the at least one predefined preference.

20. The apparatus of claim 17, in which the common gaming activity, when selected by the first mobile device, comprises an existing gaming activity with at least one participant.

21. The apparatus of claim 17, in which the common gaming activity, when selected by a first user, comprises a new gaming activity with no participants.

22. The apparatus of claim 1, in which the distance requirement comprises a requirement established by at least one of:
a federal law,
a state law,
a federal regulation, and
a state regulation.

23. The apparatus of claim 1,
in which the software, that when executed, further directs the at least one processor to communicate to the first mobile device the second location information associated with the second mobile device; and
in which receiving the second location information associated with the second mobile device causes the first mobile device to display at least in part to the first mobile device the second location information.

24. A method comprising:
a computing device receiving a request from a first mobile device and a second mobile device to access a private gaming group;
in response to determining that the first mobile device and the second mobile device have permission to access the private gaming group, the computing device enabling the first mobile device and the second mobile device to jointly participate in a common gaming activity;
the computing device determining first location information associated with the first mobile device based on at least one of a receiver strength indicator, time difference of arrival, multilateration, triangulation, geo-fencing, and global satellite positioning;
the computing device determining second location information associated with the second mobile device based on at least one of a receiver strength indicator, time difference of arrival, multilateration, triangulation, geo-fencing, and global satellite positioning;
based at least in part on determining the first and the second location information, the computing device determining a distance between the first mobile device and the second mobile device;
based at least in part on determining the distance between the first mobile device and the second mobile device, the computing device determining that a distance requirement has been violated, in which the distance requirement comprises a minimum distance that must be maintained between the first mobile device and the second mobile device when providing the common gaming activity;
based at least in part on determining that the distance requirement has been violated, the computing device disabling the common gaming activity at the first mobile device and the second mobile device; and based at least in part on determining that the distance requirement has not been violated, enabling the common gaming activity at the first mobile device and the second mobile device, wherein the first mobile device and the second mobile device exchange location information and display the location information on respective screens.

25. The method of claim 24, in which the common gaming activity comprises a gaming activity that allows at least the first mobile device and the second mobile device to compete against a common house at a same time.

26. The method of claim 24, in which the common gaming activity comprises a gaming activity that allows at least the first mobile device and the second mobile device to compete against one another.

27. The method of claim 24, further comprising transmitting to the first mobile device the second location information associated with the second mobile device.

28. The method of claim 24, further comprising:

receiving a request from the first mobile device, in which the request identifies the common gaming activity as an activity in which the first mobile device would like to participate;

based at least in part on receiving the request, identifying the second mobile device as a potential participant in the common gaming activity; and communicating an invite to the second mobile device to request participation of the second mobile device in the common gaming activity.

29. The method of claim 28, further comprising:

accessing from a profile associated with a first user an indication of a relationship between the first user of the first mobile device and a second user of the second mobile device; and in which identifying the second user comprises identifying the second user based at least in part on the relationship between the first user and the second user.

30. The method of claim 28, further comprising:

receiving from the first mobile device at least one criteria, in which at least one criteria indicates a type of potential participant the first mobile device attempts to play with; and in which identifying the second mobile device comprises identifying the second mobile device based at least in part on the at least one criteria.

31. The method of claim 24, in which the common gaming activity comprises a number of player positions;

in which the first mobile device and the second mobile device occupy at least two of the player positions; and in which the method further comprises:

determining that at least one of the player positions is not occupied; and based at least in part on determining that at least one of the player positions is not occupied, communicating an inquiry to at least the first mobile device to determine whether the first mobile device attempts to occupy an additional player position in the common gaming activity.

32. The method of claim 24, further comprising receiving from the first mobile device, as the first mobile device and the second mobile device participate in the common gaming activity, a wager on a performance of the second mobile device in the common gaming activity.

33. The method of claim 24, in which the common gaming activity comprises a virtual blackjack game in which at least a first card dealt to a first user and a second card dealt to a second user are dealt from a common multi-deck shoe.

34. The method of claim 24, in which the common gaming activity comprises a real-time representation of a gaming activity that is occurring at a physical location.

35. A non-transitory computer-readable medium comprising software that when executed by at least one processor directs the at least one processor to:

receive a request from a first mobile device and a second mobile device to access a private gaming group;

in response to determining that the first mobile device and the second mobile device have permission to access the private gaming group, enable the first mobile device and the second mobile device to jointly participate in a common gaming activity;

determine first location information associated with the first mobile device based on at least one of a receiver strength indicator, time difference of arrival, multilateration, triangulation, geo-fencing, and global satellite positioning;

determine second location information associated with the second mobile device based on at least one of a receiver strength indicator, time difference of arrival, multilateration, triangulation, geo-fencing, and global satellite positioning;

based at least in part on determining the first and the second location information, determine a distance between the first mobile device and the second mobile device;

based at least in part on determining the distance between the first mobile device and the second mobile device, determine that a distance requirement has been violated, in which the distance requirement comprises a minimum distance that must be maintained between the first mobile device and the second mobile device when providing the common gaming activity;

based at least in part on determining that the distance requirement has been violated, disable the common gaming activity at the first mobile device and the second mobile device; and based at least in part on determining that the distance requirement has not been violated, enable the common gaming activity at the first mobile device and the second mobile device, wherein the first mobile device and the second mobile device exchange location information and display the location information on respective screens.

36. The non-transitory computer-readable medium of claim 35, in which the common gaming activity comprises a gaming activity that allows at least the first mobile device and the second mobile device to compete against a common house at a same time.

37. The non-transitory computer-readable medium of claim 35, in which the common gaming activity comprises a gaming activity that allows at least the first mobile device and the second mobile device to compete against one another.

38. The non-transitory computer-readable medium of claim 35, in which the software, that when executed by the at least one processor, further directs the at least one processor to transmit to the first mobile device the second location information associated with the second mobile device.

39. The non-transitory computer-readable medium of claim 35, in which the software, that when executed by the at least one processor, further directs the at least one processor to:
- receive a request from the first mobile device, in which the request identifies the common gaming activity as an activity in which the first mobile device would like to participate;
- based at least in part on receiving the request, identify the second mobile device as a potential participant in the common gaming activity; and
- communicate an invite to the second mobile device to request participation of the second mobile device in the common gaming activity.

40. The non-transitory computer-readable medium of claim 39, in which the software, that when executed by the at least one processor, further directs the at least one processor to access from a profile associated with a first user an indication of a relationship between the first user of the first mobile device and a second user of the second mobile device; and
- in which to identify the second user comprises to identify the second user based at least in part on the relationship between the first user and the second user.

41. The non-transitory computer-readable medium of claim 39, in which the software, that when executed by the at least one processor, further directs the at least one processor to:
- receive from the first mobile device at least one criteria, in which at least one criteria indicates a type of potential participant the first mobile device attempts to play with; and
- in which to identify the second mobile device comprises to identify the second mobile device based at least in part on the at least one criteria.

42. The non-transitory computer-readable medium of claim 35,
- in which the common gaming activity comprises a number of player positions;
- in which the first mobile device and the second mobile device occupy at least two of the player positions; and
- in which the software, that when executed by the at least one processor, further directs the at least one processor to:
  - determine that at least one of the player positions is not occupied; and
  - based at least in part on determining that at least one of the player positions is not occupied, communicate an inquiry to at least the first mobile device to determine whether the first mobile device attempts to occupy an additional player position in the common gaming activity.

43. The non-transitory computer-readable medium of claim 35, in which the software, that when executed by the at least one processor, further directs the at least one processor to receive from the first mobile device, as the first mobile device and the second mobile device participate in the common gaming activity, a wager on a performance of the second mobile device in the common gaming activity.

44. The non-transitory computer-readable medium of claim 35, in which the common gaming activity comprises a virtual blackjack game in which at least a first card dealt to a first user and a second card dealt to a second user are dealt from a multi-deck shoe.

45. The non-transitory computer-readable medium of claim 35, in which the common gaming activity comprises a real-time representation of a gaming activity that is occurring at a physical location.

46. The non-transitory computer-readable medium of claim 35, in which the software, that when executed by the at least one processor, further directs the at least one processor to:
- based at least in part on a predefined profile on the first mobile device, identify the first mobile device as a first potential participant in the common gaming activity;
- based at least in part on a predefined relationship between the first mobile device and the second mobile device, identify the second mobile device as a second potential participant in the common gaming activity;
- based at least in part on identifying the first mobile device, communicate a first invite to the first mobile device to determine whether the first mobile device wishes to participate in the common gaming activity; and
- based at least in part on identifying the second mobile device, communicate a second invite to the second mobile device to determine whether the second mobile device attempts to participate in the common gaming activity.

47. The non-transitory computer-readable medium of claim 35, in which the software, that when executed by the at least one processor, further directs the at least one processor to:
- receive from the first mobile device a request to participate in a gaming activity; and
- based at least in part on receiving the request, cause to be presented to the first mobile device at least one gaming activity in which the first mobile device may participate, in which the gaming activity comprises the common gaming activity.

48. The non-transitory computer-readable medium of claim 47,
- in which the request comprises at least one parameter specified by the first mobile device;
- in which the at least one parameter corresponds to at least one gaming characteristic in which the first mobile device is interested; and
- in which the software, that when executed by the at least one processor, further directs the at least one processor to determine the gaming activity based at least in part on the at least one parameter.

49. The non-transitory computer-readable medium of claim 47, in which the software, that when executed by the at least one processor, further directs the at least one processor to:
- based at least in part on receiving the request, access from a profile associated with the first mobile device at least one predefined preference of the first mobile device, in which the at least one predefined preference corresponds to at least one gaming characteristic in which the first mobile device is interested; and
- determine the gaming activity based at least in part on the at least one predefined preference.

* * * * *